US006104992A

United States Patent [19]

Gao et al.

[11] Patent Number: 6,104,992

[45] Date of Patent: Aug. 15, 2000

[54] ADAPTIVE GAIN REDUCTION TO PRODUCE FIXED CODEBOOK TARGET SIGNAL

[75] Inventors: Yang Gao, Mission Viejo; Huan-Yu Su, San Clemente, both of Calif.

[73] Assignee: Conexant Systems, Inc., Newport Beach, Calif.

[21] Appl. No.: 09/154,663

[22] Filed: Sep. 18, 1998

Related U.S. Application Data

[60] Provisional application No. 60/097,569, Aug. 24, 1998.

[51] Int. Cl.[7] .............................. G01L 19/12; G01L 19/14

[52] U.S. Cl. ........................... 704/220; 704/224; 704/225

[58] Field of Search ..................................... 704/219, 220, 704/221, 224, 225

[56] References Cited

U.S. PATENT DOCUMENTS

| | | | |
|---|---|---|---|
| 5,086,471 | 2/1992 | Tanaka et al. | 704/222 |
| 5,490,230 | 2/1996 | Gerson et al. | 704/225 |
| 5,664,055 | 9/1997 | Kroon | 704/223 |
| 5,699,485 | 12/1997 | Shoham | 704/223 |
| 5,704,003 | 12/1997 | Kleijn et al. | 704/220 |
| 5,752,223 | 5/1998 | Aoyagi et al. | 704/219 |
| 5,774,838 | 6/1998 | Miseki et al. | 704/222 |
| 5,778,335 | 7/1998 | Ubale et al. | 704/219 |
| 5,884,251 | 3/1999 | Kim et al. | 704/219 |
| 6,029,128 | 2/2000 | Jarvinen et al. | 704/220 |

FOREIGN PATENT DOCUMENTS

| | | |
|---|---|---|
| 0 500 095 A2 | 8/1992 | European Pat. Off. . |
| 0 849 887F A2 | 6/1998 | European Pat. Off. . |
| 0 852 376 A2 | 7/1998 | European Pat. Off. . |
| WO 95/28824 | 11/1995 | WIPO . |

OTHER PUBLICATIONS

Hong Kook Kim, "Adaptive Encoding of Fixed Codebook in CELP Coders," Proceedings of the 1998 IEEE International Conference on Acoustics, Speech and Signal Processing, vol. 1, pp. 149–152, May 1998.

Josep M. Salavedra and Enrique Masgrau, "APVQ Encoder Applied to Wideband Speech Coding", Proceedings of ICSLP '96 –Fourth International Conference on Spoken Language Processing, vol. 2, Oct. 1996, pp. 941–944.

Tomohiko Taniguchi, Mark Johnson, and Yasuji Ohta, "Pitch Sharpening for Perceptually Improved CELP, and the Sparse–Delta Codebook for Reduced Computation", Proceedings of ICASSP '91 –IEEE International Conference on Acoustics, Speech, and Signal Processing, vol. 1, May 1991, pp. 241–244.

W. Bastiaan Kleijn and Peter Kroon, "The RCEIP Speech–Coding Algorithm," vol. 5, No. 5, Sep.–Oct. 1994, pp. 39/573 –47/581.

(List continued on next page.)

*Primary Examiner*—David R. Hudspeth
*Assistant Examiner*—Martin Lerner
*Attorney, Agent, or Firm*—Akin, Gump, Strauss, Hauer & Feld, LLP

[57] ABSTRACT

A multi-rate speech codec supports a plurality of encoding bit rate modes by adaptively selecting encoding bit rate modes to match communication channel restrictions. In higher bit rate encoding modes, an accurate representation of speech through CELP (code excited linear prediction) and other associated modeling parameters are generated for higher quality decoding and reproduction. The encoder applies adaptive gain reduction to optimize selection of appropriate gain contributions from the adaptive and fixed codebooks. Specifically, the encoder uses a first target signal to identify a contribution (a best code vector and a gain) from the adaptive codebook. Thereafter, a contribution from the fixed codebook is selected. The gain associated with the adaptive codebook contribution is then reduced by a factor, and the gain contribution from the fixed codebook is searched a second time, permitting fine tuning of the overall contribution. The gain reduction factor applied is adapted by considering both the encoding bit rate and a normalized correlation between the original target signal and the filtered signal from the adaptive codebook.

20 Claims, 11 Drawing Sheets

OTHER PUBLICATIONS

C. Laflamme, J–P. Adoul, H.Y. Su, and S. Morissette, "On Reducing Computational Complexity of Codebook Search in CELP Coder Through the Use of Algebraic Codes," 1990, pp. 177–180.

Chih–Chung Kuo, Fu–Rong Jean, and Hsiao–Chuan Wang, "Speech Classification Embedded in Adaptive Codebook Search for Low Bit–Rate CELP Coding," IEEE Transactions on Speech and Audio Processing, vol. 3, No. 1, Jan. 1995, pp. 1–5.

Erdal Paksoy, Alan McCree, and Vish Viswanathan, "A Variable–Rate Multimodal Speech Coder with Gain–Matched Analysis–By–Synthesis," 1997, pp. 751–754.

Gerhard Schroeder, "International Telecommunication Union Telecommunications Standardization Sector," Jun. 1995, pp. i–iv, 1–42.

"Digital Cellular Telecommunications System; Comfort Noise Aspects for Enhanced Full Rate (EFR) Speech Traffic Channels (GSM 06.62)," May 1996, pp. 1–16.

W. B. Kleijn and K.K. Paliwal (Editors), Speech Coding and Synthesis, Elsevier Science B.V.; Kroon and W.B. Kleijn (Authors), Chapter 3: "Linear–Prediction Based on Analysis–by–Synthesis Coding", 1995, pp. 81–113.

W. B. Kleijn and K.K. Paliwal (Editors), Speech Coding and Synthesis, Elsevier Science B.V.; A. Das, E. Paskoy and A. Gersho (Authors), Chapter 7: "Multimode and Variable–Rate Coding of Speech," 1995, pp. 257–288.

B.S. Atal, V. Cuperman, and A. Gersho (Editors), Speech and Audio Coding for Wireless and Network Applications, Kluwer Academic Publishers; T. Taniguchi, Y. Tanaka and Y. Ohta (Authors), Chapter 27: "Structured Stochastic Codebook and Codebook Adaptation for CELP," 1993, pp. 217–224.

B.S. Atal, V. Cuperman, and A. Gersho (Editors), Advances in Speech Coding, Kluwer Academic Publishers; I. A. Gerson and M.A. Jasiuk (Authors), Chapter 7: "Vector Sum Excited Linear Prediction (VSELP)," 1991, pp. 69–79.

B.S. Atal, V. Cuperman, and A. Gersho (Editors), Advances in Speech Coding, Kluwer Academic Publishers; J.P. Campbell, Jr., T.E. Tremain, and V.C. Welch (Authors), Chapter 12: "The DOD 4.8 KBPS Standard (Proposed Federal Standard 1016)," 1991, pp. 121–133.

B.S. Atal, V. Cuperman, and A. Gersho (Editors), Advances in Speech Coding, Kluwer Academic Publishers; R.A. Salami (Author), Chapter 14: "Binary Pulse Excitation: A Novel Approach to Low Complexity CELP Coding," 1991, pp. 145–157.

ADAPTIVE GAIN REDUCTION TO PRODUCE FIXED CODEBOOK TARGET SIGNAL

CROSS-REFERENCE TO RELATED APPLICATIONS

The present application is based on U.S. Provisional Application Ser. No. 60/097,569, (Attorney Docket No. 98RSS325), filed Aug. 24, 1998.

INCORPORATION BY REFERENCE

The following applications are hereby incorporated herein by reference in their entirety and made part of the present application:

1) U.S. Provisional Application Ser. No. 60/097,569 (Attorney Docket No. 98RSS325), filed Aug. 24, 1998;

2) U.S. patent application Ser. No. 09/154,675 (Attorney Docket No. 97RSS383), filed Sep. 18, 1998;

3) U.S. patent application Ser. No. 09/156,814 (Attorney Docket No. 98RSS365), filed Sep. 18, 1998;

4) U.S. patent application Ser. No. 09/156,649 (Attorney Docket No. 95E020), filed Sep. 18, 1998;

5) U.S. patent application Ser. No. 09/156,648 (Attorney Docket No. 98RSS228), filed Sep. 18, 1998;

6) U.S. patent application Ser. No. 09/156,650 (Attorney Docket No. 98RSS343), filed Sep. 18, 1998;

7) U.S. patent application Ser. No. 09/156,832 (Attorney Docket No. 97RSS039), filed Sep. 18, 1998;

8) U.S. patent application Ser. No. 09/154,660 (Attorney Docket No. 98RSS384), filed Sep. 18, 1998;

9) U.S. patent application Ser. No. 09/154,654 (Attorney Docket No. 98RSS344), filed Sep. 18, 1998;

10) U.S. patent application Ser. No. 09/156,657 (Attorney Docket No. 98RSS328), filed Sep. 18, 1998;

11) U.S. patent application Ser. No. 09/156,826 (Attorney Docket No. 98RSS382), filed Sep. 18, 1998;

12) U.S. patent application Ser. No. 09/154,662 (Attorney Docket No, 98RSS383), filed Sep. 18, 1998;

13) U.S. patent application Ser. No. 09/154,653 (Attorney Docket No. 98RSS406), filed Sep. 18, 1998.

BACKGROUND

1. Technical Field

The present invention relates generally to speech encoding and decoding in voice communication systems; and, more particularly, it relates to various techniques used with code-excited linear prediction coding to obtain high quality speech reproduction through a limited bit rate communication channel.

2. Related Art

Signal modeling and parameter estimation play significant roles in communicating voice information with limited bandwidth constraints. To model basic speech sounds, speech signals are sampled as a discrete waveform to be digitally processed. In one type of signal coding technique called LPC (linear predictive coding), the signal value at any particular time index is modeled as a linear function of previous values. A subsequent signal is thus linearly predictable according to an earlier value. As a result, efficient signal representations can be determined by estimating and applying certain prediction parameters to represent the signal.

Applying LPC techniques, a conventional source encoder operates on speech signals to extract modeling and parameter information for communication to a conventional source decoder via a communication channel. Once received, the decoder attempts to reconstruct a counterpart signal for playback that sounds to a human ear like the original speech.

A certain amount of communication channel bandwidth is required to communicate the modeling and parameter information to the decoder. In embodiments, for example where the channel bandwidth is shared and real-time reconstruction is necessary, a reduction in the required bandwidth proves beneficial. However, using conventional modeling techniques, the quality requirements in the reproduced speech limit the reduction of such bandwidth below certain levels.

Typically because of processing limitations, in conventional code-excited linear predictive coding, excitation contributions from an adaptive codebook and from a fixed codebook are not jointly determined. Instead, a contribution from the adaptive codebook is initially identified (by searching). Thereafter, while using the identified adaptive codebook contribution, an attempt is made to identify the contribution from the fixed codebook. However, in at least many circumstances, using such a sequential approach does not yield an optimal overall contribution. As a result, quality suffers during speech reproduction.

Further limitations and disadvantages of conventional systems will become apparent to one of skill in the art after reviewing the remainder of the present application with reference to the drawings.

SUMMARY OF THE INVENTION

Various aspects of the present invention can be found in a speech system using an analysis by synthesis approach on a speech signal. The speech system comprises an adaptive codebook, a fixed codebook and a processing circuit. The processing circuit sequentially identifies a first gain applied to the adaptive codebook and a second gain applied to the fixed codebook. To permit fine tuning of the second gain, the processing circuit identifies a gain reduction factor applied to the first gain identified.

Further aspects might be found in a similar speech system that comprises a first codebook, a second codebook, and a processing circuit. Therein, the processing circuit generates a first contribution from the first codebook and a second contribution from the second codebook. The processing circuit applies adaptive gain reduction to the contribution from the first codebook then regenerates the second contribution from the second codebook.

On either of similar such speech systems, a variety of variations define yet further aspects of the present invention. For example, the gain reduction might comprise use of an adaptive gain factor. The processing circuit can identify the adaptive gain factor by considering, at least in part, an encoding bit rate and/or a correlation value. The correlation value may be calculated based, at least in part, on an original target signal and/or a filtered signal from the adaptive or first codebook.

Other aspects, advantages and novel features of the present invention will become apparent from the following detailed description of the invention when considered in conjunction with the accompanying drawings.

BRIEF DESCRIPTION OF THE DRAWINGS

FIG. 2 is a functional block diagram illustrating of a first stage of operations performed by one embodiment of the speech encoder of FIGS. 1*a* and 1*b*. FIG. 3 is a functional block diagram of a second stage of operations, while FIG. 4 illustrates a third stage.

DETAILED DESCRIPTION

Figure 1A:
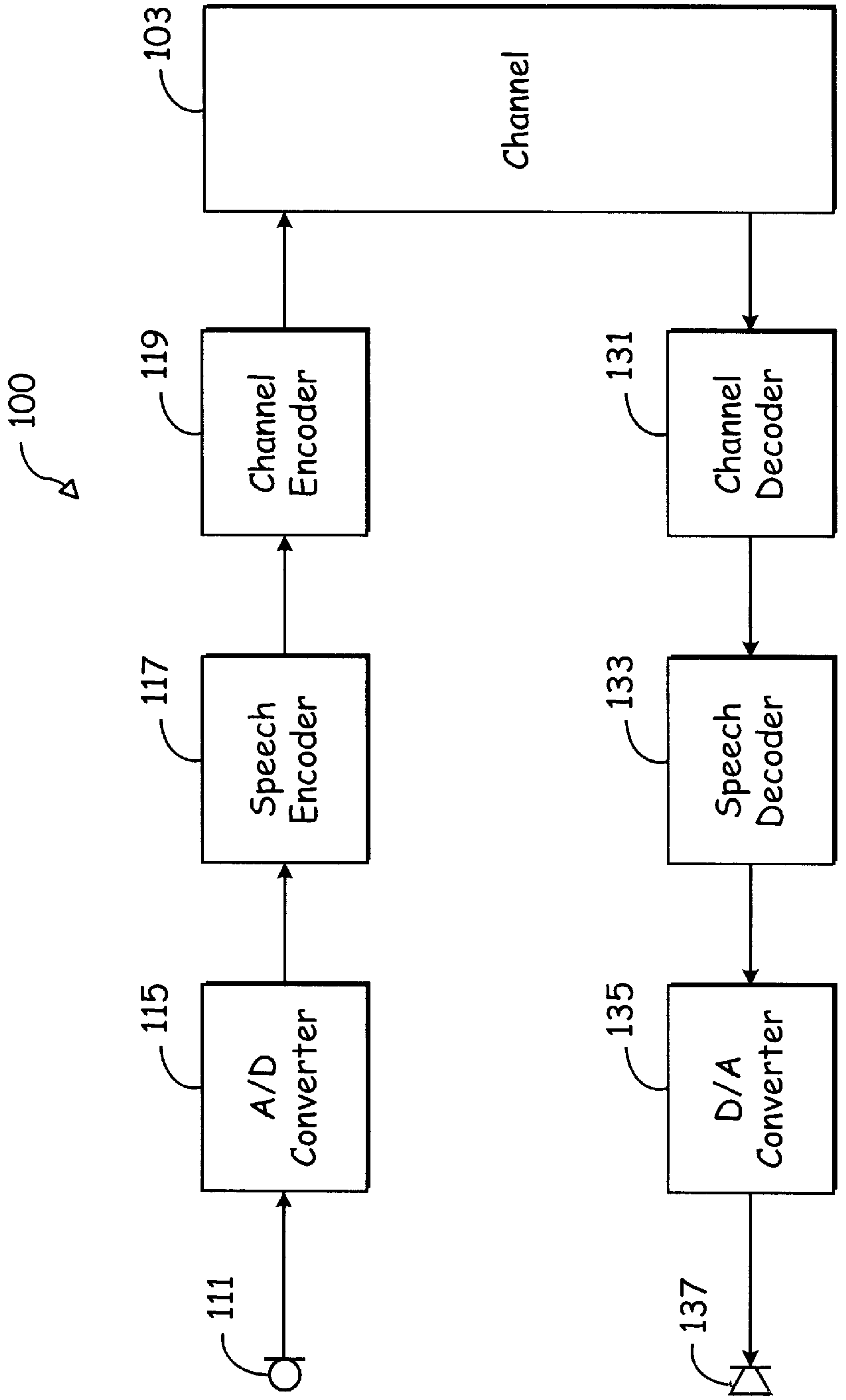
FIG. 1*a* is a schematic block diagram of a speech communication system illustrating the use of source encoding and decoding in accordance with the present invention.

FIG. 1*a* is a schematic block diagram of a speech communication system illustrating the use of source encoding and decoding in accordance with the present invention. Therein, a speech communication system 100 supports communication and reproduction of speech across a communication channel 103. Although it may comprise for example a wire, fiber or optical link, the communication channel 103 typically comprises, at least in part, a radio frequency link that often must support multiple, simultaneous speech exchanges requiring shared bandwidth resources such as may be found with cellular telephony embodiments.

Although not shown, a storage device may be coupled to the communication channel 103 to temporarily store speech information for delayed reproduction or playback, e.g., to perform answering machine functionality, voiced email, etc. Likewise, the communication channel 103 might be replaced by such a storage device in a single device embodiment of the communication system 100 that, for example, merely records and stores speech for subsequent playback.

In particular, a microphone 111 produces a speech signal in real time. The microphone 111 delivers the speech signal to an A/D (analog to digital) converter 115. The A/D converter 115 converts the speech signal to a digital form then delivers the digitized speech signal to a speech encoder 117.

The speech encoder 117 encodes the digitized speech by using a selected one of a plurality of encoding modes. Each of the plurality of encoding modes utilizes particular techniques that attempt to optimize quality of resultant reproduced speech. While operating in any of the plurality of modes, the speech encoder 117 produces a series of modeling and parameter information (hereinafter "speech indices"), and delivers the speech indices to a channel encoder 119.

The channel encoder 119 coordinates with a channel decoder 131 to deliver the speech indices across the communication channel 103. The channel decoder 131 forwards the speech indices to a speech decoder 133. While operating in a mode that corresponds to that of the speech encoder 117, the speech decoder 133 attempts to recreate the original speech from the speech indices as accurately as possible at a speaker 137 via a D/A (digital to analog) converter 135.

The speech encoder 117 adaptively selects one of the plurality of operating modes based on the data rate restrictions through the communication channel 103. The communication channel 103 comprises a bandwidth allocation between the channel encoder 119 and the channel decoder 131. The allocation is established, for example, by telephone switching networks wherein many such channels are allocated and reallocated as need arises. In one such embodiment, either a 22.8 kbps (kilobits per second) channel bandwidth, i.e., a full rate channel, or a 11.4 kbps channel bandwidth, i.e., a half rate channel, may be allocated.

With the full rate channel bandwidth allocation, the speech encoder 117 may adaptively select an encoding mode that supports a bit rate of 11.0, 8.0, 6.65 or 5.8 kbps. The speech encoder 117 adaptively selects an either 8.0, 6.65, 5.8 or 4.5 kbps encoding bit rate mode when only the half rate channel has been allocated. Of course these encoding bit rates and the aforementioned channel allocations are only representative of the present embodiment. Other variations to meet the goals of alternate embodiments are contemplated.

With either the full or half rate allocation, the speech encoder 117 attempts to communicate using the highest encoding bit rate mode that the allocated channel will support. If the allocated channel is or becomes noisy or otherwise restrictive to the highest or higher encoding bit rates, the speech encoder 117 adapts by selecting a lower bit rate encoding mode. Similarly, when the communication channel 103 becomes more favorable, the speech encoder 117 adapts by switching to a higher bit rate encoding mode.

With lower bit rate encoding, the speech encoder 117 incorporates various techniques to generate better low bit rate speech reproduction. Many of the techniques applied are based on characteristics of the speech itself. For example, with lower bit rate encoding, the speech encoder 117 classifies noise, unvoiced speech, and voiced speech so that an appropriate modeling scheme corresponding to a particular classification can be selected and implemented. Thus, the speech encoder 117 adaptively selects from among a plurality of modeling schemes those most suited for the current speech. The speech encoder 117 also applies various other techniques to optimize the modeling as set forth in more detail below.

Figure 1B:
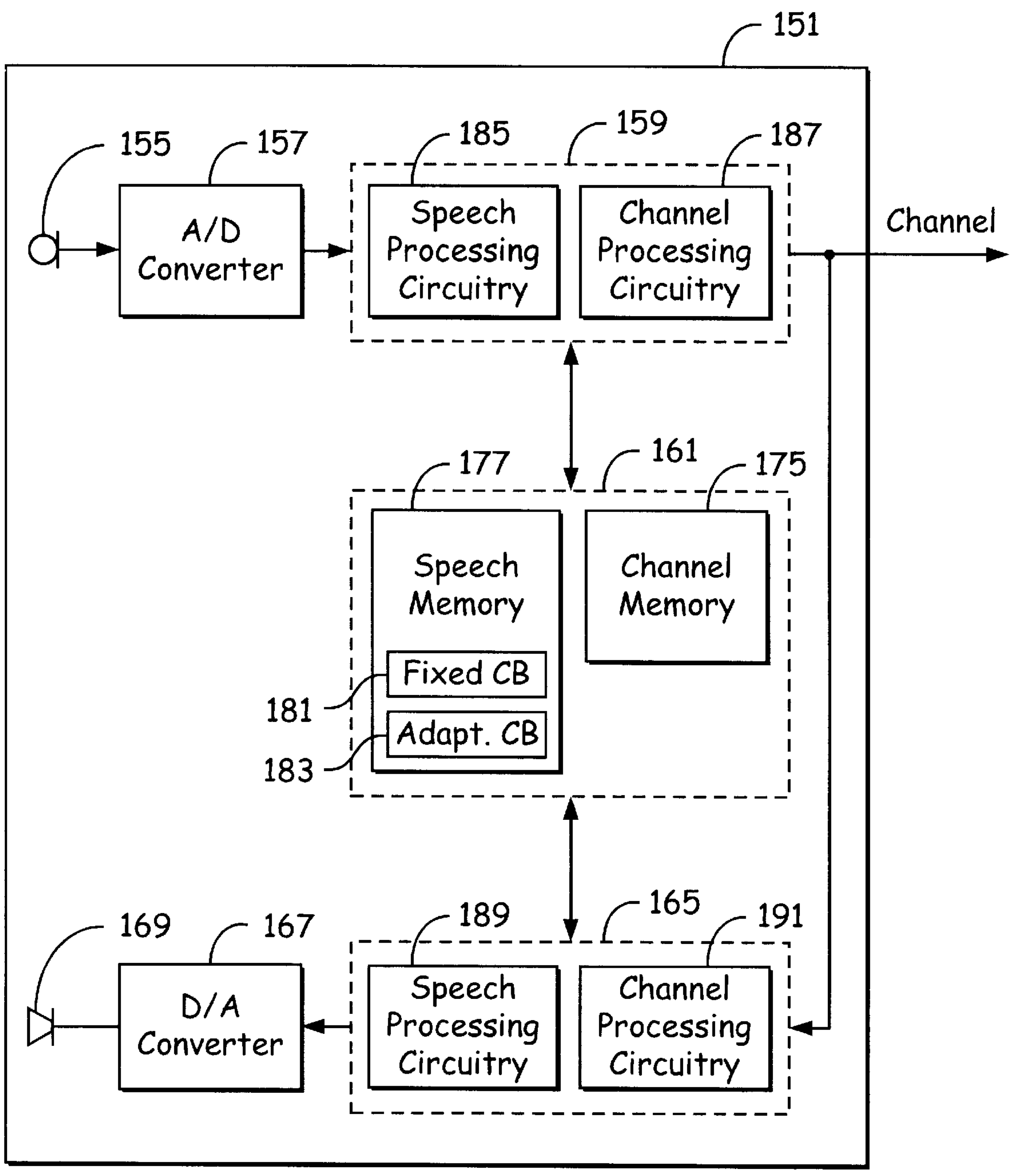
FIG. 1*b* is a schematic block diagram illustrating an exemplary communication device utilizing the source encoding and decoding functionality of FIG. 1*a*.

FIG. 1*b* is a schematic block diagram illustrating several variations of an exemplary communication device employing the functionality of FIG. 1*a*. A communication device 151 comprises both a speech encoder and decoder for simultaneous capture and reproduction of speech. Typically within a single housing, the communication device 151 might, for example, comprise a cellular telephone, portable telephone, computing system, etc. Alternatively, with some modification to include for example a memory element to store encoded speech information the communication device 151 might comprise an answering machine, a recorder, voice mail system, etc.

A microphone 155 and an A/D converter 157 coordinate to deliver a digital voice signal to an encoding system 159. The encoding system 159 performs speech and channel encoding and delivers resultant speech information to the channel. The delivered speech information may be destined for another communication device (not shown) at a remote location.

As speech information is received, a decoding system 165 performs channel and speech decoding then coordinates with a D/A converter 167 and a speaker 169 to reproduce something that sounds like the originally captured speech.

The encoding system 159 comprises both a speech processing circuit 185 that performs speech encoding, and a channel processing circuit 187 that performs channel encoding. Similarly, the decoding system 165 comprises a speech processing circuit 189 that performs speech decoding, and a channel processing circuit 191 that performs channel decoding.

Although the speech processing circuit 185 and the channel processing circuit 187 are separately illustrated, they might be combined in part or in total into a single unit. For example, the speech processing circuit 185 and the channel processing circuitry 187 might share a single DSP (digital signal processor) and/or other processing circuitry. Similarly, the speech processing circuit 189 and the channel processing circuit 191 might be entirely separate or combined in part or in whole. Moreover, combinations in whole or in part might be applied to the speech processing circuits 185 and 189, the channel processing circuits 187 and 191, the processing circuits 185, 187, 189 and 191, or otherwise.

The encoding system 159 and the decoding system 165 both utilize a memory 161. The speech processing circuit 185 utilizes a fixed codebook 181 and an adaptive codebook 183 of a speech memory 177 in the source encoding process. The channel processing circuit 187 utilizes a channel memory 175 to perform channel encoding. Similarly, the speech processing circuit 189 utilizes the fixed codebook 181 and the adaptive codebook 183 in the source decoding process. The channel processing circuit 191 utilizes the channel memory 175 to perform channel decoding.

Although the speech memory 177 is shared as illustrated, separate copies thereof can be assigned for the processing circuits 185 and 189. Likewise, separate channel memory can be allocated to both the processing circuits 187 and 191. The memory 161 also contains software utilized by the processing circuits 185,187,189 and 191 to perform various functionality required in the source and channel encoding and decoding processes.

Figure 2:
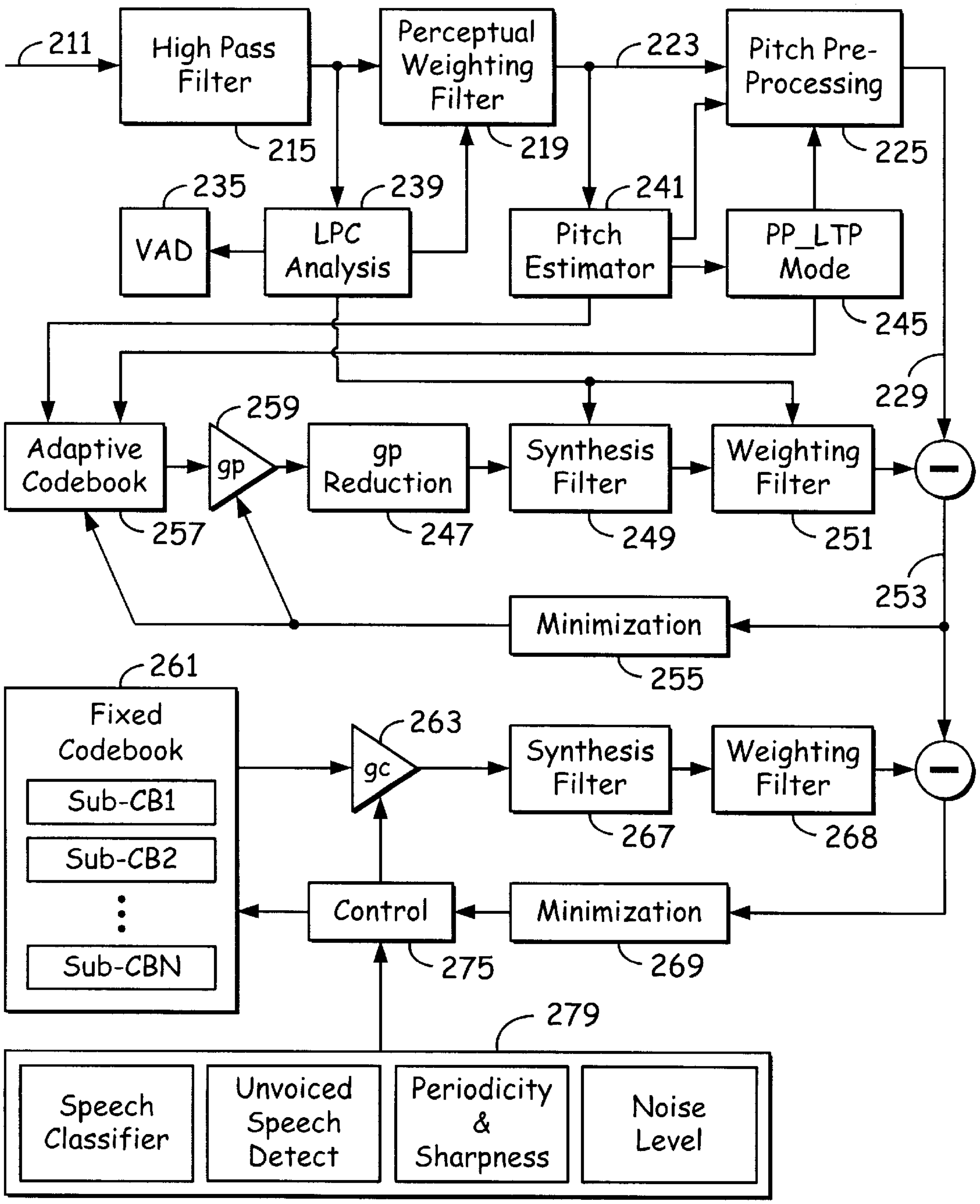
FIGS. 2–4 are functional block diagrams illustrating a multi-step encoding approach used by one embodiment of the speech encoder illustrated in FIGS. 1*a* and 1*b*. In particular.
Figure 3:
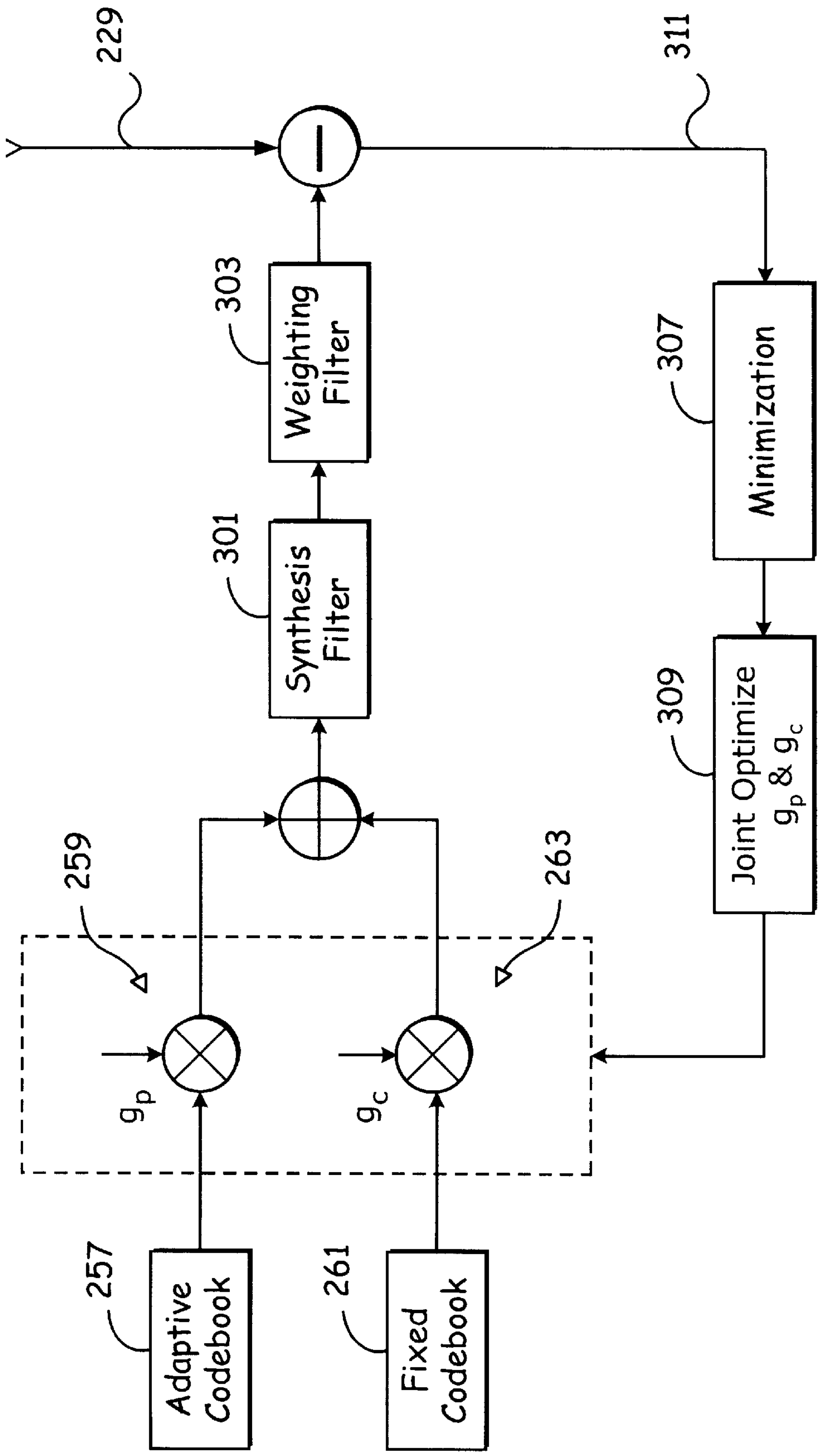
Figure 4:
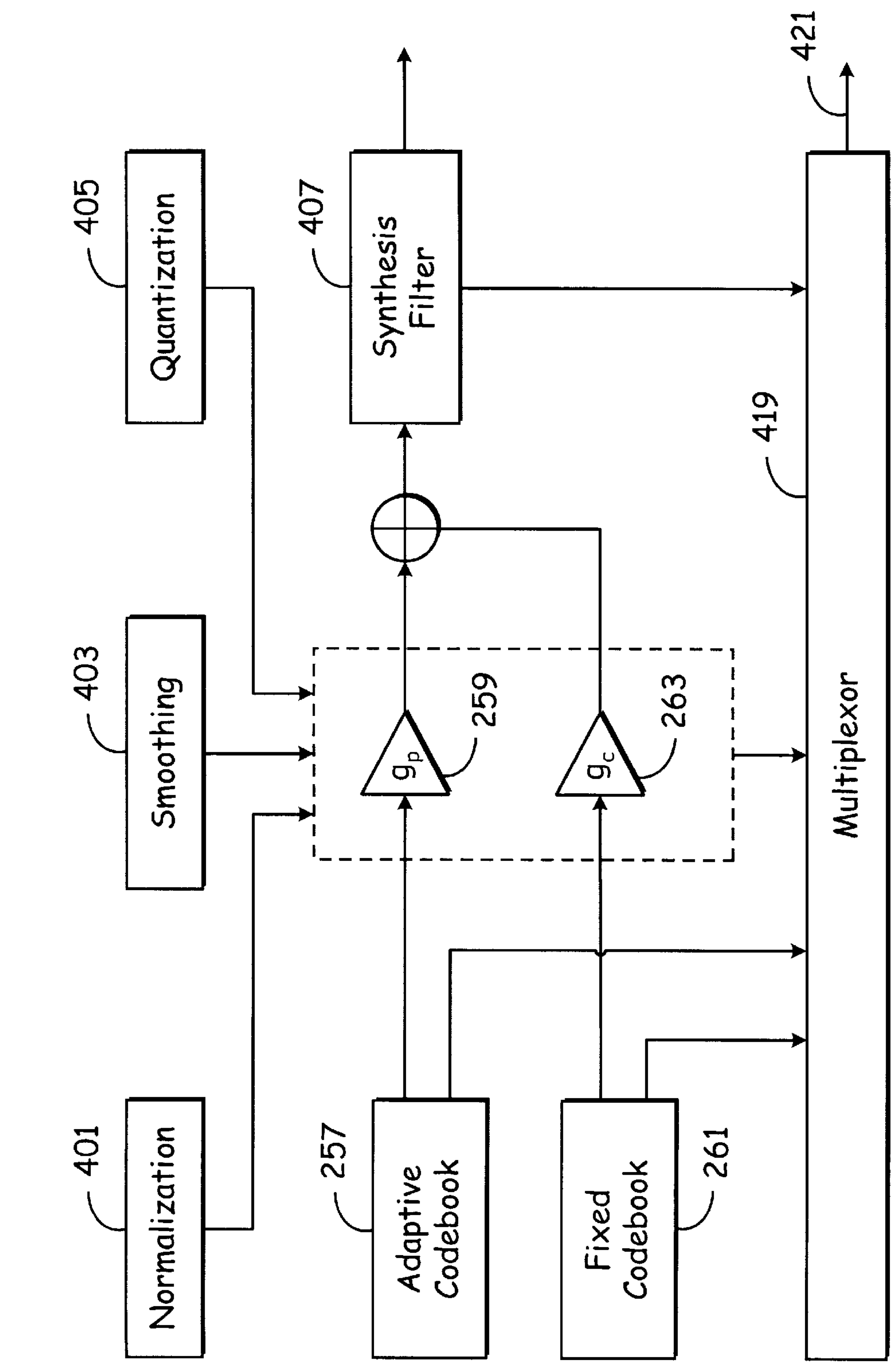

FIGS. 2–4 are functional block diagrams illustrating a multi-step encoding approach used by one embodiment of the speech encoder illustrated in FIGS. 1*a* and 1*b*. In particular, FIG. 2 is a functional block diagram illustrating of a first stage of operations performed by one embodiment of the speech encoder shown in FIGS. 1*a* and 1*b*. The speech encoder, which comprises encoder processing circuitry, typically operates pursuant to software instruction carrying out the following functionality.

At a block 215, source encoder processing circuitry performs high pass filtering of a speech signal 211. The filter uses a cutoff frequency of around 80 Hz to remove, for example, 60 Hz power line noise and other lower frequency signals. After such filtering, the source encoder processing circuitry applies a perceptual weighting filter as represented by a block 219. The perceptual weighting filter operates to emphasize the valley areas of the filtered speech signal.

If the encoder processing circuitry selects operation in a pitch preprocessing (PP) mode as indicated at a control block 245, a pitch preprocessing operation is performed on the weighted speech signal at a block 225. The pitch preprocessing operation involves warping the weighted speech signal to match interpolated pitch values that will be generated by the decoder processing circuitry. When pitch preprocessing is applied, the warped speech signal is designated a first target signal 229. If pitch preprocessing is not selected the control block 245, the weighted speech signal passes through the block 225 without pitch preprocessing and is designated the first target signal 229.

As represented by a block 255, the encoder processing circuitry applies a process wherein a contribution from an adaptive codebook 257 is selected along with a corresponding gain 257 which minimize a first error signal 253. The first error signal 253 comprises the difference between the first target signal 229 and a weighted, synthesized contribution from the adaptive codebook 257.

At blocks 247, 249 and 251, the resultant excitation vector is applied after adaptive gain reduction to both a synthesis and a weighting filter to generate a modeled signal that best matches the first target signal 229. The encoder processing circuitry uses LPC (linear predictive coding) analysis, as indicated by a block 239, to generate filter parameters for the synthesis and weighting filters. The weighting filters 219 and 251 are equivalent in functionality.

Next, the encoder processing circuitry designates the first error signal 253 as a second target signal for matching using contributions from a fixed codebook 261. The encoder processing circuitry searches through at least one of the plurality of subcodebooks within the fixed codebook 261 in an attempt to select a most appropriate contribution while generally attempting to match the second target signal.

More specifically, the encoder processing circuitry selects an excitation vector, its corresponding subcodebook and gain based on a variety of factors. For example, the encoding bit rate, the degree of minimization, and characteristics of the speech itself as represented by a block 279 are considered by the encoder processing circuitry at control block 275. Although many other factors may be considered, exemplary characteristics include speech classification, noise level, sharpness, periodicity, etc. Thus, by considering other such factors, a first subcodebook with its best excitation vector may be selected rather than a second subcodebook's best excitation vector even though the second subcodebook's better minimizes the second target signal 265.

FIG. 3 is a functional block diagram depicting of a second stage of operations performed by the embodiment of the speech encoder illustrated in FIG. 2. In the second stage, the speech encoding circuitry simultaneously uses both the adaptive and the fixed codebook vectors found in the first stage of operations to minimize a third error signal 311.

The speech encoding circuitry searches for optimum gain values for the previously identified excitation vectors (in the first stage) from both the adaptive and fixed codebooks 257 and 261. As indicated by blocks 307 and 309, the speech encoding circuitry identifies the optimum gain by generating a synthesized and weighted signal, i.e., via a block 301 and 303, that best matches the first target signal 229 (which minimizes the third error signal 311). Of course if processing capabilities permit, the first and second stages could be combined wherein joint optimization of both gain and adaptive and fixed codebook rector selection could be used.

FIG. 4 is a functional block diagram depicting of a third stage of operations performed by the embodiment of the speech encoder illustrated in FIGS. 2 and 3. The encoder processing circuitry applies gain normalization, smoothing and quantization, as represented by blocks 401, 403 and 405, respectively, to the jointly optimized gains identified in the second stage of encoder processing. Again, the adaptive and fixed codebook vectors used are those identified in the first stage processing.

With normalization, smoothing and quantization functionally applied, the encoder processing circuitry has completed the modeling process. Therefore, the modeling parameters identified are communicated to the decoder. In particular, the encoder processing circuitry delivers an index to the selected adaptive codebook vector to the channel encoder via a multiplexor 419. Similarly, the encoder processing circuitry delivers the index to the selected fixed codebook vector, resultant gains, synthesis filter parameters, etc., to the muliplexor 419. The multiplexor 419 generates a bit stream 421 of such information for delivery to the channel encoder for communication to the channel and speech decoder of receiving device.

Figure 5:
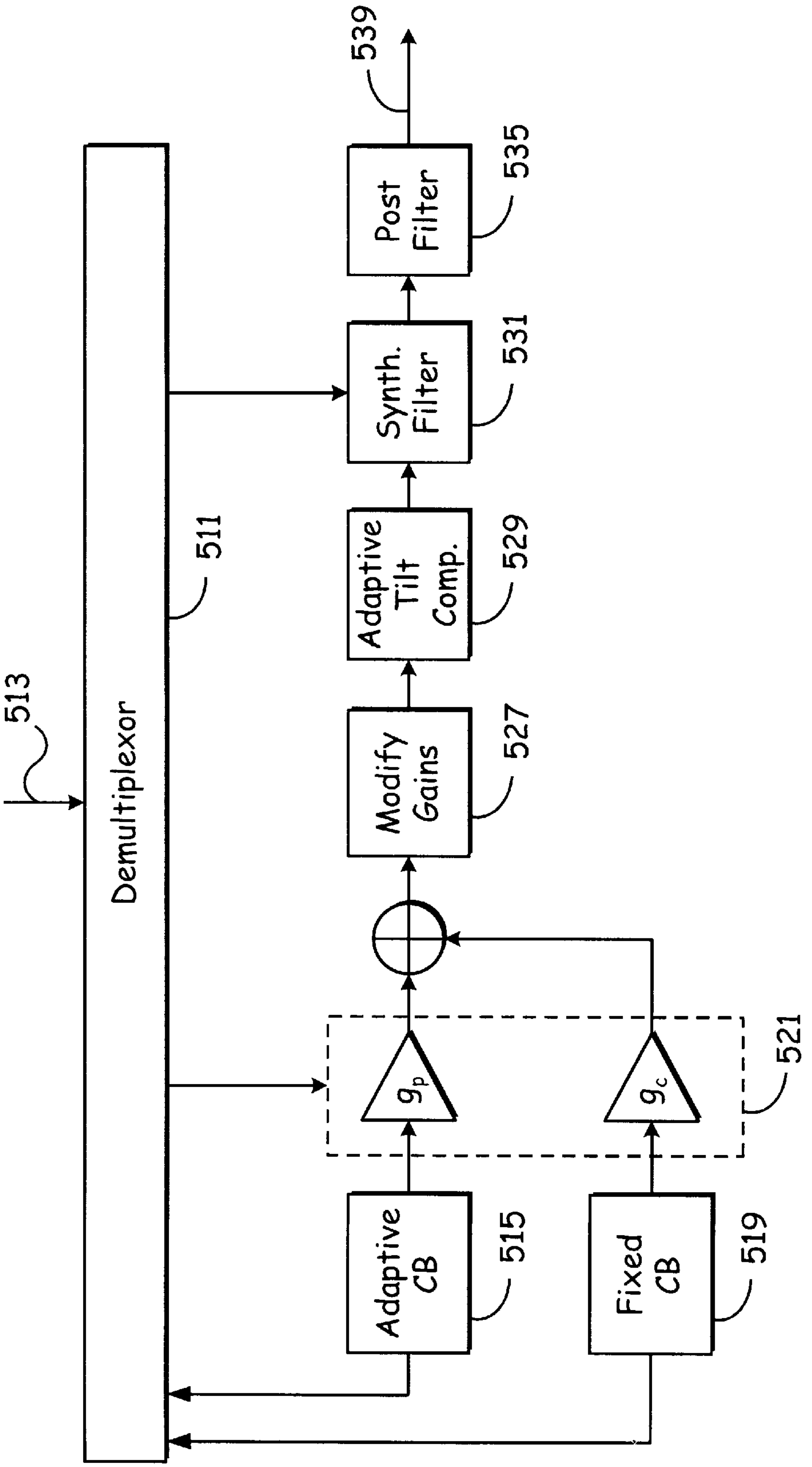
FIG. 5 is a block diagram of one embodiment of the speech decoder shown in FIGS. 1*a* and 1*b* having corresponding functionality to that illustrated in FIGS. 2–4.

FIG. 5 is a block diagram of an embodiment illustrating functionality of speech decoder having corresponding functionality to that illustrated in FIGS. 2–4. As with the speech encoder, the speech decoder, which comprises decoder processing circuitry, typically operates pursuant to software instruction carrying out the following functionality.

A demultiplexor 511 receives a bit stream 513 of speech modeling indices from an often remote encoder via a channel decoder. As previously discussed, the encoder selected each index value during the multi-stage encoding process described above in reference to FIGS. 2–4. The decoder processing circuitry utilizes indices, for example, to select excitation vectors from an adaptive codebook 515 and a fixed codebook 519, set the adaptive and fixed codebook gains at a block 521, and set the parameters for a synthesis filter 531.

With such parameters and vectors selected or set, the decoder processing circuitry generates a reproduced speech signal 539. In particular, the codebooks 515 and 519 generate excitation vectors identified by the indices from the demultiplexor 511. The decoder processing circuitry applies the indexed gains at the block 521 to the vectors which are summed. At a block 527, the decoder processing circuitry modifies the gains to emphasize the contribution of vector from the adaptive codebook 515. At a block 529, adaptive tilt compensation is applied to the combined vectors with a goal of flattening the excitation spectrum. The decoder processing circuitry performs synthesis filtering at the block 531 using the flattened excitation signal. Finally, to generate the reproduced speech signal 539, post filtering is applied at a block 535 deemphasizing the valley areas of the reproduced speech signal 539 to reduce the effect of distortion.

In the exemplary cellular telephony embodiment of the present invention, the A/D converter 115 (FIG. 1*a*) will generally involve analog to uniform digital PCM including: 1) an input level adjustment device; 2) an input anti-aliasing filter; 3) a sample-hold device sampling at 8 kHz; and 4) analog to uniform digital conversion to 13-bit representation.

Similarly, the D/A converter 135 will generally involve uniform digital PCM to analog including: 1) conversion from 13-bit/8 kHz uniform PCM to analog; 2) a hold device; 3) reconstruction filter including x/sin(x) correction; and 4) an output level adjustment device.

In terminal equipment, the A/D function may be achieved by direct conversion to 13-bit uniform PCM format, or by conversion to 8-bit/A-law compounded format. For the D/A operation, the inverse operations take place.

The encoder 117 receives data samples with a resolution of 13 bits left justified in a 16-bit word. The three least significant bits are set to zero. The decoder 133 outputs data in the same format. Outside the speech codec, further processing can be applied to accommodate traffic data having a different representation.

A specific embodiment of an AMR (adaptive multi-rate) codec with the operational functionality illustrated in FIGS. 2–5 uses five source codecs with bit-rates 11.0, 8.0, 6.65, 5.8 and 4.55 kbps. Four of the highest source coding bit-rates are used in the full rate channel and the four lowest bit-rates in the half rate channel.

All five source codecs within the AMR codec are generally based on a code-excited linear predictive (CELP) coding model. A 10th order linear prediction (LP), or short-term, synthesis filter, e.g., used at the blocks 249, 267, 301, 407 and 531 (of FIGS. 2–5), is used which is given by:

$$H(z) = \frac{1}{\hat{A}(z)} = \frac{1}{1 + \sum_{i=1}^{m} \hat{a}_i z^{-i}}, \tag{1}$$

where $\hat{a}_i$, i=1, . . . , m, are the (quantized) linear prediction (LP) parameters.

A long-term filter, i.e., the pitch synthesis filter, is implemented using either an adaptive codebook approach or a pitch pre-processing approach. The pitch synthesis filter is given by:

$$\frac{1}{B(z)} = \frac{1}{1 - g_p z^{-T}}, \tag{2}$$

where T is the pitch delay and $g_p$ is the pitch gain.

With reference to FIG. 2, the excitation signal at the input of the short-term LP synthesis filter at the block 249 is constructed by adding two excitation vectors from the adaptive and the fixed codebooks 257 and 261, respectively. The speech is synthesized by feeding the two properly chosen vectors from these codebooks through the short-term synthesis filter at the block 249 and 267, respectively.

The optimum excitation sequence in a codebook is chosen using an analysis-by-synthesis search procedure in which the error between the original and synthesized speech is minimized according to a perceptually weighted distortion measure. The perceptual weighting filter, e.g., at the blocks 251 and 268, used in the analysis-by-synthesis search technique is given by:

$$W(z) = \frac{A(z/\gamma_1)}{A(z/\gamma_2)}, \tag{3}$$

where A(z) is the unquantized LP filter and $0<\gamma_2<\gamma_1\leqq 1$ are the perceptual weighting factors. The values $\gamma_1$=[0.9, 0.94] and $\gamma_2$=0.6 are used. The weighting filter, e.g., at the blocks 251 and 268, uses the unquantized LP parameters while the formant synthesis filter, e.g., at the blocks 249 and 267, uses the quantized LP parameters. Both the unquantized and quantized LP parameters are generated at the block 239.

The present encoder embodiment operates on 20 ms (millisecond) speech frames corresponding to 160 samples at the sampling frequency of 8000 samples per second. At each 160 speech samples, the speech signal is analyzed to extract the parameters of the CELP model, i.e., the LP filter coefficients, adaptive and fixed codebook indices and gains. These parameters are encoded and transmitted. At the decoder, these parameters are decoded and speech is synthesized by filtering the reconstructed excitation signal through the LP synthesis filter.

More specifically, LP analysis at the block 239 is performed twice per frame but only a single set of LP parameters is converted to line spectrum frequencies (LSF) and vector quantized using predictive multi-stage quantization (PMVQ). The speech frame is divided into subframes. Parameters from the adaptive and fixed codebooks 257 and 261 are transmitted every subframe. The quantized and unquantized LP parameters or their interpolated versions are used depending on the subframe. An open-loop pitch lag is estimated at the block 241 once or twice per frame for PP mode or LTP mode, respectively.

Each subframe, at least the following operations are repeated. First, the encoder processing circuitry (operating pursuant to software instruction) computes x(n), the first target signal 229, by filtering the LP residual through the weighted synthesis filter W(z)H(z) with the initial states of the filters having been updated by filtering the error between LP residual and excitation. This is equivalent to an alternate approach of subtracting the zero input response of the weighted synthesis filter from the weighted speech signal.

Second, the encoder processing circuitry computes the impulse response, h(n), of the weighted synthesis filter. Third, in the LTP mode, closed-loop pitch analysis is performed to find the pitch lag and gain, using the first target signal 229, x(n), and impulse response, h(n), by searching around the open-loop pitch lag. Fractional pitch with various sample resolutions are used.

In the PP mode, the input original signal has been pitch-preprocessed to match the interpolated pitch contour, so no closed-loop search is needed. The LTP excitation vector is computed using the interpolated pitch contour and the past synthesized excitation.

Fourth, the encoder processing circuitry generates a new target signal $x_2(n)$, the second target signal 253, by removing the adaptive codebook contribution (filtered adaptive code vector) from x(n). The encoder processing circuitry uses the second target signal 253 in the fixed codebook search to find the optimum innovation.

Fifth, for the 11.0 kbps bit rate mode, the gains of the adaptive and fixed codebook are scalar quantized with 4 and 5 bits respectively (with moving average prediction applied to the fixed codebook gain). For the other modes the gains of the adaptive and fixed codebook are vector quantized (with moving average prediction applied to the fixed codebook gain).

Finally, the filter memories are updated using the determined excitation signal for finding the first target signal in the next subframe.

The bit allocation of the AMR codec modes is shown in table 1. For example, for each 20 ms speech frame, 220, 160, 133, 116 or 91 bits are produced, corresponding to bit rates of 11.0, 8.0, 6.65, 5.8 or 4.55 kbps, respectively.

TABLE 1

Bit allocation of the AMR coding algorithm for 20 ms frame

| CODING RATE | 11.0 KBPS | 8.0 KBPS | 6.65 KBPS | | 5.80 KBPS | 4.55 KBPS |
|---|---|---|---|---|---|---|
| Frame size | | | 20 ms | | | |
| Look ahead | | | 5 ms | | | |
| LPC order | | | $10^{th}$-order | | | |
| Predictor for LSF Quantization | | 1 predictor: 0 bit/frame | | | | 2 predictors: 1 bit/frame |
| LSF Quantization | 28 bit/frame | | 24 bit/frame | | | 18 |
| LPC interpolation | 2 bits/frame | 2 bits/f 0 | 2 bits/f | 0 | 0 | 0 |
| Coding mode bit | 0 bit | 0 bit | 1 bit/frame | | 0 bit | 0 bit |
| Pitch mode | LTP | LTP | LTP | PP | PP | PP |
| Subframe size | | | 5 ms | | | |
| Pitch Lag | 30 bits/frame (9696) | 8585 | 8585 | 0008 | 0008 | 0008 |
| Fixed excitation | 31 bits/subframe | 20 | 13 | 18 | 14 bits/subframe | 10 bits/subframe |
| Gain quantization | 9 bits (scalar) | | 7 bits/subframe | | | 6 bits/subframe |
| Total | 220 bits/frame | 160 | 133 | 133 | 116 | 91 |

With reference to FIG. 5, the decoder processing circuitry, pursuant to software control, reconstructs the speech signal using the transmitted modeling indices extracted from the received bit stream by the demultiplexor 511. The decoder processing circuitry decodes the indices to obtain the coder parameters at each transmission frame. These parameters are the LSF vectors, the fractional pitch lags, the innovative code vectors, and the two gains.

The LSF vectors are converted to the LP filter coefficients and interpolated to obtain LP filters at each subframe. At each subframe, the decoder processing circuitry constructs the excitation signal by: 1) identifying the adaptive and innovative code vectors from the codebooks 515 and 519; 2) scaling the contributions by their respective gains at the block 521; 3) summing the scaled contributions; and 3) modifying and applying adaptive tilt compensation at the blocks 527 and 529. The speech signal is also reconstructed on a subframe basis by filtering the excitation through the LP synthesis at the block 531. Finally, the speech signal is passed through an adaptive post filter at the block 535 to generate the reproduced speech signal 539.

The AMR encoder will produce the speech modeling information in a unique sequence and format, and the AMR decoder receives the same information in the same way. The different parameters of the encoded speech and their individual bits have unequal importance with respect to subjective quality. Before being submitted to the channel encoding function the bits are rearranged in the sequence of importance.

Two pre-processing functions are applied prior to the encoding process: high-pass filtering and signal down-scaling. Down-scaling consists of dividing the input by a factor of 2 to reduce the possibility of overflows in the fixed point implementation. The high-pass filtering at the block

215 (FIG. 2) serves as a precaution against undesired low frequency components. A filter with cut off frequency of 80 Hz is used, and it is given by:

$$H_{hl}(z)=\frac{0.92727435-1.8544941z^{-1}+0.92727435z^{-2}}{1-1.9059465z^{-1}+0.9114024z^{-2}}$$

Down scaling and high-pass filtering are combined by dividing the coefficients of the numerator of $H_{hl}(z)$ by 2.

Short-term prediction, or linear prediction (LP) analysis is performed twice per speech frame using the autocorrelation approach with 30 ms windows. Specifically, two LP analyses are performed twice per frame using two different windows. In the first LP analysis (LP_analysis_1), a hybrid window is used which has its weight concentrated at the fourth subframe. The hybrid window consists of two parts. The first part is half a Hamming window, and the second part is a quarter of a cosine cycle. The window is given by:

$$w_1(n)=\begin{cases}0.54-0.46\cos\left(\frac{\pi n}{L}\right), & n=0 \text{ to } 214,\ L=215\\ \cos\left(\frac{0.49(n-L)\pi}{25}\right), & n=215 \text{ to } 239\end{cases}$$

In the second LP analysis (LP_analysis_2), a symmetric Hamming window is used.

$$w_2(n)=\begin{cases}0.54-0.46\cos\left(\frac{\pi n}{L}\right) & n=0 \text{ to } 119,\ L=120\\ 0.54+0.46\cos\left(\frac{(n-L)\pi}{120}\right), & n=120 \text{ to } 239\end{cases}$$

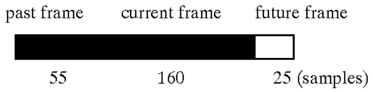

In either LP analysis, the autocorrelations of the windowed speech s (n),n=0,239 are computed by:

$$r(k)=\sum_{n=k}^{239}s(n)s(n-k),\ k=0,10.$$

A 60 Hz bandwidth expansion is used by lag windowing, the autocorrelations using the window:

$$w_{lag}(i)=\exp\left[-\frac{1}{2}\left(\frac{2\pi 60i}{8000}\right)^2\right],\ i=1,10.$$

Moreover, r(0) is multiplied by a white noise correction factor 1.0001 which is equivalent to adding a noise floor at −40 dB.

The modified autocorrelations r(0)=1.0001r(0) and r(k)=r(k)$w_{lag}$(k), k=1,10 are used to obtain the reflection coefficients $k_i$ and LP filter coefficients $a_i$, i=1,10 using the Levinson-Durbin algorithm. Furthermore, the LP filter coefficients $a_i$ are used to obtain the Line Spectral Frequencies (LSFs).

The interpolated unquantized LP parameters are obtained by interpolating the LSF coefficients obtained from the LP analysis_1 and those from LP_analysis_2 as:

$$q_1(n)=0.5q_4(n-1)+0.5q_2(n)$$

$$q_3(n)=0.5q_2(n)+0.5q_4(n)$$

where $q_1$ (n) is the interpolated LSF for subframe 1, $q_2$(n) is the LSF of subframe 2 obtained from LP_analysis_2 of current frame, $q_3$(n) is the interpolated LSF for subframe 3, $q_4$(n−1) is the LSF (cosine domain) from LP_analysis_1 of previous frame, and $q_4$(n) is the LSF for subframe 4 obtained from LP_analysis_1 of current frame. The interpolation is carried out in the cosine domain.

A VAD (Voice Activity Detection) algorithm is used to classify input speech frames into either active voice or inactive voice frame (background noise or silence) at a block 235 (FIG. 2).

The input speech s(n) is used to obtain a weighted speech signal $s_w$(n) by passing s(n) through a filter:

$$W(z)=\frac{A\left(\frac{z}{\gamma 1}\right)}{A\left(\frac{z}{\gamma 2}\right)}.$$

That is, in a subframe of size L_SF, the weighted speech is given by:

$$s_w(n)=s(n)+\sum_{i=1}^{10}a_i\gamma_1^i s(n-i)-\sum_{i=1}^{10}a_i\gamma_2^i s_w(n-i),$$

$$n=0,\text{L\_SF}-1.$$

A voiced/unvoiced classification and mode decision within the block 279 using the input speech s(n) and the residual $r_w$(n) is derived where:

$$r_w=s(n)+\sum_{i=1}^{10}a_i\gamma_1^i s(n-i),\ n=0,\text{L\_SF}-1.$$

The classification is based on four measures: 1) speech sharpness P1_SHP; 2) normalized one delay correlation P2_R1; 3) normalized zero-crossing rate P3_ZC; and 4) normalized LP residual energy P4_RE.

The speech sharpness is given by:

$$P1\_SHP=\frac{\sum_{n=0}^{L}\text{abs}(r_w(n))}{\text{Max}L},$$

where Max is the maximum of abs($r_w$(n)) over the specified interval of length L. The normalized one delay correlation and normalized zero-crossing rate are given by:

$$P2\_R1=\frac{\sum_{n=0}^{L-1}s(n)s(n+1)}{\sqrt{\sum_{n=0}^{L-1}s(n)s(n)\sum_{n=0}^{L-1}s(n+1)s(n+1)}}$$

$$P3\_ZC=\frac{1}{2L}\sum_{i=0}^{L-1}[|\text{sgn}[s(i)]-\text{sgn}[s(i-1)]|],$$

where sgn is the sign function whose output is either 1 or −1 depending that the input sample is positive or negative. Finally, the normalized LP residual energy is given by:

$$P4\_RE=1-\sqrt{lpc\_gain}$$

where $$lpc\_gain = \prod_{i=1}^{10}(1-k_i^2),$$

where $k_i$ are the reflection coefficients obtained from LP analysis_1.

The voiced/unvoiced decision is derived if the following conditions are met:

if P2_R1<0.6 and P1_SHP>0.2 set mode=2,
if P3_ZC>0.4 and P1_SHP>0.18 set mode=2,
if P4_RE<0.4 and P1_SHP>0.2 set mode=2,
if (P2_R1<−1.2+3.2P1_SHP) set VUV=−3
if (P4_RE<−0.21+1.4286P1_SHP) set VUV=−3
if (P3_ZC>0.8−0.6P1_SHP) set VUV=−3
if (P4_RE<0.1) set VUV=−3

Open loop pitch analysis is performed once or twice (each 10 ms) per frame depending on the coding rate in order to find estimates of the pitch lag at the block 241 (FIG. 2). It is based on the weighted speech signal $s_w(n+n_m)$,n=0,1, . . . ,79, in which $n_m$ defines the location of this signal on the first half frame or the last half frame. In the first step, four maxima of the correlation:

$$C_k = \sum_{n=0}^{79} s_w(n_m+n)s_w(n_m+n-k)$$

are found in the four ranges 17 . . . 33, 34 . . . 67, 68 . . . 135, 136 . . . 145, respectively. The retained maxima $C_{k_i}$, i=1,2, 3,4, are normalized by dividing by:

$$\sqrt{\sum_n s_w^2(n_m+n-k)}\ ,\ i=1,\ \ldots\ ,4,\text{ respectively.}$$

The normalized maxima and corresponding delays are denoted by $(R_i,k_i)$,i=1,2,3,4.

In the second step, a delay, $k_I$, among the four candidates, is selected by maximizing the four normalized correlations. In the third step, $k_I$ is probably corrected to $k_i$(i<I) by favoring the lower ranges. That is, $k_i$(i<I) is selected if $k_i$ is within $[k_I/m-4,\ k_I/m+4]$,m=2,3,4,5, and if $k_i>k_I\ 0.95^{I-i}$ D, i<I, where D is 1.0, 0.85, or 0.65, depending on whether the previous frame is unvoiced, the previous frame is voiced and $k_i$ is in the neighborhood (specified by ±8) of the previous pitch lag, or the previous two frames are voiced and $k_i$ is in the neighborhood of the previous two pitch lags. The final selected pitch lag is denoted by $T_{op}$.

A decision is made every frame to either operate the LTP (long-term prediction) as the traditional CELP approach (LTP_mode=1), or as a modified time warping approach (LTP_mode=0) herein referred to as PP (pitch preprocessing). For 4.55 and 5.8 kbps encoding bit rates, LTP_mode is set to 0 at all times. For 8.0 and 11.0 kbps, LTP_mode is set to 1 all of the time. Whereas, for a 6.65 kbps encoding bit rate, the encoder decides whether to operate in the LTP or PP mode. During the PP mode, only one pitch lag is transmitted per coding frame.

For 6.65 kbps, the decision algorithm is as follows. First, at the block 241, a prediction of the pitch lag pit for the current frame is determined as follows:

$$\begin{aligned}&if(LTP\_MODE\_m=1)\\&\quad pit = lagl1+2.4*(lag\_f[3]-lagl1);\\&else\\&\quad pit = lag\_f[1]+2.75*(lag\_f[3]-lag\_f[1]);\end{aligned}$$

where LTP_mode_m is previous frame LTP_mode, lag_f[1],lag_f[3] are the past closed loop pitch lags for second and fourth subframes respectively, lagl is the current frame open-loop pitch lag at the second half of the frame, and, lagl1 is the previous frame open-loop pitch lag at the first half of the frame.

Second, a normalized spectrum difference between the Line Spectrum Frequencies (LSF) of current and previous frame is computed as:

$$e\_lsf = \frac{1}{10}\sum_{i=0}^{9} abs(LSF(i)-LSF\_m(i)),$$

$$\begin{aligned}&if(abs(pit\text{-}lagl) < TH\ and\ abs(lag\_f[3]\text{-}lagl) < lagl*0.2)\\&\quad if(Rp>0.5\ \&\&\ pgain\_past>0.7\ and\ e\_lsf<0.5/30)LTP\_\text{mode}=0;\\&else\ LTP\_\text{mode}=1;\end{aligned}$$

where Rp is current frame normalized pitch correlation, pgain_past is the quantized pitch gain from the fourth subframe of the past frame, TH=MIN(lagl*0.1, 5), and TH=MAX(2.0, TH).

The estimation of the precise pitch lag at the end of the frame is based on the normalized correlation:

$$R_k = \frac{\sum_{n=0}^{L} s_w(n+nl)s_w(n+nl-k)}{\sqrt{\sum_{n=0}^{L} s_w^2(n+nl-k)}},$$

where $S_w$(n+n1), n=0,1, . . . , L−1, represents the last segment of the weighted speech signal including the look-ahead (the look-ahead length is 25 samples), and the size L is defined according to the open-loop pitch lag $T_{op}$ with the corresponding normalized correlation $C_{T_{op}}$:

$$\begin{aligned}&if(C_{T_{op}}>0.6)\\&\quad L=max\{50,\ T_{op}\}\\&\quad \text{L} = \min\{80,\ \text{L}\}\end{aligned}$$

-continued

*else*

$L = 80$

In the first step, one integer lag k is selected maximizing the $R_k$ in the range $k\in[T_{op}-10, T_{op}+10]$ bounded by [17, 145]. Then, the precise pitch lag $P_m$ and the corresponding index $I_m$ for the current frame is searched around the integer lag, [k−1, k+1], by up-sampling $R_k$.

The possible candidates of the precise pitch lag are obtained from the table named as PitLagTab8b[i], i=0,1, . . . ,127. In the last step, the precise pitch lag $P_m$=PitLagTab8b[$I_m$] is possibly modified by checking the accumulated delay $\tau_{acc}$ due to the modification of the speech signal:

$$\text{if } (\tau_{acc}>5) I_m \Leftarrow \min\{I_m+1,127\}, \text{ and}$$

$$\text{if } (\tau_{acc}<-5) I_m \Leftarrow \max\{I_m-1,0\}.$$

The precise pitch lag could be modified again:

$$\text{if } (\tau_{acc}>10) I_m \Leftarrow \min\{I_m+1,127\}, \text{ and}$$

$$\text{if} (\tau_{acc}<-10) I_m \Leftarrow \max\{I_m-1,0\}.$$

The obtained index $I_m$ will be sent to the decoder.

The pitch lag contour, $\tau_c(n)$, is defined using both the current lag $P_m$ and the previous lag $P_{m-1}$:

$$\textit{if}\,(|P_m - P_{m-1}| < 0.2 \min\{P_m, P_{m-1}\})$$

$$\tau_c(n) = P_{m-1} + n(P_m - P_{m-1})/L_f,\ n = 0, 1, \dots, L_f - 1$$

$$\tau_c(n) = P_m,\ n = L_f, \dots, 170$$

*else*

$$\tau_c(n) = P_{m-1},\ n = 0, 1, \dots, 39;$$

$$\tau_c(n) = P_m,\ n = 40, \dots, 170$$

where $L_f$=160 is the frame size.

One frame is divided into 3 subframes for the long-term preprocessing. For the first two subframes, the subframe size, $L_s$, is 53, and the subframe size for searching, $L_{sr}$, is 70. For the last subframe, $L_s$ is 54 and $L_{sr}$ is:

$$L_{sr}=\min\{70, L_s+L_{khd}-10-\tau_{acc}\},$$

where $L_{khd}$=25 is the look-ahead and the maximum of the accumulated delay $\tau_{acc}$ is limited to 14.

The target for the modification process of the weighted speech temporally memorized in $\{\hat{s}_w(m0+n), n=0,1, \dots, L_{sr}-1\}$ is calculated by warping the past modified weighted speech buffer, $\hat{s}_w(m0+n)$, n<0, with the pitch lag contour, $\tau_c(n+m\cdot L_s)$, m=0,1,2, $$\hat{s}_w = (m0+n) = \sum_{i=-f_l}^{f_l} \hat{s}_w(m0+n-T_c(n)+i) I_s(i, T_{IC}(n)),$$

$$n = 0, 1, \dots, L_{sr}-1,$$

where $T_C(n)$ and $T_{IC}(n)$ are calculated by:

$$T_c(n)=\text{trunc}\{\tau_c(n+m\cdot L_s)\},$$

$$T_{IC}(n)=\tau_c(n)-T_C(n),$$

m is subframe number, $I_s(i,T_{IC}(n))$ is a set of interpolation coefficients, and $f_l$ is 10. Then, the target for matching, $\hat{s}_t(n)$, n=0,1, . . . , $L_{sr}-1$, is calculated by weighting $$\hat{s}_w(m0+n),$$

n=0,1, . . . , $L_{sr}-1$, in the time domain:

$$\hat{s}_t(n)=n\cdot\hat{s}_w(m0+n)/L_s,$$

n=0,1, . . . , $L_s-1$, $$\hat{s}_t(n)=\hat{s}_w(m0+n),$$

n=$L_s$, . . . , $L_{sr}-1$

The local integer shifting range [SR0, SR1] for searching for the best local delay is computed as the following:

if speech is unvoiced
SR0=−1,
SR1=1,
else
SR0=round{−4 min{1.0, max{0.0 , 1−0.4 ($P_{sh}$−0.2)}}},
SR1=round{4 min{1.0, max{0.0, 1−0.4 ($P_{sh}$−0.2)}}}, where $P_{sh}=\max\{P_{sh1}, P_{sh2}\}$, $P_{sh1}$ is the average to peak ratio (i.e., sharpness) from the target signal:

$$P_{sh1} = \frac{\sum_{n=0}^{L_{sr}-1} |\hat{s}_w(m0+n)|}{L_{sr}\max\{|\hat{s}_w(m0+n)|, n = 0, 1, \dots, L_{sr}-1\}}$$

and $P_{sh2}$ is the sharpness from the weighted speech signal:

$$P_{sh2} = \frac{\sum_{n=0}^{L_{sr}-L_s/2-1} |s_w(n+n0+L_s/2)|}{(L_{sr}-L_s/2)\max\{|s_w(n+n0+L_s/2)|,\ n = 0, 1, \dots, L_{sr}-L_s/2-1\}}$$

where n0=trunc{m0+$\tau_{acc}$+0.5} (here, m is subframe number and $\tau_{acc}$ is the previous accumulated delay).

In order to find the best local delay, $\tau_{opt}$, at the end of the current processing subframe, a normalized correlation vector between the original weighted speech signal and the modified matching target is defined as:

$$R_I(k) = \frac{\sum_{n=0}^{L_{sr}-1} s_w(n0+n+k)\hat{s}_t(n)}{\sqrt{\sum_{n=0}^{L_{sr}-1} s_w^2(n0+n+k) \sum_{n=0}^{L_{sr}-1} \hat{s}_t^2(n)}}$$

A best local delay in the integer domain, $k_{opt}$, is selected by maximizing $R_I(k)$ in the range of $k\in[SR0,SR1]$, which is corresponding to the real delay:

$$k_r=k_{opt}+n0-m0-\tau_{acc}$$

If $R_I(k_{opt})$<0.5, $k_r$ is set to zero.

In order to get a more precise local delay in the range $\{k_r-0.75+0.1j, j=0,1, \dots 15\}$ around $k_r$, $R_I(k)$ is interpolated to obtain the fractional correlation vector, $R_f(j)$, by:

$$R_f(j) = \sum_{i=-7}^{8} R_I(k_{opt} + I_j + i) I_f(i, j),\ j = 0, 1, \ldots, 15,$$

where $\{I_f(i,j)\}$ is a set of interpolation coefficients. The optimal fractional delay index, $j_{opt}$, is selected by maximizing $R_f(j)$. Finally, the best local delay, $\tau_{opt}$, at the end of the current processing subframe, is given by, $$\tau_{opt} = k_r - 0.75 + 0.1 j_{opt}$$

The local delay is then adjusted by:

$$\tau_{opt} = \begin{cases} 0, & \text{if } \tau_{acc} + \tau_{opt} > 14 \\ \tau_{opt}, & \text{otherwise} \end{cases}$$

The modified weighted speech of the current subframe, memorized in $\{\hat{s}_w(m0+n), n=0,1, \ldots, L_s-1\}$ I to update the buffer and produce the second target signal 253 for searching the fixed codebook 261, is generated by warping the original weighted speech $\{s_w(n)\}$ from the original time region, $$[m0+\tau_{acc},\ m0+\tau_{acc}+L_s+\tau_{opt}],$$

to the modified time region,
$[m0, m0+L_s]$:

$$\hat{s}_w(m0+n) = \sum_{i=-f_l+1}^{f_l} s_w(m0+n+T_W(n)+i) I_s(i, T_{IW}(n)),$$

$$n = 0, 1, \ldots, L_s - 1,$$

where $T_W(n)$ and $T_{IW}(n)$ are calculated by:

$$T_W(n) = \text{trunc}\{\tau_{acc} + n \cdot \tau_{opt}/L_s\},$$

$$T_{IW}(n) = \tau_{acc} + n \cdot \tau_{opt}/L_s - T_W(n),$$

$\{I_s(i,T_{IW}(n))\}$ is a set of interpolation coefficients.

After having completed the modification of the weighted speech for the current subframe, the modified target weighted speech buffer is updated as follows:

$$\hat{s}_w(n) \Leftarrow \hat{s}_w(n+L_s),$$

$n=0,1, \ldots, n_m-1$.

The accumulated delay at the end of the current subframe is renewed by:

$$\tau_{acc} \Leftarrow \tau_{acc} + \tau_{opt}.$$

Prior to quantization the LSFs are smoothed in order to improve the perceptual quality. In principle, no smoothing is applied during speech and segments with rapid variations in the spectral envelope. During non-speech with slow variations in the spectral envelope, smoothing is applied to reduce unwanted spectral variations. Unwanted spectral variations could typically occur due to the estimation of the LPC parameters and LSF quantization. As an example, in stationary noise-like signals with constant spectral envelope introducing even very small variations in the spectral envelope is picked up easily by the human ear and perceived as an annoying modulation.

The smoothing of the LSFs is done as a running mean according to:

$$lsf_i(n) = \beta(n) \cdot lsf_i(n-1) + (1-\beta(n)) \cdot lsf\_est_i(n),\ i=1, \ldots, 10$$

where $lsf\_est_i(n)$ is the $i^{th}$ estimated LSF of frame n, and $lsf_i(n)$ is the $i^{th}$ LSF for quantization of frame n. The parameter $\beta(n)$ controls the amount of smoothing, e.g. if $\beta(n)$ is zero no smoothing is applied.

$\beta(n)$ is calculated from the VAD information (generated at the block 235) and two estimates of the evolution of the spectral envelope. The two estimates of the evolution are defined as:

$$\Delta SP = \sum_{i=1}^{10} (lsf\_est_i(n) - lsf\_est_i(n-1))^2$$

$$\Delta SP_{int} = \sum_{i=1}^{10} (lsf\_est_i(n) - ma\_lsf_i(n-1))^2$$

$$ma\_lsf_i(n) = \beta(n) \cdot ma\_lsf_i(n-1) + (1-\beta(n)) \cdot lsf\_est_i(n),\ i=1, \ldots, 10$$

The parameter $\beta(n)$ is controlled by the following logic:

Step 1:

$if(Vad = 1 | PastVad = 1 | k_1 > 0.5)$ $N_{mode\_frm}(n-1) = 0$ $\beta(n) = 0.0$ $elseif(N_{mode\_frm}(n-1) > 0\ \&\ (\Delta SP > 0.0015 \,|\, \Delta SP_{int} > 0.0024))$ $N_{mode\_frm}(n-1) = 0$ $\beta(n) = 0.0$ $elseif(N_{mode\_frm}(n-1) > 1\ \&\ \Delta SP > 0.0025)$ $N_{mode\_frm}(n-1) = 1$

*endif*

Step 2:

$if(Vad = 0\ \&\ PastVad = 0)$ $N_{mode\_frm}(n) = N_{mode\_frm}(n-1) + 1$ $if(N_{mode\_frm}(n) > 5)$

*endif*

$\beta(n) = \frac{0.9}{16} \cdot (N_{mode\_frm}(n) - 1)^2$

*else*

$N_{mode\_frm}(n) = N_{mode\_frm}(n-1)$

*endif* where $k_1$ is the first reflection coefficient.

In step 1, the encoder processing circuitry checks the VAD and the evolution of the spectral envelope, and performs a full or partial reset of the smoothing if required. In step 2, the encoder processing circuitry updates the counter, $N_{mode\_frm}(n)$, and calculates the smoothing parameter, $\beta(n)$. The parameter $\beta(n)$ varies between 0.0 and 0.9, being 0.0 for speech, music, tonal-like signals, and non-stationary background noise and ramping up towards 0.9 when stationary background noise occurs.

The LSFs are quantized once per 20 ms frame using a predictive multi-stage vector quantization. A minimal spacing of 50 Hz is ensured between each two neighboring LSFs before quantization. A set of weights is calculated from the LSFs, given by $w_i = K|P(f_i)|^{0.4}$ where $f_i$ is the $i^{th}$ LSF value and $P(f_i)$ is the LPC power spectrum at $f_i$ (K is an irrelevant multiplicative constant). The reciprocal of the power spectrum is obtained by (up to a multiplicative constant):

$$P(f_i)^{-1} \sim \begin{cases} (1-\cos(2\pi f_i))\prod_{\text{odd } j}[\cos(2\pi f_i)-\cos(2\pi f_j)]^2 & \text{even } i \\ (1+\cos(2\pi f_i))\prod_{\text{even } j}[\cos(2\pi f_i)-\cos(2\pi f_j)]^2 & \text{odd } i \end{cases}$$

and the power of −0.4 is then calculated using a lookup table and cubic-spline interpolation between table entries.

A vector of mean values is subtracted from the LSFs, and a vector of prediction error vector fe is calculated from the mean removed LSFs vector, using a full-matrix AR(2) predictor. A single predictor is used for the rates 5.8, 6.65, 8.0, and 11.0 kbps coders, and two sets of prediction coefficients are tested as possible predictors for the 4.55 kbps coder.

The vector of prediction error is quantized using a multi-stage VQ, with multi-surviving candidates from each stage to the next stage. The two possible sets of prediction error vectors generated for the 4.55 kbps coder are considered as surviving candidates for the first stage.

The first 4 stages have 64 entries each, and the fifth and last table have 16 entries. The first 3 stages are used for the 4.55 kbps coder, the first 4 stages are used for the 5.8, 6.65 and 8.0 kbps coders, and all 5 stages are used for the 11.0 kbps coder. The following table summarizes the number of bits used for the quantization of the LSFs for each rate.

| | prediction | 1st stage | 2nd stage | 3rd stage | 4th stage | 5th stage | total |
|---|---|---|---|---|---|---|---|
| 4.55 kbps | 1 | 6 | 6 | 6 | | | 19 |
| 5.8 kbps | 0 | 6 | 6 | 6 | 6 | | 24 |
| 6.65 kbps | 0 | 6 | 6 | 6 | 6 | | 24 |
| 8.0 kbps | 0 | 6 | 6 | 6 | 6 | | 24 |
| 11.0 kbps | 0 | 6 | 6 | 6 | 6 | 4 | 28 |

The number of surviving candidates for each stage is summarized in the following table.

| | prediction candidates into the 1st stage | Surviving candidates from the 1st stage | surviving candidates from the 2nd stage | surviving candidates from the 3rd stage | surviving candidates from the 4th stage |
|---|---|---|---|---|---|
| 4.55 kbps | 2 | 10 | 6 | 4 | |
| 5.8 kbps | 1 | 8 | 6 | 4 | |
| 6.65 kbps | 1 | 8 | 8 | 4 | |
| 8.0 kbps | 1 | 8 | 8 | 4 | |
| 11.0 kbps | 1 | 8 | 6 | 4 | 4 |

The quantization in each stage is done by minimizing the weighted distortion measure given by:

$$\varepsilon_k=\sum_{i=0}^{9}(w_i(fe_i-C_i^k))^2.$$

The code vector with index $k_{min}$ which minimizes $\epsilon_k$ such that $\epsilon_{k_{min}}<\epsilon_k$ for all k, is chosen to represent the prediction/quantization error (fe represents in this equation both the initial prediction error to the first stage and the successive quantization error from each stage to the next one).

The final choice of vectors from all of the surviving candidates (and for the 4.55 kbps coder—also the predictor) is done at the end, after the last stage is searched, by choosing a combined set of vectors (and predictor) which minimizes the total error. The contribution from all of the stages is summed to form the quantized prediction error vector, and the quantized prediction error is added to the prediction states and the mean LSFs value to generate the quantized LSFs vector.

For the 4.55 kbps coder, the number of order flips of the LSFs as the result of the quantization is counted, and if the number of flips is more than 1, the LSFs vector is replaced with 0.9·(LSFs of previous frame)+0.1·(mean LSFs value). For all the rates, the quantized LSFs are ordered and spaced with a minimal spacing of 50 Hz.

The interpolation of the quantized LSF is performed in the cosine domain in two ways depending on the LTP_mode. If the LTP_mode is 0, a linear interpolation between the quantized LSF set of the current frame and the quantized LSF set of the previous frame is performed to get the LSF set for the first, second and third subframes as:

$$\bar{q}_1(n)=0.75\bar{q}_4(n-1)+0.25\bar{q}_4(n)$$

$$\bar{q}_2(n)=0.5\bar{q}_4(n-1)+0.5\bar{q}_4(n)$$

$$\bar{q}_3(n)=0.25\bar{q}_4(n-1)+0.75\bar{q}_4(n)$$

where $\bar{q}_4(n-1)$ and $\bar{q}_4(n)$ are the cosines of the quantized LSF sets of the previous and current frames, respectively, and $\bar{q}_1(n)$, $\bar{q}_2(n)$ and $\bar{q}_3(n)$ are the interpolated LSF sets in cosine domain for the first, second and third subframes respectively.

If the LTP_mode is 1, a search of the best interpolation path is performed in order to get the interpolated LSF sets. The search is based on a weighted mean absolute difference between a reference LSF set $r\bar{l}(n)$ and the LSF set obtained from LP analysis_2 $\bar{l}(n)$. The weights $\bar{w}$ are computed as follows:

$$w(0)=(1-l(0))(1-l(1)+l(0))$$

$$w(9)=(1-l(9))(1-l(9)+l(8))$$

for i=1 to 9

$$w(i)=(1-l(i))(1-\mathrm{Min}(l(i+1)-l(i),l(i)-l(i-1)))$$

where Min(a,b) returns the smallest of a and b.

There are four different interpolation paths. For each path, a reference LSF set $r\bar{q}(n)$ in cosine domain is obtained as follows:

$$r\bar{q}(n)=\alpha(k)\bar{q}_4(n)+(1-\alpha(k))\bar{q}_4(n-1),k=1\text{ to }4$$

$\bar{\alpha}$={0.4,0.5,0.6, 0.7} for each path respectively. Then the following distance measure is computed for each path as:

$$D=|r\bar{l}(n)-\bar{l}(n)|^T\bar{w}$$

The path leading to the minimum distance D is chosen and the corresponding reference LSF set $r\bar{q}(n)$ is obtained as:

$$r\bar{q}(n)=\alpha_{opt}\bar{q}_4(n)+(1-\alpha_{opt})\bar{q}_4(n-1)$$

The interpolated LSF sets in the cosine domain are then given by:

$$\bar{q}_1(n)=0.5\bar{q}_4(n-1)+0.5r\bar{q}(n)$$

$$\bar{q}_2(n)=r\bar{q}(n)$$

$$\bar{q}_3(n)=0.5r\bar{q}(n)+0.5\bar{q}_4(n)$$

The impulse response, h(n), of the weighted synthesis filter $H(z)W(z)=A(z/\gamma_1)/[\bar{A}(z)A(z/\gamma_2)]$ is computed each subframe. This impulse response is needed for the search of adaptive and fixed codebooks 257 and 261. The impulse response h(n) is computed by filtering the vector of coefficients of the filter $A(z/\gamma_1)$ extended by zeros through the two filters $1/\bar{A}(z)$ and $1/A(z/\gamma_2)$.

The target signal for the search of the adaptive codebook 257 is usually computed by subtracting the zero input response of the weighted synthesis filter H(z)W(z) from the weighted speech signal $s_w(n)$. This operation is performed on a frame basis. An equivalent procedure for computing the target signal is the filtering of the LP residual signal r(n) through the combination of the synthesis filter $1/\bar{A}(z)$ and the weighting filter W(z).

After determining the excitation for the subframe, the initial states of these filters are updated by filtering the difference between the LP residual and the excitation. The LP residual is given by:

$$r(n) = s(n) + \sum_{i=1}^{10} \bar{a}_i s(n-1),\ n = 0, L\_SF - 1$$

The residual signal r(n) which is needed for finding the target vector is also used in the adaptive codebook search to extend the past excitation buffer. This simplifies the adaptive codebook search procedure for delays less than the subframe size of 40 samples.

In the present embodiment, there are two ways to produce an LTP contribution. One uses pitch preprocessing (PP) when the PP-mode is selected, and another is computed like the traditional LTP when the LTP-mode is chosen. With the PP-mode, there is no need to do the adaptive codebook search, and LTP excitation is directly computed according to past synthesized excitation because the interpolated pitch contour is set for each frame. When the AMR coder operates with LTP-mode, the pitch lag is constant within one subframe, and searched and coded on a subframe basis.

Suppose the past synthesized excitation is memorized in {ext(MAX_LAG+n), n<0}, which is also called adaptive codebook. The LTP excitation codevector, temporally memorized in {ext(MAX_LAG+n), 0<=n<L_SF}, is calculated by interpolating the past excitation (adaptive codebook) with the pitch lag contour, $\tau_c(n+m\cdot L\_SF)$, m=0, 1,2,3. The interpolation is performed using an FIR filter (Hamming windowed sinc functions):

$$ext\left(MA\vec{X}\_LAG + n\right) = \sum_{i=-f_l}^{f_l} ext(MAX\_LAG + n - T_c(n) + i) \cdot I_s(i, T_{IC}(n)),$$
$$n = 0, 1, \ldots, L\_SF - 1, \ldots$$

where $T_C(n)$ and $T_{IC}(n)$ are calculated by $$T_c(n)=\text{trunc}\{\tau_c(n+m\cdot L\_SF)\},$$

$$T_{IC}(n)=\tau_c(n)-T_C(n),$$

m is subframe number, $\{I_s(i,T_{IC}(n))\}$ is a set of interpolation coefficients, $f_l$ is 10, MAX_LAG is 145+11, and L_SF=40 is the subframe size. Note that the interpolated values {ext(MAX_LAG+n), 0<=n<L_SF−17+11} might be used again to do the interpolation when the pitch lag is small. Once the interpolation is finished, the adaptive codevector Va={$v_a$(n),n=0 to 39} is obtained by copying the interpolated values:

$$v_a(n)=\text{ext}(MAX\_LAG+n), 0<=n<L\_SF$$

Adaptive codebook searching is performed on a subframe basis. It consists of performing closed-loop pitch lag search, and then computing the adaptive code vector by interpolating the past excitation at the selected fractional pitch lag. The LTP parameters (or the adaptive codebook parameters) are the pitch lag (or the delay) and gain of the pitch filter. In the search stage, the excitation is extended by the LP residual to simplify the closed-loop search.

For the bit rate of 11.0 kbps, the pitch delay is encoded with 9 bits for the $1^{st}$ and $3^{rd}$ subframes and the relative delay of the other subframes is encoded with 6 bits. A fractional pitch delay is used in the first and third subframes with resolutions:

$$1/6 \text{ in the range } \left[17, 93\frac{4}{6}\right],$$

and integers only in the range [95,145]. For the second and fourth subframes, a pitch resolution of 1/6 is always used for the rate $$11.0 \text{ kbps in the ranges } \left[T_1 - 5\frac{3}{6}, T_1 + 4\frac{3}{6}\right],$$

where $T_1$ is the pitch lag of the previous ($1^{st}$ or $3^{rd}$) subframe.

The close-loop pitch search is performed by minimizing the mean-square weighted error between the original and synthesized speech. This is achieved by maximizing the term:

$$R(k) = \frac{\sum_{n=0}^{39} T_{gs}(n) y_k(n)}{\sqrt{\sum_{n=0}^{39} y_k(n) y_k(n)}},$$

where $T_{gs}(n)$ is the target signal and $y_k(n)$ is the past filtered excitation at delay k (past excitation convoluted with h(n)). The convolution $y_k(n)$ is computed for the first delay $t_{min}$ in the search range, and for the other delays in the search range $k=t_{min}+1, \ldots, t_{max}$, it is updated using the recursive relation:

$$y_k(n)=y_{k-1}(n-1)+u(-)h(n),$$

where u(n),n=−(143+11) to 39 is the excitation buffer.

Note that in the search stage, the samples u(n),n=0 to 39, are not available and are needed for pitch delays less than 40. To simplify the search, the LP residual is copied to u(n) to make the relation in the calculations valid for all delays. Once the optimum integer pitch delay is determined, the fractions, as defined above, around that integer are tested. The fractional pitch search is performed by interpolating the normalized correlation and searching for its maximum.

Once the fractional pitch lag is determined, the adaptive codebook vector, v(n), is computed by interpolating the past excitation u(n) at the given phase (fraction). The interpolations are performed using two FIR filters (Hamming windowed sinc functions), one for interpolating the term in the calculations to find the fractional pitch lag and the other for interpolating the past excitation as previously described. The adaptive codebook gain, $g_p$, is temporally given then by:

$$g_p = \frac{\sum_{n=0}^{39} T_{gs}(n)y(n)}{\sum_{n=0}^{39} y(n)y(n)},$$

bounded by $0<g_p<1.2$, where $y(n)=v(n)*h(n)$ is the filtered adaptive codebook vector (zero state response of H(z)W(z) to v(n)). The adaptive codebook gain could be modified again due to joint optimization of the gains, gain normalization and smoothing. The term y(n) is also referred to herein as $C_p(n)$.

With conventional approaches, pitch lag maximizing correlation might result in two or more times the correct one. Thus, with such conventional approaches, the candidate of shorter pitch lag is favored by weighting the correlations of different candidates with constant weighting coefficients. At times this approach does not correct the double or treble pitch lag because the weighting coefficients are not aggressive enough or could result in halving the pitch lag due to the strong weighting coefficients.

In the present embodiment, these weighting coefficients become adaptive by checking if the present candidate is in the neighborhood of the previous pitch lags (when the previous frames are voiced) and if the candidate of shorter lag is in the neighborhood of the value obtained by dividing the longer lag (which maximizes the correlation) with an integer.

In order to improve the perceptual quality, a speech classifier is used to direct the searching procedure of the fixed codebook (as indicated by the blocks 275 and 279) and to-control gain normalization (as indicated in the block 401 of FIG. 4). The speech classifier serves to improve the background noise performance for the lower rate coders, and to get a quick start-up of the noise level estimation. The speech classifier distinguishes stationary noise-like segments from segments of speech, music, tonal-like signals, non-stationary noise, etc.

The speech classification is performed in two steps. An initial classification (speech_mode) is obtained based on the modified input signal. The final classification (exc_mode) is obtained from the initial classification and the residual signal after the pitch contribution has been removed. The two outputs from the speech classification are the excitation mode, exc_mode, and the parameter $\beta_{sub}(n)$, used to control the subframe based smoothing of the gains.

The speech classification is used to direct the encoder according to the characteristics of the input signal and need not be transmitted to the decoder. Thus, the bit allocation, codebooks, and decoding remain the same regardless of the classification. The encoder emphasizes the perceptually important features of the input signal on a subframe basis by adapting the encoding in response to such features. It is important to notice that misclassification will not result in disastrous speech quality degradations. Thus, as opposed to the VAD 235, the speech classifier identified within the block 279 (FIG. 2) is designed to be somewhat more aggressive for optimal perceptual quality.

The initial classifier (speech_classifier) has adaptive thresholds and is performed in six steps:

1. Adapt thresholds:
    if(updates_noise ≧30 & updates_speech ≧30)

$$SNR\_max = \min\left(\frac{ma\_max\_speech}{ma\_max\_noise}, 32\right)$$

```
    else
        SNR_max = 3.5
    end if
    if(SNR_max < 1.75)
        deci_max_mes = 1.30
        deci_ma_cp = 0.70
        update_max_mes = 1.10
        update_ma_cp_speech = 0.72
    elseif(SNR_max < 2.50)
        deci_max_mes = 1.65
        deci_ma_cp = 0.73
        update_max_mes = 1.30
        update_ma_cp_speech = 0.72
    else
        deci_max_mes = 1.75
        deci_ma_cp = 0.77
        update_max_mes = 1.30
        update ma_cp_speech = 0.77
    endif
```

2. Calculate parameters:
    Pitch correlation:

$$cp = \frac{\sum_{i=0}^{L\_SF-4} \tilde{s}(i)\cdot\tilde{s}(i-lag)}{\sqrt{\left(\sum_{i=0}^{L\_SF-1} \tilde{s}(i)\cdot\tilde{s}(i)\right)\cdot\left(\sum_{i=0}^{L\_SF-1} \tilde{s}(i-lag)\cdot\tilde{s}(i-lag)\right)}}$$

Running mean of pitch correlation:
ma_cp(n) = 0.9 ma_cp(n − 1) + 0.1 · cp
Maximum of signal amplitude in current pitch cycle:
max(n) = max{|s̃(i)|,i = start, . . . ,L_SF − 1}
where:
start = min{L_SF − lag,0}
Sum of signal amplitudes in current pitch cycle:

$$mean(n) = \sum_{i=start}^{L\_SF-1} |\tilde{s}(i)|$$

Measure of relative maximum:

$$max\_mes = \frac{max(n)}{ma\_max\_noise(n-1)}$$

Maximum to long-term sum:

$$max2sum = \frac{max(n)}{\sum_{k=1}^{14} mean(n-k)}$$

Maximum in groups of 3 subframes for past 15 subframes:
max_group(n,k) = max{max(n − 3 · (4 − k)− j), j = 0, . . . ,2}, k = 0, . . . ,4
Group-maximum to minimum of previous 4 group-maxima:

$$endmax2minmax = \frac{max\_group(n,4)}{\min\{max\_group(n,k),\ k=0,\cdots,3\}}$$

Slope of 5 group maxima:

$$slope = 0.1\cdot\sum_{k=0}^{4}(k-2)\cdot max\_group(n,k)$$

3. Classify subframe:
    if(((max_mes < deci_max_mes & ma_cp <

-continued

```
    deci_ma_cp)|(VAD = 0)) &
        (LTP_MODE = 115.8 kbit/s|4.55 kbit/s))
        speech_mode = 0/*class1*/
    else
        speech_mode = 1/*class2*/
    endif
4. Check for change in background noise level, i.e. reset required:
    Check for decrease in level:
    if (updates_noise = 31 & max_mes <= 0.3)
        if (consec_low < 15)
            consec_low++
        endif
    else
        consec_low = 0
    endif
    if (consec_low = 15)
        updates_noise = 0
        lev_reset = -1 /* low level reset */
    endif
    Check for increase in level:
    if((updates_noise >= 30|lev_reset = -1) & max_mes > 1.5 &
    ma_cp < 0.70 & cp < 0.85
        & k1 < -0.4 & endmax2minmax < 50 & max2sum < 35 &
        slope > -100 & slope < 120)
        if (consec_high < 15)
            consec_high++
        endif
    else
        consec_high = 0
    endif
    if (consec_high = 15 & endmax2minmax < 6 & max2sum < 5))
        updates_noise = 30
        lev_reset = 1 /* high level reset */
    endif
5. Update running mean of maximum of class 1 segments,
i.e. stationary noise:
if(
    /*1.condition:regular update*/
    (max_mes < update_max_mes & ma_cp < 0.6 & cp < 0.65 &
    max_mes > 0.3)|
    /*2.condition:VAD continued update*/
    (consec_vad_0 = 8)|
    /*3.condition:start - up/reset update*/
    (updates_1 noise ≦ 30 & ma_cp < 0.7 & cp < 0.75 &
    k1 < -0.4 & endmax2minmax < 5 &
    (lev_reset ≠ -1|(lev_reset = -1 & max_mes < 2)))
    )
    ma_max_noise(n) = 0.9 · ma_max_noise(n - 1) + 0.1 · max(n)
    if(updates_noise ≦ 30)
        updates_noise ++
    else
        lev_reset = 0
    endif
.
.
.
where k1 is the first reflection coefficient.
6. Update running mean of maximum of class 2 segments,
i.e. speech, music, tonal-like signals,
    non-stationary noise, etc, continued from above:
.
.
.
elseif (ma_cp > update_ma_cp_speech)
    if(updates_speech ≦ 80)
        α_speech = 0.95
    else
        α_speech = 0.999
    endif
    ma_max_speech(n) = α_speech · ma_max_speech(n - 1)
    + (1 - α_speech) · max(n)
    if(updates_speech ≦ 80)
        updates_speech++
endif
```

The final classifier (exc_preselect) provides the final class, exc_mode, and the subframe based smoothing parameter, $\beta_{sub}(n)$. It has three steps:

```
1. Calculate parameters:
    Maximum amplitude of ideal excitation in current subframe:
    max_res2(n) = max{|res2(i)|,i = 0, . . . ,L_SF - 1}
    Measure of relative maximum:
```

$$\text{max\_mes}_{re2} = \frac{\text{max}_{re2}(n)}{\text{ma\_max}_{re2}(n-1)}$$

```
2. Classify subframe and calculate smoothing:
    if(speech_mode = 1|max_mes_res2 ≧ 1.75)
        exc_mode = 1 /*class 2*/
        β_sub(n) = 0
        N_mode_sub(n) = -4
    else
        exc_mode = 0 /*class 1*/
        N_mode_sub(n) = N_mode_sub(n - 1) + 1
        if(N_mode_sub(n) < 4)
            N_mode_sub(n) = 4
        endif
        if(N_mode_sub(n) < 0)
```

$$\beta_{sub}(n) = \frac{0.7}{9} \cdot (\text{N\_mode\_sub}(n) - 1)^2$$

```
        else
            β_sub(n) = 0
        endif
    endif
3. Update running mean of maximum:
    if(max_mes_res2 ≦ 0.5)
        if(consec < 51)
            consec ++
        endif
    else
        consec = 0
    endif
    if((exc_mode = 0 & (max_mes_res2 > 0.5|consec > 50))|
        (updates ≦ 30 & ma_cp < 0.6 & cp < 0.65))
        ma_max(n) = 0.9 · ma_max(n - 1) + 0.1 · max_res2(n)
        if(updates ≦ 30)
        updates ++
    endif
endif
```

When this process is completed, the final subframe based classification, exc_mode, and the smoothing parameter, $\beta_{sub}(n)$, are available.

To enhance the quality of the search of the fixed codebook 261, the target signal, $T_g(n)$, is produced by temporally reducing the LTP contribution with a gain factor, $G_r$:

$$T_g(n)=T_{gs}(n)-G_r*g_p*Y_a(n), n=0,1, \ldots ,39$$

where $T_{gs}(n)$ is the original target signal 253, $Y_a(n)$ is the filtered signal from the adaptive codebook, $g_p$ is the LTP gain for the selected adaptive codebook vector, and the gain factor is determined according to the normalized LTP gain, $R_p$, and the bit rate:

if (rate<=0)/*for 4.45 kbps and 5.8 kbps*/
$G_r=0.7\ R_p+0.3$;
if (rate==1)/*for 6.65 kbps*/
$G_r=0.6\ R_p+0.4$;
if (rate==2)/*for 8.0 kbps*/
$G_r=0.3\ R_p+0.7$;
if (rate==3)/*for 11.0 kbps*/
$G_r=0.95$;
if ($T_{op}$>L_SF & $g_p$>0.5 & rate<=2)
$G_r \Leftarrow G_r(0.3\hat{}R_p\hat{}+\hat{}0.7)$; and where normalized LTP gain, $R_p$, is defined as:

$$R_p = \frac{\sum_{n=0}^{39} T_{gs}(n)y_a(n)}{\sqrt{\sum_{n=0}^{39} T_{gs}(n)T_{gs}(n)}\sqrt{\sum_{n=0}^{39} y_a(n)y_a(n)}}$$

Another factor considered at the control block 275 in conducting the fixed codebook search and at the block 401 (FIG. 4) during gain normalization is the noise level +")" which is given by:

$$P_{NSR} = \sqrt{\frac{\max\{(E_n - 100), 0.0\}}{E_s}}$$

where $E_s$ is the energy of the current input signal including background noise, and $E_n$ is a running average energy of the background noise. $E_n$ is updated only when the input signal is detected to be background noise as follows:

if (first background noise frame is true)
  $E_n$=0.75 $E_s$;
else if (background noise frame is true)
  $E_n$=0.75 $E_{n\_m}$+0.25 $E_s$;

where $E_{n\_m}$ is the last estimation of the background noise energy.

For each bit rate mode, the fixed codebook 261 (FIG. 2) consists of two or more subcodebooks which are constructed with different structure. For example, in the present embodiment at higher rates, all the subcodebooks only contain pulses. At lower bit rates, one of the subcodebooks is populated with Gaussian noise. For the lower bit-rates (e.g., 6.65, 5.8, 4.55 kbps), the speech classifier forces the encoder to choose from the Gaussian subcodebook in case of stationary noise-like subframes, exc_mode=0. For exc_mode=1 all subcodebooks are searched using adaptive weighting.

For the pulse subcodebooks, a fast searching approach is used to choose a subcodebook and select the code word for the current subframe. The same searching routine is used for all the bit rate modes with different input parameters.

In particular, the long-term enhancement filter, $F_p(z)$, is used to filter through the selected pulse excitation. The filter is defined as $F_p(z)=1/(1-\beta z^{-T})$, where T is the integer part of pitch lag at the center of the current subframe, and β is the pitch gain of previous subframe, bounded by [0.2, 1.0]. Prior to the codebook search, the impulsive response h(n) includes the filter $F_p(z)$.

For the Gaussian subcodebooks, a special structure is used in order to bring down the storage requirement and the computational complexity. Furthermore, no pitch enhancement is applied to the Gaussian subcodebooks.

There are two kinds of pulse subcodebooks in the present AMR coder embodiment. All pulses have the amplitudes of +1 or −1. Each pulse has 0, 1, 2, 3 or 4 bits to code the pulse position. The signs of some pulses are transmitted to the decoder with one bit coding one sign. The signs of other pulses are determined in a way related to the coded signs and their pulse positions.

In the first kind of pulse subcodebook, each pulse has 3 or 4 bits to code the pulse position. The possible locations of individual pulses are defined by two basic non-regular tracks and initial phases:

POS($n_p$,i)=TRACK($m_p$,i)+PHAS($n_p$,phas_mode), where i=0,1, . . . ,7 or 15 (corresponding to 3 or 4 bits to code the position), is the possible position index, $n_p$=0, . . . ,$N_p$−1 ($N_p$ is the total number of pulses), distinguishes different pulses, $m_p$=0 or 1, defines two tracks, and phase_mode=0 or 1, specifies two phase modes.

For 3 bits to code the pulse position, the two basic tracks are:

{TRACK(0,i)}={0, 4, 8, 12, 18, 24, 30, 36}, and
{TRACK(1,i)}={0, 6, 12, 18, 22, 26, 30, 34}.

If the position of each pulse is coded with 4 bits, the basic tracks are:

{TRACK(0,i)}={0, 2, 4, 6, 8, 10, 12, 14, 17, 20, 23, 26, 29, 32, 35, 38}, and
{TRACK(1,i)}={0, 3, 6, 9, 12, 15, 18, 21, 23, 25, 27, 29, 31, 33, 35, 37}.

The initial phase of each pulse is fixed as:

$$PHAS(n_p,0)=\text{modulus}(n_p/MAXPHAS)$$

$$PHAS(n_p,1)=PHAS(N_p-1-n_p,0)$$

where MAXPHAS is the maximum phase value.

For any pulse subcodebook, at least the first sign for the first pulse, SIGN($n_p$), np=0, is encoded because the gain sign is embedded. Suppose $N_{sign}$ is the number of pulses with encoded signs; that is, SIGN($n_p$), for $n_p$<$N_{sign}$,<=$N_p$, is encoded while SIGN($n_p$), for $n_p$>=$N_{sign}$, is not encoded. Generally, all the signs can be determined in the following way:

$$SIGN(n_p)=-SIGN(n_p-1), \text{ for } n_p>=N_{sign},$$

due to that the pulse positions are sequentially searched from $n_p$=0 to $n_p$=$N_p$−1 using an iteration approach. If two pulses are located in the same track while only the sign of the first pulse in the track is encoded, the sign of the second pulse depends on its position relative to the first pulse. If the position of the second pulse is smaller, then it has opposite sign, otherwise it has the same sign as the first pulse.

In the second kind of pulse subcodebook, the innovation vector contains 10 signed pulses. Each pulse has 0, 1, or 2 bits to code the pulse position. One subframe with the size of 40 samples is divided into 10 small segments with the length of 4 samples. 10 pulses are respectively located into 10 segments. Since the position of each pulse is limited into one segment, the possible locations for the pulse numbered with $n_p$ are, {4$n_p$}, {4$n_p$, 4$n_p$+2}, or {4$n_p$, 4$n_p$+1, 4$n_p$+2, 4$n_p$+3}, respectively for 0, 1, or 2 bits to code the pulse position. All the signs for all the 10 pulses are encoded.

The fixed codebook 261 is searched by minimizing the mean square error between the weighted input speech and the weighted synthesized speech. The target signal used for the LTP excitation is updated by subtracting the adaptive codebook contribution. That is:

$$x_2(n)=x(n)-\hat{g}_p y(n), n=0, \ldots, 39,$$

where y(n)=v(n)*h(n) is the filtered adaptive codebook vector and $\hat{g}_p$ is the modified (reduced) LTP gain.

If $c_k$ is the code vector at index k from the fixed codebook, then the pulse codebook is searched by maximizing the term:

$$A_k = \frac{(C_k)^2}{E_{D_k}} = \frac{(d^t c_k)^2}{c_k^t \Phi c_k},$$

where $d=H^t x_2$ is the correlation between the target signal $x_2(n)$ and the impulse response h(n), H is a the lower triangular Toepliz convolution matrix with diagonal h(0) and lower diagonals h(1), . . . , h(39), and $\Phi=H^tH$ is the matrix of correlations of h(n). The vector d (backward filtered target) and the matrix $\Phi$ are computed prior to the codebook search. The elements of the vector d are computed by:

$$d(n)=\sum_{i=n}^{39}x_2(i)h(i-n),\ n=0,\ldots,39,$$

and the elements of the symmetric matrix $\Phi$ are computed by:

$$\phi(i,j)=\sum_{n=j}^{39}h(n-i)h(n-j),\ (j\geq i).$$

The correlation in the numerator is given by:

$$C=\sum_{i=0}^{N_p-1}\vartheta_i d(m_i),$$

where $m_i$ is the position of the i th pulse and $v_i$ is its amplitude. For the complexity reason, all the amplitudes $\{v_i\}$ are set to +1 or −1; that is, $v_i$=SIGN(i), i=$n_p$=0, . . . , $N_p$−1.

The energy in the denominator is given by:

$$E_D=\sum_{i=0}^{N_p-1}\phi(m_i,m_i)+2\sum_{i=0}^{N_p-2}\sum_{j=i+1}^{N_p-1}\vartheta_i\vartheta_j\phi(m_i,m_j).$$

To simplify the search procedure, the pulse signs are preset by using the signal b(n), which is a weighted sum of the normalized d(n) vector and the normalized target signal of $x_2(n)$ in the residual domain $res_2(n)$:

$$b(n)=\frac{res_2(n)}{\sqrt{\sum_{i=0}^{39}res_2(i)res_2(i)}}+\frac{2d(n)}{\sqrt{\sum_{i=0}^{39}d(i)d(i)}},\ n=0,1,\ldots,39$$

If the sign of the i th (i=$n_p$) pulse located at $mi_i$ is encoded, it is set to the sign of signal b(n) at that position, i.e., SIGN(i)=sign[b($m_i$)].

In the present embodiment, the fixed codebook 261 has 2 or 3 subcodebooks for each of the encoding bit rates. Of course many more might be used in other embodiments. Even with several subcodebooks, however, the searching of the fixed codebook 261 is very fast using the following procedure. In a first searching turn, the encoder processing circuitry searches the pulse positions sequentially from the first pulse ($n_p$=0) to the last pulse ($n_p$=$N_p$−1) by considering the influence of all the existing pulses.

In a second searching turn, the encoder processing circuitry corrects each pulse position sequentially from the first pulse to the last pulse by checking the criterion value $A_k$ contributed from all the pulses for all possible locations of the current pulse. In a third turn, the functionality of the second searching turn is repeated a final time. Of course further turns may be utilized if the added complexity is not prohibitive.

The above searching approach proves very efficient, because only one position of one pulse is changed leading to changes in only one term in the criterion numerator C and few terms in the criterion denominator $E_D$ for each computation of the $A_k$. As an example, suppose a pulse subcodebook is constructed with 4 pulses and 3 bits per pulse to encode the position. Only 96 (4pulses×$2^3$ positions per pulse×3turns=96) simplified computations of the criterion $A_k$ need be performed.

Moreover, to save the complexity, usually one of the subcodebooks in the fixed codebook 261 is chosen after finishing the first searching turn. Further searching turns are done only with the chosen subcodebook. In other embodiments, one of the subcodebooks might be chosen only after the second searching turn or thereafter should processing resources so permit.

The Gaussian codebook is structured to reduce the storage requirement and the computational complexity. A comb-structure with two basis vectors is used. In the comb-structure, the basis vectors are orthogonal, facilitating a low complexity search. In the AMR coder, the first basis vector occupies the even sample positions, (0,2, . . . ,38), and the second basis vector occupies the odd sample positions, (1,3, . . . ,39).

The same codebook is used for both basis vectors, and the length of the codebook vectors is 20 samples (half the subframe size).

All rates (6.65, 5.8 and 4.55 kbps) use the same Gaussian codebook. The Gaussian codebook, $CB_{Gauss}$, has only 10 entries, and thus the storage requirement is 10·20=200 16-bit words. From the 10 entries, as many as 32 code vectors are generated. An index, $idx_\delta$, to one basis vector 22 populates the corresponding part of a code vector, $c_{idx_\delta}$, in the following way:

$$c_{idx_\delta}(2\cdot(i-\tau)+\delta)=CB_{Gauss}(l,i)\quad i=\tau,\tau+1,\ldots,19$$

$$c_{idx_\delta}(2\cdot(i+20-\tau)+\delta)=CB_{Gauss}(l,i)\quad i=0,1,\ldots,\tau-1$$

where the table entry, l, and the shift, τ, are calculated from the index, $idx_\delta$, according to:

$$\tau=\text{trunc}\{idx_\delta/10\}$$

$$l=idx_\delta-10\cdot\tau$$

and δ is 0 for the first basis vector and 1 for the second basis vector. In addition, a sign is applied to each basis vector.

Basically, each entry in the Gaussian table can produce as many as 20 unique vectors, all with the same energy due to the circular shift. The 10 entries are all normalized to have identical energy of 0.5, i.e., $$\sum_{i=0}^{19}(CB_{Gauss}(l,i))^2=0.5,\ l=0,1,\ldots,9$$

That means that when both basis vectors have been selected, the combined code vector, $c_{idx_0,idx_1}$, will have unity energy, and thus the final excitation vector from the Gaussian subcodebook will have unity energy since no pitch enhancement is applied to candidate vectors from the Gaussian subcodebook.

The search of the Gaussian codebook utilizes the structure of the codebook to facilitate a low complexity search. Initially, the candidates for the two basis vectors are searched independently based on the ideal excitation, $res_2$. For each basis vector, the two best candidates, along with the respective signs, are found according to the mean squared error. This is exemplified by the equations to find the best candidate, index $idx_\delta$, and its sign, $s_{idx_\delta}$:

$$idx_\delta = \max_{k=0,1,\ldots,N_{Gauss}} \left\{ \left| \sum_{i=0}^{19} res_2(2\cdot i+\delta)\cdot c_k(2\cdot i+\delta) \right| \right\}$$

$$s_{idx_\delta} = \text{sign}\left( \sum_{i=0}^{19} res_2(2\cdot i+\delta)\cdot c_{idx_\delta}(2\cdot i+\delta) \right)$$

where $N_{Gauss}$ is the number of candidate entries for the basis vector. The remaining parameters are explained above. The total number of entries in the Gaussian codebook is $2\cdot 2\cdot N_{Gauss}^2$. The fine search minimizes the error between the weighted speech and the weighted synthesized speech considering the possible combination of candidates for the two basis vectors from the pre-selection. If $c_{k_0,k_1}$ is the Gaussian code vector from the candidate vectors represented by the indices $k_{0\ 1\ and\ k1}$ and the respective signs for the two basis vectors, then the final Gaussian code vector is selected by maximizing the term:

$$A_{k_0,k_1} = \frac{(C_{k_0,k_1})^2}{E_{Dk_0,k_1}} = \frac{(d^t c_{k_0,k_1})^2}{c^t_{k_0,k_1}\Phi c_{k_0,k_1}}$$

over the candidate vectors. $d=H^t x_2$ is the correlation between the target signal $x_2(n)$ and the impulse response h(n) (without the pitch enhancement), and H is a the lower triangular Toepliz convolution matrix with diagonal h(0) and lower diagonals h(1), . . . , h(39), and $\Phi=H^tH$ is the matrix of correlations of h(n).

More particularly, in the present embodiment, two subcodebooks are included (or utilized) in the fixed codebook 261 with 31 bits in the 11 kbps encoding mode. In the first subcodebook, the innovation vector contains 8 pulses. Each pulse has 3 bits to code the pulse position. The signs of 6 pulses are transmitted to the decoder with 6 bits. The second subcodebook contains innovation vectors comprising 10 pulses. Two bits for each pulse are assigned to code the pulse position which is limited in one of the 10 segments. Ten bits are spent for 10 signs of the 10 pulses. The bit allocation for the subcodebooks used in the fixed codebook 261 can be summarized as follows:

Subcodebook1: 8 pulses×3 bits/pulse+6 signs=30 bits

Subcodebook2: 10 pulses×2 bits/pulse+10 signs=30 bits

One of the two subcodebooks is chosen at the block 275 (FIG. 2) by favoring the second subcodebook using adaptive weighting applied when comparing the criterion value F1 from the first subcodebook to the criterion value F2 from the second subcodebook:

if ($W_c$·F1>F2), the first subcodebook is chosen, else, the second subcodebook is chosen, where the weighting, $0<W_c<=1$, is defined as:

$$W_c = \begin{cases} 1, 0, & \text{if } P_{NSR} < 0.5, \\ 1.0 - 0.3\ \ P_{NSR}(1.0 - 0.5\ R_p)\cdot\min\{P_{sharp} + 0.5, 1.0\}, & \end{cases}$$

$P_{NSR}$ is the background noise to speech signal ratio (i.e., the "noise level" in the block 279), $R_p$ is the normalized LTP gain, and $P_{sharp}$ is the sharpness parameter of the ideal excitation $res_2(n)$ (i.e., the "sharpness" in the block 279).

In the 8 kbps mode, two subcodebooks are included in the fixed codebook 261 with 20 bits. In the first subcodebook, the innovation vector contains 4 pulses. Each pulse has 4 bits to code the pulse position. The signs of 3 pulses are transmitted to the decoder with 3 bits. The second subcodebook contains innovation vectors having 10 pulses. One bit for each of 9 pulses is assigned to code the pulse position which is limited in one of the 10 segments. Ten bits are spent for 10 signs of the 10 pulses. The bit allocation for the subcodebook can be summarized as the following:

Subcodebook1: 4 pulses×4 bits/pulse+3 signs=19 bits

Subcodebook2: 9 pulses×1 bits/pulse+1 pulse×0 bit+10 signs=19 bits

One of the two subcodebooks is chosen by favoring the second subcodebook using adaptive weighting applied when comparing the criterion value F1 from the first subcodebook to the criterion value F2 from the second subcodebook as in the 11 kbps mode. The weighting, $0<W_c<=1$, is defined as:

$$W_c=1.0-0.6P_{NSR}(1.0-05\ R_p)\cdot\min\{P_{sharp}+0.5,1.0\}.$$

The 6.65 kbps mode operates using the long-term preprocessing (PP) or the traditional LTP. A pulse subcodebook of 18 bits is used when in the PP-mode. A total of 13 bits are allocated for three subcodebooks when operating in the LTP-mode. The bit allocation for the subcodebooks can be summarized as follows:

PP-mode:

Subcodebook: 5 pulses×3 bits/pulse+3 signs=18 bits

LTP-mode:

Subcodebook1: 3 pulses×3 bits/pulse+3 signs=12 bits, phase_mode=1,

Subcodebook2: 3 pulses×3 bits/pulse+2 signs=11 bits, phase_mode=0,

Subcodebook3: Gaussian subcodebook of 11 bits.

One of the 3 subcodebooks is chosen by favoring the Gaussian subcodebook when searching with LTP-mode. Adaptive weighting is applied when comparing the criterion value from the two pulse subcodebooks to the criterion value from the Gaussian subcodebook. The weighting, $0<W_c<=1$, is defined as:

$$W_c=1.0-0.9\ P_{NSR}\ (1.0-0.5\ R_p)\cdot\min\{P_{sharp}+0.5,\ 1.0\},$$

$$\text{if (noise-like unvoiced), } W_c \Leftarrow W_c\cdot(0.2\ R_p(1.0-P_{sharp})+0.8).$$

The 5.8 kbps encoding mode works only with the long-term preprocessing (PP). Total 14 bits are allocated for three subcodebooks. The bit allocation for the subcodebooks can be summarized as the following:

Subcodebook1: 4 pulses×3 bits/pulse+1 signs=13 bits, phase_mode=1,

Subcodebook2: 3 pulses×3 bits/pulse+3 signs=12 bits, phase_mode=0,

Subcodebook3: Gaussian subcodebook of 12 bits.

One of the 3 subcodebooks is chosen favoring the Gaussian subcodebook with adaptive weighting applied when comparing the criterion value from the two pulse subcodebooks to the criterion value from the Gaussian subcodebook. The weighting, $0<W_c<=1$, is defined as:

$$W_c=1.0-P_{NSR}(1.0-0.5R_p)\cdot\min\{P_{sharp}+0.6,1.0\},$$

$$\text{if (noise-like unvoiced), } W_c \Leftarrow W_c\cdot(0.3R_p(1.0-P_{sharp})+0.7).$$

The 4.55 kbps bit rate mode works only with the long-term preprocessing (PP). Total 10 bits are allocated for three subcodebooks. The bit allocation for the subcodebooks can be summarized as the following:

Subcodebook1: 2 pulses×4 bits/pulse+1 signs=9 bits, phase_mode=1,

Subcodebook2: 2 pulses×3 bits/pulse+2 signs=8 bits, phase_mode=0,

Subcodebook3: Gaussian subcodebook of 8 bits.

One of the 3 subcodebooks is chosen by favoring the Gaussian subcodebook with weighting applied when comparing the criterion value from the two pulse subcodebooks to the criterion value from the Gaussian subcodebook. The weighting, $0<W_c<=1$, is defined as:

$$W_c=1.0-1.2P_{NSR}(1.0-0.5R_p)\cdot\min\{P_{sharp}+0.6,1.0\},$$

$$\text{if (noise-like unvoiced)}, W_c \Leftarrow W_c\cdot(0.6R_p(1.0-P_{sharp})+0.4).$$

For 4.55, 5.8, 6.65 and 8.0 kbps bit rate encoding modes, a gain re-optimization procedure is performed to jointly optimize the adaptive and fixed codebook gains, $g_p$ and $g_c$, respectively, as indicated in FIG. 3. The optimal gains are obtained from the following correlations given by:

$$g_p = \frac{R_1 R_2 - R_3 R_4}{R_5 R_2 - R_3 R_3}$$

$$g_c = \frac{R_4 - g_p R_3}{R_2},$$

where $R_1=<\overline{C}_p,\overline{T}_{gs}>$, $R_2=<\overline{C}_c,\overline{C}_c>$, $R_3=<\overline{C}_p,\overline{C}_c>$, $R_4=<\overline{C}_c,\overline{T}_{gs}>$, and $R_5=<\overline{C}_p\overline{C}_p>$. $\overline{C}_c$, $\overline{C}_p$, and $\overline{T}_{gs}$ are filtered fixed codebook excitation, filtered adaptive codebook excitation and the target signal for the adaptive codebook search.

For 11 kbps bit rate encoding, the adaptive codebook gain, $g_p$, remains the same as that computed in the closeloop pitch search. The fixed codebook gain, $g_c$, is obtained as:

$$g_c = \frac{R_6}{R_2},$$

where $R_6=<\overline{C}_c,\overline{T}_g>$ and $\overline{T}_g=\overline{T}_{gs}-g_p\overline{C}_p$.

Original CELP algorithm is based on the concept of analysis by synthesis (waveform matching). At low bit rate or when coding noisy speech, the waveform matching becomes difficult so that the gains are up-down, frequently resulting in unnatural sounds. To compensate for this problem, the gains obtained in the analysis by synthesis close-loop sometimes need to be modified or normalized.

There are two basic gain normalization approaches. One is called open-loop approach which normalizes the energy of the synthesized excitation to the energy of the unquantized residual signal. Another one is close-loop approach with which the normalization is done considering the perceptual weighting. The gain normalization factor is a linear combination of the one from the close-loop approach and the one from the open-loop approach; the weighting coefficients used for the combination are controlled according to the LPC gain.

The decision to do the gain normalization is made if one of the following conditions is met: (a) the bit rate is 8.0 or 6.65 kbps, and noise-like unvoiced speech is true; (b) the noise level $P_{NSR}$ is larger than 0.5; (c) the bit rate is 6.65 kbps, and the noise level $P_{NSR}$ is larger than 0.2; and (d) the bit rate is 5.8 or 4.45 kbps.

The residual energy, $E_{res}$, and the target signal energy, $E_{Tgs}$, are defined respectively as:

$$E_{res} = \sum_{n=0}^{L\_SF-1} res^2(n)$$

-continued $$E_{Tgs} = \sum_{n=0}^{L\_SF-1} T_{gs}^2(n)$$

Then the smoothed open-loop energy and the smoothed closed-loop energy are evaluated by:

$$\begin{aligned}
&\textit{if (first subframe is true)}\\
&\quad Ol\_Eg = E_{res}\\
&\textit{else}\\
&\quad Ol\_Eg \Leftarrow \beta_{sub}\cdot Ol\_Eg + (1-\beta_{sub})E_{res}\\
&\textit{if (first subframe is true)}\\
&\quad Cl\_Eg = E_{Tgs}\\
&\textit{else}\\
&\quad Cl\_Eg \Leftarrow \beta_{sub}\cdot Cl\_Eg + (1-\beta_{sub})E_{Tgs}
\end{aligned}$$

where $\beta_{sub}$ is the smoothing coefficient which is determined according to the classification. After having the reference energy, the open-loop gain normalization factor is calculated:

$$ol\_g = \text{MIN}\left\{C_{ol}\sqrt{\frac{Ol\_Eg}{\sum_{n=0}^{L\_SF-1} v^2(n)}},\ \frac{1.2}{g_p}\right\}$$

where $C_{ol}$ is 0.8 for the bit rate 11.0 kbps, for the other rates $C_{ol}$ is 0.7, and v(n) is the excitation:

$$v(n)=v_a(n)g_p+v_c(n)g_c, n=0,1, \ldots, L\_SF-1.$$

where $g_p$ and $g_c$ are unquantized gains. Similarly, the closed-loop gain normalization factor is:

$$Cl\_g = \text{MIN}\left\{C_{cl}\sqrt{\frac{Cl\_Eg}{\sum_{n=0}^{L\_SF-1} y^2(n)}},\ \frac{1.2}{g_p}\right\}$$

where $C_{cl}$ is 0.9 for the bit rate 11.0 kbps, for the other rates $C_{cl}$ is 0.8, and y(n) is the filtered signal (y(n)=v(n)*h(n)):

$$y(n)=y_a(n)g_p+y_c(n)g_c, n=0,1, \ldots, L\_SF-1.$$

The final gain normalization factor, $g_f$, is a combination of Cl_g and Ol_g, controlled in terms of an LPC gain parameter, $C_{LPC}$, if (speech is true or the rate is 11 kbps)

$$g_f=C_{LPC}Ol\_g+(1-C_{LPC})Cl\_g$$

$$g_f=\text{MAX}(1.0,g_f)$$

$$g_f=\text{MIN}(g_f,1+C_{LPC})$$

if (background noise is true and the rate is smaller than 11 kbps)

$$g_f=1.2\text{MIN}\{Cl\_g,Ol\_g\}$$

where $C_{LPC}$ is defined as:

$$C_{LPC}=\text{MIN}\{\text{sqrt}(E_{res}/E_{Tgs}),0.8\}0.8$$

Once the gain normalization factor is determined, the unquantized gains are modified:

$$g_p \Leftarrow g_p \cdot g_f$$

For 4.55 ,5.8, 6.65 and 8.0 kbps bit rate encoding, the adaptive codebook gain and the fixed codebook gain are vector quantized using 6 bits for rate 4.55 kbps and 7 bits for the other rates. The gain codebook search is done by minimizing the mean squared weighted error, Err, between the original and reconstructed speech signals:

$$Err = \|\overline{T}_{gs} - g_p\overline{C}_p - g_c\overline{C}_c\|^2.$$

For rate 11.0 kbps, scalar quantization is performed to quantize both the adaptive codebook gain, $g_p$, using 4 bits and the fixed codebook gain, $g_c$, using 5 bits each.

The fixed codebook gain, $g_c$, is obtained by MA prediction of the energy of the scaled fixed codebook excitation in the following manner. Let E(n) be the mean removed energy of the scaled fixed codebook excitation in (dB) at subframe n be given by:

$$E(n) = 10\log\left(\frac{1}{40}g_c^2\sum_{i=0}^{39}c^2(i)\right) - \overline{E},$$

where c(i) is the unscaled fixed codebook excitation, and $\overline{E}$=30 dB is the mean energy of scaled fixed codebook excitation.

The predicted energy is given by:

$$\tilde{E}(n) = \sum_{i=1}^{4} b_i\hat{R}(n-i)$$

where $[b_1 b_2 b_3 b_4]$=[0.68 0.58 0.34 0.19] are the MA prediction coefficients and $\hat{R}(n)$ is the quantized prediction error at subframe n.

The predicted energy is used to compute a predicted fixed codebook gain $g_c$ (by substituting E(n) by $\tilde{E}(n)$ and $g_c$ by $g_c$). This is done as follows. First, the mean energy of the unscaled fixed codebook excitation is computed as:

$$E_i = 10\log\left(\frac{1}{40}\sum_{i=0}^{39}c^2(i)\right),$$

and then the predicted gain $g_c$ is obtained as:

$$g_c = 10^{(0.05(\tilde{E}(n)+\overline{E}-E_i)}.$$

A correction factor between the gain, $g_c$, and the estimated one, $g_c$, is given by:

$$\gamma = g_c/g_c'.$$

It is also related to the prediction error as:

$$R(n) = E(n) - \tilde{E}(n) = 20\log\gamma.$$

The codebook search for 4.55, 5.8, 6.65 and 8.0 kbps encoding bit rates consists of two steps. In the first step, a binary search of a single entry table representing the quantized prediction error is performed. In the second step, the index Index_1 of the optimum entry that is closest to the unquantized prediction error in mean square error sense is used to limit the search of the two-dimensional VQ table representing the adaptive codebook gain and the prediction error. Taking advantage of the particular arrangement and ordering of the VQ table, a fast search using few candidates around the entry pointed by Index_1 is performed. In fact, only about half of the VQ table entries are tested to lead to the optimum entry with Index_2. Only Index_2 is transmitted.

For 11.0 kbps bit rate encoding mode, a full search of both scalar gain codebooks are used to quantize $g_p$, and $g_c$. For $g_p$, the search is performed by minimizing the error Err=abs($g_p - \overline{g}_p$). Whereas for $g_c$, the search is performed by minimizing the error $Err = \|\overline{T}_{gs} - \overline{g}_p\overline{C}_p - g_c\overline{C}_c\|^2$.

An update of the states of the synthesis and weighting filters is needed in order to compute the target signal for the next subframe. After the two gains are quantized, the excitation signal, u(n), in the present subframe is computed as:

$$u(n) = \overline{g}_p v(n) + \overline{g}_c c(n), n=0,39,$$

where $\overline{g}_p$ and $\overline{g}_c$ are the quantized adaptive and fixed codebook gains respectively, v(n) the adaptive codebook excitation (interpolated past excitation), and c(n) is the fixed codebook excitation. The state of the filters can be updated by filtering the signal r(n)−u(n) through the filters $1/\overline{A}(z)$ and W(z) for the 40-sample subframe and saving the states of the filters. This would normally require 3 filterings.

A simpler approach which requires only one filtering is as follows. The local synthesized speech at the encoder, $\hat{s}(n)$, is computed by filtering the excitation signal through $1/\overline{A}(z)$. The output of the filter due to the input r(n)−u(n) is equivalent to $e(n)=s(n)-\hat{s}(n)$, so the states of the synthesis filter $1/\overline{A}(z)$ are given by e(n), n=0,39. Updating the states of the filter W(z) can be done by filtering the error signal e(n) through this filter to find the perceptually weighted error $e_w(n)$. However, the signal $e_w(n)$ can be equivalently found by:

$$e_w(n) = T_{gs}(n) - \overline{g}_p C_p(n) - \overline{g}_c C_c(n).$$

The states of the weighting filter are updated by computing $e_w(n)$ for n=30 to 39.

The function of the decoder consists of decoding the transmitted parameters (LP parameters, adaptive codebook vector and its gain, fixed codebook vector and its gain) and performing synthesis to obtain the reconstructed speech. The reconstructed speech is then postfiltered and upscaled.

The decoding process is performed in the following order. First, the LP filter parameters are encoded. The received indices of LSF quantization are used to reconstruct the quantized LSF vector. Interpolation is performed to obtain 4 interpolated LSF vectors (corresponding to 4 subframes). For each subframe, the interpolated LSF vector is converted to LP filter coefficient domain, $a_k$, which is used for synthesizing the reconstructed speech in the subframe.

For rates 4.55, 5.8 and 6.65 (during PP_mode) kbps bit rate encoding modes, the received pitch index is used to interpolate the pitch lag across the entire subframe. The following three steps are repeated for each subframe:

1) Decoding of the gains: for bit rates of 4.55, 5.8, 6.65 and 8.0 kbps, the received index is used to find the quantized adaptive codebook gain, $\overline{g}_p$, from the 2-dimensional VQ table. The same index is used to get the fixed codebook gain correction factor $\overline{\gamma}$ from the same quantization table. The quantized fixed codebook gain, $\overline{g}_c$, is obtained following these steps:

the predicted energy is computed $$\tilde{E}(n) = \sum_{i=1}^{4} b_i \hat{R}(n-i);$$

the energy of the unscaled fixed codebook excitation is calculated as $$E_i = 10\log\left(\frac{1}{40}\sum_{i=0}^{39} c^2(i)\right);$$

and the predicted gain $g_c'$ is obtained as $g_c' = 10^{(0.05(\tilde{E}(n)+\bar{E}-E_i))}$. The quantized fixed codebook gain is given as $\bar{g}_c = \bar{\gamma} g_c'$. For 11 kbps bit rate, the received adaptive codebook gain index is used to readily find the quantized adaptive gain, $\bar{g}_p$ from the quantization table. The received fixed codebook gain index gives the fixed codebook gain correction factor $\gamma'$. The calculation of the quantized fixed codebook gain, $\bar{g}_c$ follows the same steps as the other rates.

2) Decoding of adaptive codebook vector: for 8.0,11.0 and 6.65 (during LTP_mode=1) kbps bit rate encoding modes, the received pitch index (adaptive codebook index) is used to find the integer and fractional parts of the pitch lag. The adaptive codebook v(n) is found by interpolating the past excitation u(n) (at the pitch delay) using the FIR filters.

3) Decoding of fixed codebook vector: the received codebook indices are used to extract the type of the codebook (pulse or Gaussian) and either the amplitudes and positions of the excitation pulses or the bases and signs of the Gaussian excitation. In either case, the reconstructed fixed codebook excitation is given as c(n). If the integer part of the pitch lag is less than the subframe size 40 and the chosen excitation is pulse type, the pitch sharpening is applied. This translates into modifying c(n) as $c(n)=c(n)+\beta c(n-T)$, where $\beta$ is the decoded pitch gain $\bar{g}_p$ from the previous subframe bounded by [0.2,1.0].

The excitation at the input of the synthesis filter is given by $u(n)=\bar{g}_p v(n)+\bar{g}_c c(n), n=0,39$. Before the speech synthesis, a post-processing of the excitation elements is performed. This means that the total excitation is modified by emphasizing the contribution of the adaptive codebook vector:

$$\bar{u}(n) = \begin{cases} u(n) + 0.25\beta\bar{g}_p v(n), & \bar{g}_p > 0.5 \\ u(n), & \bar{g}_p <= 0.5 \end{cases}$$

Adaptive gain control (AGC) is used to compensate for the gain difference between the unemphasized excitation u(n) and emphasized excitation $\bar{u}(n)$. The gain scaling factor $\eta$ for the emphasized excitation is computed by:

$$\eta = \begin{cases} \sqrt{\dfrac{\sum_{n=0}^{39} u^2(n)}{\sum_{n=0}^{39} \bar{u}^2(n)}} & \bar{g}_p > 0.5 \\ 1.0 & \bar{g}_p <= 0.5 \end{cases}$$

The gain-scaled emphasized excitation $\bar{u}(n)$ is given by:

$$\bar{u}'(n) = \eta\bar{i}(n).$$

The reconstructed speech is given by:

$$\bar{s}(n) = \bar{u}(n) - \sum_{i=1}^{10} \bar{a}_i \bar{s}(n-i),\ n = 0 \text{ to } 39,$$

where $\bar{a}_i$ are the interpolated LP filter coefficients. The synthesized speech $\bar{s}(n)$ is then passed through an adaptive postfilter.

Post-processing consists of two functions: adaptive postfiltering and signal up-scaling. The adaptive postfilter is the cascade of three filters: a formant postfilter and two tilt compensation filters. The postfilter is updated every subframe of 5 ms. The formant postfilter is given by:

$$H_f(z) = \frac{\bar{A}\left(\frac{z}{\gamma_n}\right)}{\bar{A}\left(\frac{z}{\gamma_d}\right)}$$

where $\bar{A}(z)$ is the received quantized and interpolated LP inverse filter and $\gamma_n$ and $\gamma_d$ control the amount of the formant postfiltering.

The first tilt compensation filter $H_{t1}(z)$ compensates for the tilt in the formant postfilter $H_f(z)$ and is given by:

$$H_{t1}(z)=(1-\mu z^{-1})$$

where $\mu=\gamma_{t1}k_1$ is a tilt factor, with $k_1$ being the first reflection coefficient calculated on the truncated impulse response $h_f(n)$, of the formant postfilter $$k_1 = \frac{r_h(1)}{r_h(0)}$$

with:

$$r_h(i) = \sum_{j=0}^{L_h-i-1} h_f(j)h_f(j+i),\ (L_h = 22).$$

The postfiltering process is performed as follows. First, the synthesized speech $\bar{s}(n)$ is inverse filtered through $\bar{A}(z/\gamma_n)$ to produce the residual signal $\bar{r}(n)$. The signal $\bar{r}(n)$ is filtered by the synthesis filter $1/\bar{A}(z/\gamma_d)$ is passed to the first tilt compensation filter $h_{t1}(z)$ resulting in the postfiltered speech signal $\bar{s}_f(n)$.

Adaptive gain control (AGC) is used to compensate for the gain difference between the synthesized speech signal $\bar{s}(n)$ and the postfiltered signal $\bar{s}_f(n)$. The gain scaling factor $\gamma$ for the present subframe is computed by:

$$\gamma = \sqrt{\frac{\sum_{n=0}^{39} \bar{s}^2(n)}{\sum_{n=0}^{39} \bar{s}_f^2(n)}}$$

The gain-scaled postfiltered signal $\bar{s}'(n)$ is given by:

$$\bar{s}'(n)=\beta(n)\bar{s}_f(n)$$

where $\beta(n)$ is updated in sample by sample basis and given by:

$$\beta(n)=\alpha\beta(n-1)+(1-\alpha)\gamma$$

where α is an AGC factor with value 0.9. Finally, up-scaling consists of multiplying the postfiltered speech by a factor 2 to undo the down scaling by 2 which is applied to the input signal.

Figure 6:
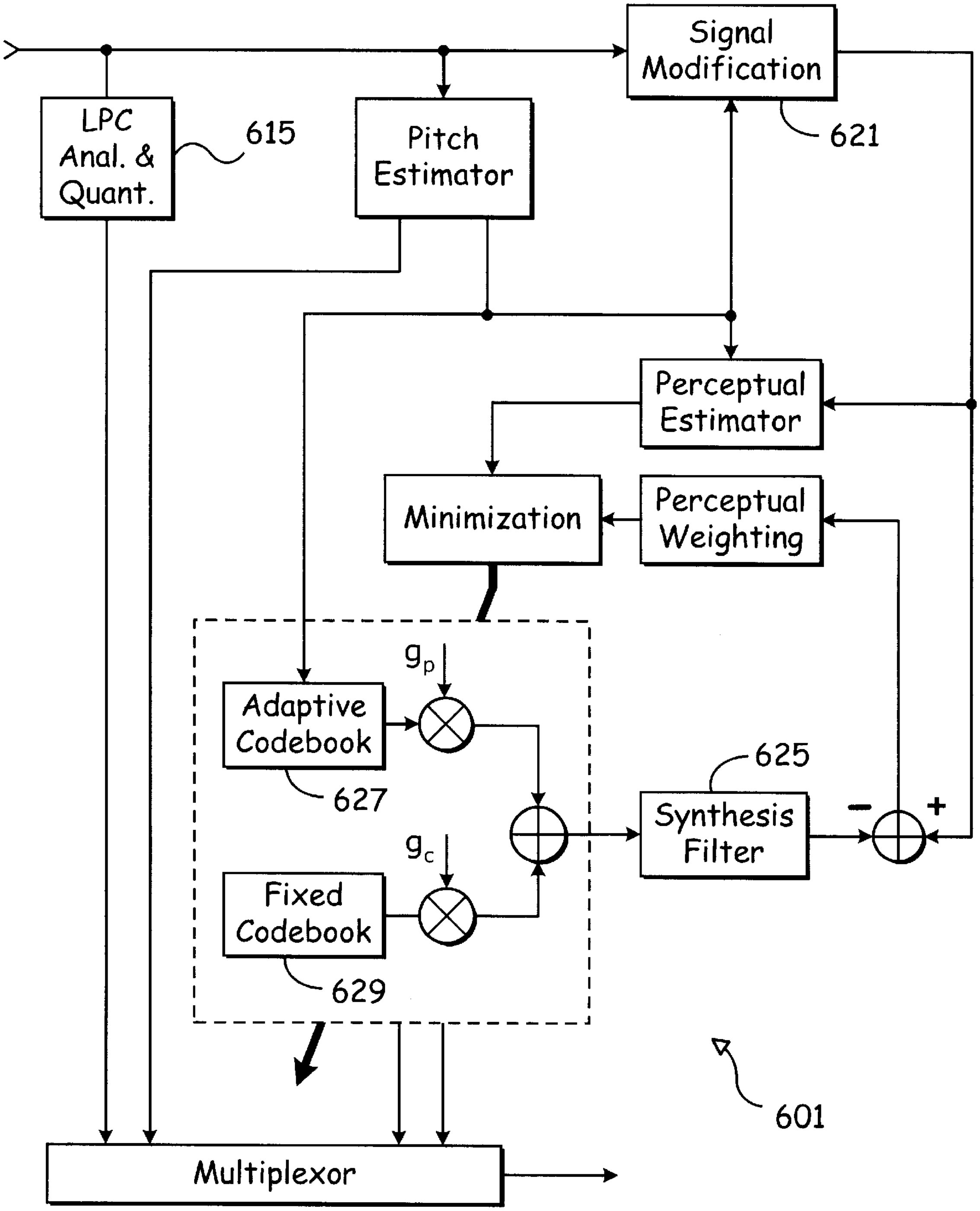
FIG. 6 is a block diagram of an alternate embodiment of a speech encoder that is built in accordance with the present invention.
Figure 7:
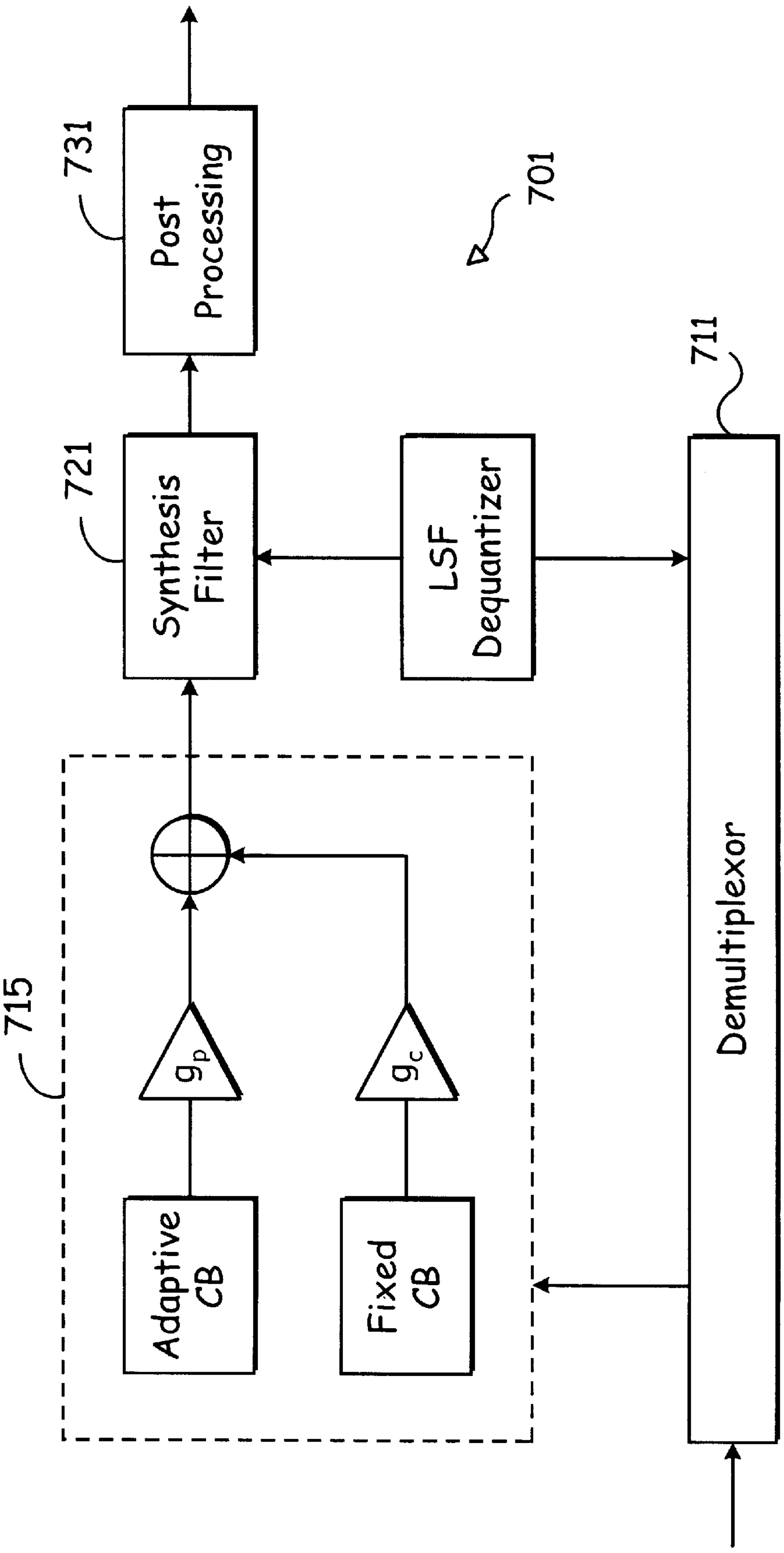
FIG. 7 is a block diagram of an embodiment of a speech decoder having corresponding functionality to that of the speech encoder of FIG. 6.

FIGS. 6 and 7 are drawings of an alternate embodiment of a 4 kbps speech codec that also illustrates various aspects of the present invention. In particular, FIG. 6 is a block diagram of a speech encoder 601 that is built in accordance with the present invention. The speech encoder 601 is based on the analysis-by-synthesis principle. To achieve toll quality at 4 kbps, the speech encoder 601 departs from the strict waveform-matching criterion of regular CELP coders and strives to catch the perceptually important features of the input signal.

The speech encoder 601 operates on a frame size of 20 ms with three subframes (two of 6.625 ms and one of 6.75 ms). A look-ahead of 15 ms is used. The one-way coding delay of the codec adds up to 55 ms.

At a block 615, the spectral envelope is represented by a $10^{th}$ order LPC analysis for each frame. The prediction coefficients are transformed to the Line Spectrum Frequencies (LSFs) for quantization. The input signal is modified to better fit the coding model without loss of quality. This processing is denoted "signal modification" as indicated by a block 621. In order to improve the quality of the reconstructed sign, perceptually important features are estimated and emphasized during encoding.

The excitation signal for an LPC synthesis filter 625 is build from the two traditional components: 1) the pitch contribution; and 2) the innovation contribution. The pitch contribution is provided through use of an adaptive codebook 627. An innovation codebook 629 has several subcodebooks in order to provide robustness against a wide range of input signals. To each of the two contributions a gain is applied which, multiplied with their respective codebook vectors and summed, provide the excitation signal.

The LSFs and pitch lag are coded on a frame basis, and the remaining parameters (the innovation codebook index, the pitch gain, and the innovation codebook gain) are coded for every subframe. The LSF vector is coded using predictive vector quantization. The pitch lag has an integer part and a fractional part constituting the pitch period. The quantized pitch period has a non-uniform resolution with higher density of quantized values at lower delays. The bit allocation for the parameters is shown in the following table.

Table of Bit Allocation

| Parameter | Bits per 20 ms |
|---|---|
| LSFs | 21 |
| Pitch lag (adaptive codebook) | 8 |
| Gains | 12 |
| Innovation codebook | 3 × 13 = 39 |
| Total | 80 |

When the quantization of all parameters for a frame is complete the indices are multiplexed to form the 80 bits for the serial bit-stream.

FIG. 7 is a block diagram of a decoder 701 with corresponding functionality to that of the encoder of FIG. 6. The decoder 701 receives the 80 bits on a frame basis from a demultiplexor 711. Upon receipt of the bits, the decoder 701 checks the sync-word for a bad frame indication, and decides whether the entire 80 bits should be disregarded and frame erasure concealment applied. If the frame is not declared a frame erasure, the 80 bits are mapped to the parameter indices of the codec, and the parameters are decoded from the indices using the inverse quantization schemes of the encoder of FIG. 6.

When the LSFs, pitch lag, pitch gains, innovation vectors, and gains for the innovation vectors are decoded, the excitation signal is reconstructed via a block 715. The output signal is synthesized by passing the reconstructed excitation signal through an LPC synthesis filter 721. To enhance the perceptual quality of the reconstructed signal both short-term and long-term post-processing are applied at a block 731.

Regarding the bit allocation of the 4 kbps codec (as shown in the prior table), the LSFs and pitch lag are quantized with 21 and 8 bits per 20 ms, respectively. Although the three subframes are of different size the remaining bits are allocated evenly among them. Thus, the innovation vector is quantized with 13 bits per subframe. This adds up to a total of 80 bits per 20 ms, equivalent to 4 kbps.

The estimated complexity numbers for the proposed 4 kbps codec are listed in the following table. All numbers are under the assumption that the codec is implemented on commercially available 16-bit fixed point DSPs in full duplex mode. All storage numbers are under the assumption of 16-bit words, and the complexity estimates are based on the floating point C-source code of the codec.

Table of Complexity Estimates

| Computational complexity | 30 MIPS |
|---|---|
| Program and data ROM | 18 kwords |
| RAM | 3 kwords |

The decoder 701 comprises decode processing circuitry that generally operates pursuant to software control. Similarly, the encoder 601 (FIG. 6) comprises encoder processing circuitry also operating pursuant to software control. Such processing circuitry may coexist, at least in part, within a single processing unit such as a single DSP.

Figure 8:
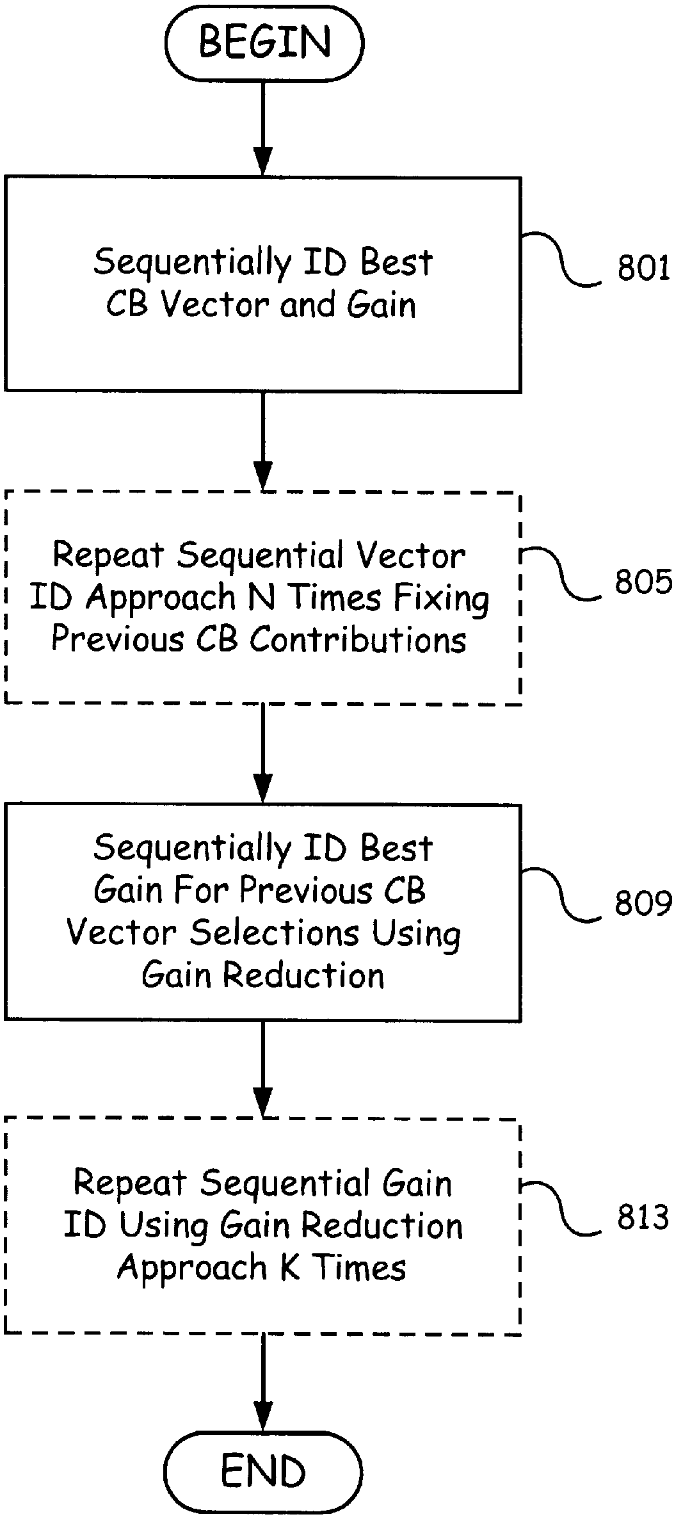
FIG. 8 is a flow diagram illustrating a process used by an encoder of the present invention to fine tune excitation contributions from a plurality of codebooks using code excited linear prediction.

FIG. 8 is a flow diagram illustrating a process used by an encoder of the present invention to fine tune excitation contributions from a plurality of codebooks using code excited linear prediction. Using a code-excited linear prediction approach, a plurality of codebooks are used to generate excitation contributions as previous described, for example, with reference to the adaptive and fixed codebooks. Although typically only two codebooks are used at any time to generate contributions, many more might be used with the present searching and optimization approach.

Specifically, an encoder processing circuit at a block 801 sequentially identifies a best codebook vector and associated gain from each codebook contribution used. For example, an adaptive codebook vector and associated gain are identified by minimizing a first target signal as described previously with reference to FIG. 2.

At a block 805 if employed, the encoder processing circuit repeats at least part of the sequential identification process represented by the block 801 yet with at least one of the previous codebook contributions fixed. For example, having first found the adaptive then the fixed codebook contributions, the adaptive codebook vector and gain might be searched for a second time. Of course, to continue the sequential process, after finding the best adaptive codebook contribution the second time, the fixed codebook contribution might also be reestablished. The process represented by the block 805 might also be reapplied several times, or not at all as is the case of the embodiment identified in FIG. 2, for example.

Thereafter, at a block 809, the encoder processing circuit only attempts to optimize the gains of the contributions of the plurality of codebooks at issue. In particular, the best gain for a first of the codebooks is reduced, and a second codebook gain is optimally selected. Similarly, if more than two codebooks are simultaneously employed, the second and/or the first codebook gains can be reduced before optimal gain calculation for a third codebook is undertaken.

For example, with reference to FIG. 3, the adaptive codebook gain is reduced before calculating an optimum gain for the fixed codebook, wherein both codebook vectors themselves remain fixed. Although a fixed gain reduction might be applied, in the embodiment of FIG. 3, the gain reduction is adaptive. As will be described with reference to FIG. 10 below, such adaptation may involve a consideration of the encoding bit rate and the normalized LTP gain.

Although further processing need not be employed, at a block 813, in some embodiments, the encoder processing circuitry may repeat the sequential gain identification process a number of times. For example, after calculating the optimal gain for the fixed codebook with the reduced gain applied to the adaptive codebook (at the block 809), the fixed codebook gain might be (adaptively) reduced so that the fixed codebook gain might be recalculated. Further fine-tuning turns might also apply should processing resources support. However, with limited processing resources, neither processing at the block 805 nor at the block 813 need be applied.

Figure 9:
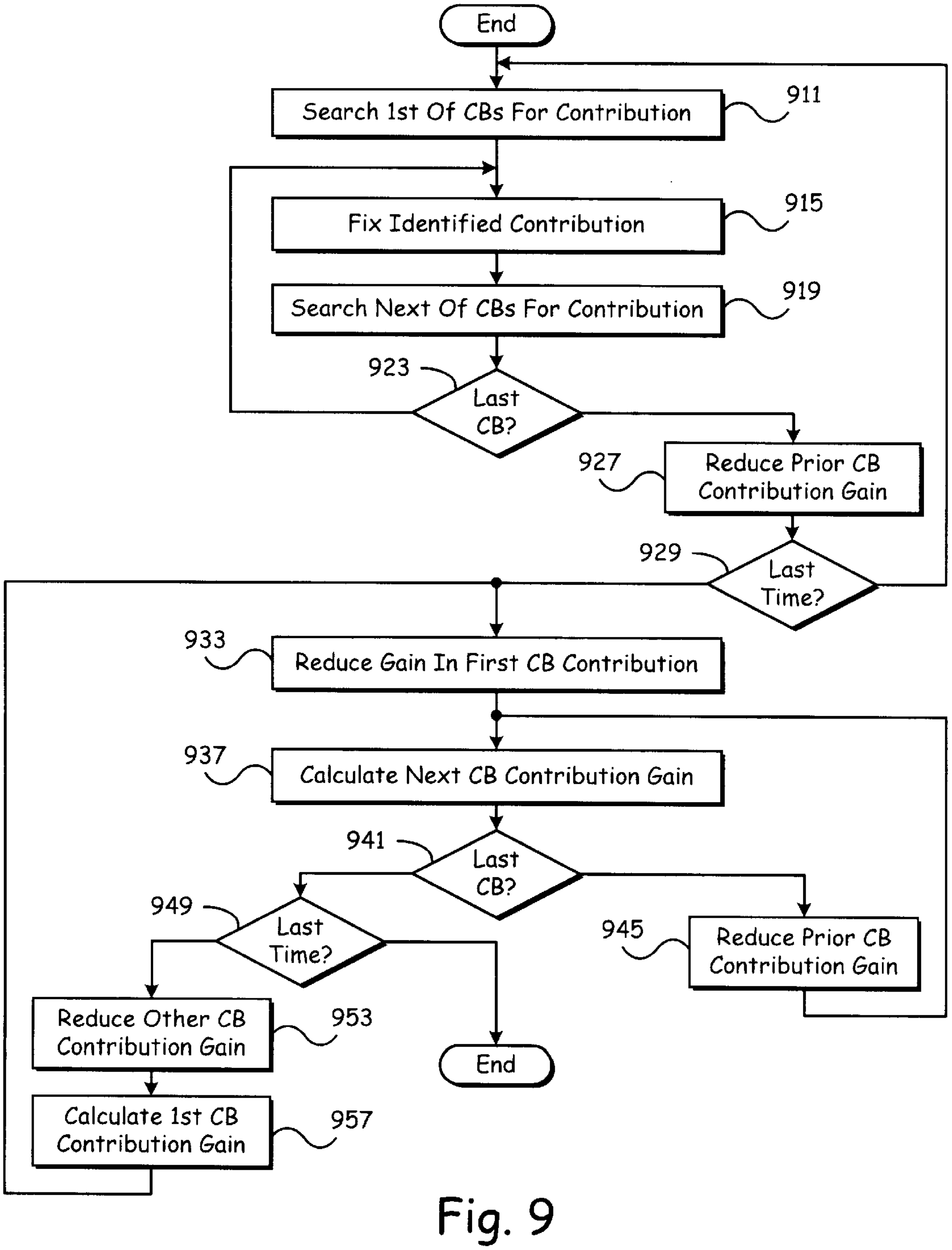
FIG. 9 is a flow diagram illustrating use of adaptive LTP gain reduction to produce a second target signal for fixed codebook searching in accordance with the present invention, in a specific embodiment of the functionality of FIG. 8.

FIG. 9 is a flow diagram illustrating use of adaptive LTP gain reduction to produce a second target signal for fixed codebook searching in accordance with the present invention, in a specific embodiment of the functionality of FIG. 8. In particular, at a block 911, a first of a plurality of codebooks is searched to attempt to find a best contribution. The codebook contribution comprises an excitation vector and a gain. With the first contribution applied as indicated by a block 915, a best contribution from a next codebook is found at a block 919. This process is repeated until all of the "best" codebook contributions are found as indicated by the looping associated with a decision block 923.

When only an adaptive codebook and a fixed codebook are used, the process identified in the blocks 911–919 involves identifying the adaptive codebook contribution, then, with the adaptive codebook contribution in place, identifying the fixed codebook contribution. Further detail regarding one example of this process can be found above in reference to FIG. 3.

Having identified the "best" codebook contributions, in some embodiments, the encoder will repeat the process of the blocks 911–923 a plurality of times in an attempt to fine tune the "best" codebook contributions. Whether or not such fine tuning is applied, once completed, the encoder, having fixed all of the "best" excitation vectors, attempts to fine tune the codebook gains. Particularly, at a block 933, the gain of at least one of the codebooks is reduced so that the gain of the other(s) may be recalculated via a loop through blocks 937, 941 and 945. For example, with only an adaptive and a fixed codebook, the adaptive codebook gain is reduced, in some embodiments adaptively, so that the fixed codebook gain may be recalculated with the reduced, adaptive codebook contribution in place.

Again, multiple passes of such gain fine-tuning may be applied a number of times should processing constraints permit via blocks 949, 953 and 957. For example, once the fixed codebook gain is recalculated, it might be reduced to permit fine tuning of the adaptive codebook gain, and so on.

Figure 10:
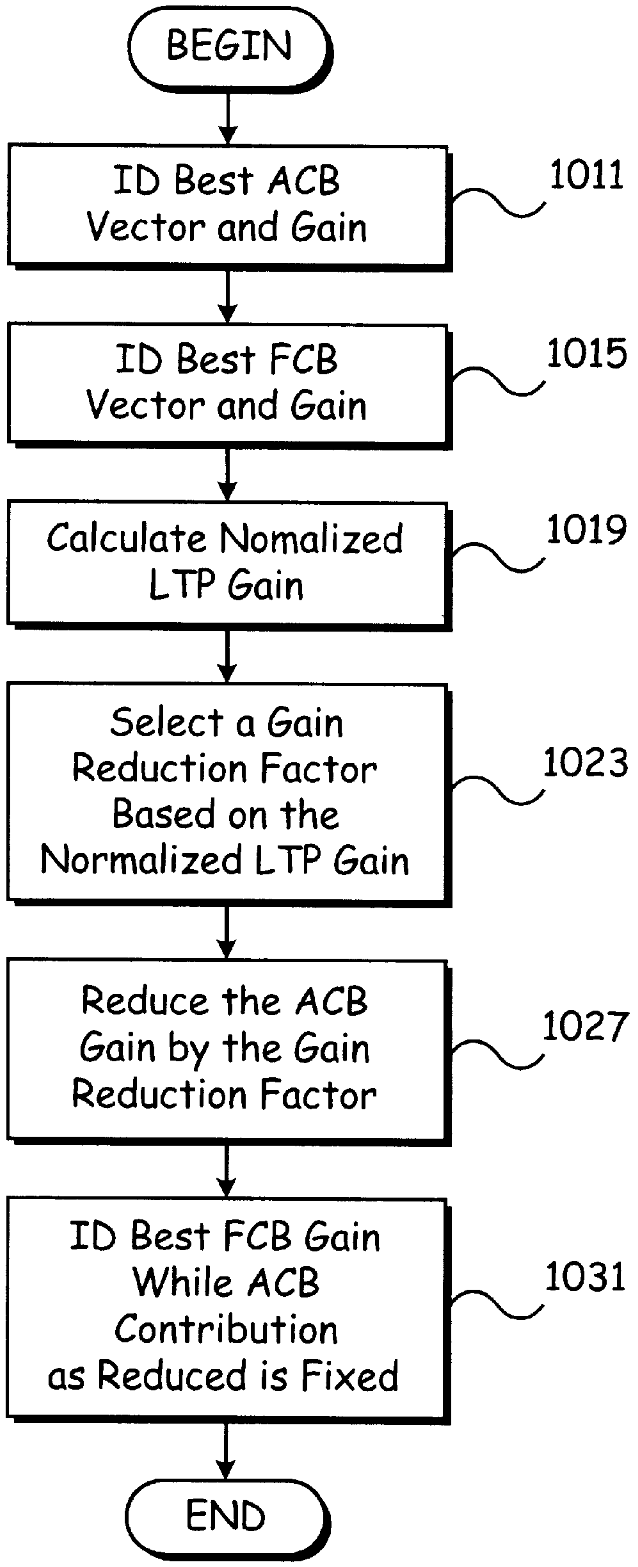
FIG. 10 illustrates a particular embodiment of adaptive gain optimization wherein an encoder, having an adaptive codebook and a fixed codebook, uses only a single pass to select codebook excitation vectors and a single pass of adaptive gain reduction.

FIG. 10 illustrates a particular embodiment of adaptive gain optimization wherein an encoder, having an adaptive codebook and a fixed codebook, uses only a single pass to select codebook excitation vectors and a single pass of adaptive gain reduction. At a block 1011, an encoder searches for and identifies a "best" adaptive codebook contribution (i.e., a gain and an excitation vector).

The best adaptive codebook contribution is used to produce a target signal, $T_g(n)$, for the fixed codebook search. At a block 1015, such search is performed to find a "best" fixed codebook contribution. Thereafter, only the code vectors of the adaptive and fixed codebook contributions are fixed, while the gains are jointly optimized.

At blocks 1019 and 1023, the gain associated with the best adaptive codebook contribution is reduced by a varying amount. Although other adaptive techniques might be employed, the encoder calculates a gain reduction factor, $G_r$, which is generally based on the decoding bit rate and the degree of correlation between the original target signal, $T_{gs}(n)$, and the filtered signal from the adaptive codebook, $Y_a(n)$.

Thereafter, at a block 1027, the adaptive codebook gain is reduced by the gain reduction factor and a new target signal is generated for use in selecting an optimal fixed codebook gain at a block 1031. Of course, although not utilized, repeated application of such an approach might be employed to further fine tune the fixed and adaptive codebook contributions.

More specifically, to enhance the quality of the fixed codebook search, the target signal, $T_g(n)$, for the fixed codebook search is produced by temporally reducing the LTP contribution with a gain factor, $G_r$, as follows:

$$T_g(n)=T_{gs}(n)-G_r \cdot g_p \cdot Y_a(n),\ n=0,1, \ldots ,39$$

where $T_{gs}(n)$ is the original target, $Y_a(n)$ is the filtered signal from the adaptive codebook, $g_p$ is the LTP gain defined above, and the gain factor is determined according to the normalized LTP gain, $R_p$, and the bit rate as follows:

if (rate<=0)/*for 4.45 kbps and 5.8 kbps*/
  $G_r=0.7\ R_p+0.3$;
if (rate==1)/*for 6.65 kbps*/
  $G_r=0.6\ R_p+0.4$;
if (rate==2)/*for 8.0 kbps*/
  $G_r=0.3\ R_p+0.7$;
if (rate==3)/*for 11.0 kbps*/
  $G_r=0.95$;
if ($T_{op}$>L_SF & $g_p$>0.5 & rate<=2)
  $G_r \Leftarrow G_r \cdot (0.3\ R_p+0.7)$;

In addition, the normalized LTP gain, $R_p$, is defined as:

$$R_p = \frac{\sum_{n=0}^{39} T_{gs}(n) Y_a(n)}{\sqrt{\sum_{n=0}^{39} T_{gs}(n) T_{gs}(n)}\ \sqrt{\sum_{n=0}^{39} Y_a(n) Y_a(n)}}$$

Of course, many other modifications and variations are also possible. In view of the above detailed description of the present invention and associated drawings, such other modifications and variations will now become apparent to those skilled in the art. It should also be apparent that such other modifications and variations may be effected without departing from the spirit and scope of the present invention.

In addition, the following Appendix A provides a list of many of the definitions, symbols and abbreviations used in this application. Appendices B and C respectively provide source and channel bit ordering information at various encoding bit rates used in one embodiment of the present invention. Appendices A, B and C comprise part of the detailed description of the present application, and, otherwise, are hereby incorporated herein by reference in its entirety.

APPENDIX A

For purposes of this application, the following symbols, definitions and abbreviations apply.

| | |
|---|---|
| adaptive codebook: | The adaptive codebook contains excitation vectors that are adapted for every subframe. The adaptive codebook is derived from the long term filter state. The pitch lag value can be viewed as an index into the adaptive codebook. |
| adaptive postfilter: | The adaptive postfilter is applied to the output of the short term synthesis filter to enhance the perceptual quality of the reconstructed speech. In the adaptive multi-rate codec (AMR), the adaptive postfilter is a cascade of two filters: a formant postfilter and a tilt compensation filter. |
| Adaptive Multi Rate codec: | The adaptive multi-rate code (AMR) is a speech and channel codec capable of operating at gross bit-rates of 11.4 kbps ("half-rate") and 22.8 kbs ("full-rate"). In addition, the codec may operate at various combinations of speech and channel coding (codec mode) bit-rates for each channel mode. |
| AMR handover: | Handover between the full rate and half rate channel modes to optimize AMR operation. |
| channel mode: | Half-rate (HR) or full-rate (FR) operation. |
| channel mode adaptation: | The control and selection of the (FR or HR) channel mode. |
| channel repacking: | Repacking of HR (and FR) radio channels of a given radio cell to achieve higher capacity within the cell. |
| closed-loop pitch analysis: | This is the adaptive codebook search, i.e., a process of estimating the pitch (lag) value from the weighted input speech and the long term filter state. In the closed-loop search, the lag is searched using error minimization loop (analysis-by-synthesis). In the adaptive multi rate codec, closed-loop pitch search is performed for every subframe. |
| codec mode: | For a given channel mode, the bit partitioning between the speech and channel codecs. |
| codec mode adaptation: | The control and selection of the codec mode bit-rates. Normally, implies no change to the channel mode. |
| direct form coefficients: | One of the formats for storing the short term filter parameters. In the adaptive multi rate codec, all filters used to modify speech samples use direct form coefficients. |
| fixed codebook: | The fixed codebook contains excitation vectors for speech synthesis filters. The contents of the codebook are non-adaptive (i.e., fixed). In the adaptive multi rate codec, the fixed codebook for a specific rate is implemented using a multi-function codebook. |
| fractional lags: | A set of lag values having sub-sample resolution. In the adaptive multi rate codec a sub-sample resolution between $1/6^{th}$ and 1.0 of a sample is used. |
| full-rate (FR): | Full-rate channel or channel mode. |
| frame: | A time interval equal to 20 ms (160 samples at an 8 kHz sampling rate). |
| gross bit-rate: | The bit-rate of the channel mode selected (22.8 kbps or 11.4 kbps). |
| half-rate (HR): | Half-rate channel or channel mode. |
| in band signaling: | Signaling for DTX, Link Control, Channel and codec mode modification, etc. carried within the traffic. |
| integer lags: | A set of lag values having whole sample resolution. |
| interpolating filter: | An FIR filter used to produce an estimate of sub-sample resolution samples, given an input sampled with integer sample resolution. |
| inverse filter: | This filter removes the short term correlation from the speech signal. The filter models an inverse frequency response of the vocal tract. |
| lag: | The long term filter delay. This is typically the true pitch period, or its multiple or sub-multiple. |
| Line Spectral Frequencies: | (see Line Spectral Pair) |
| Line Spectral Pair: | Transformation of LPC parameters. Line Spectral Pairs are obtained by decomposing the inverse filter transfer function A(z) to a set of two transfer functions, one having even symmetry and the other having odd symmetry. The Line Spectral Pairs (also called as Line Spectral Frequencies) are the roots of these polynomials on the z-unit circle). |
| LP analysis window: | For each frame, the short term filter coefficients are computed using the high pass filtered speech samples within the analysis window. In the adaptive multi rate codec, the length of the analysis window is always 240 samples. For each frame, two asymmetric windows are used to generate two sets of LP coefficient coefficients which are interpolated in the LSF domain to construct the perceptual weighting filter. Only a single set of LP coefficients |

-continued

| APPENDIX A<br>For purposes of this application, the following symbols, definitions and abbreviations apply. | |
|---|---|
| | per frame is quantized and transmitted to the decoder to obtain the synthesis filter. A look ahead of 25 samples is used for both HR and FR. |
| LP coefficients: | Linear Prediction (LP) coefficients (also referred as Linear Predictive Coding (LPC) coefficients) is a generic descriptive term for describing the short term filter coefficients. |
| LTP Mode: | Codec works with traditional LTP. |
| mode: | When used alone, refers to the source codec mode, i.e., to one of the source codecs employed in the AMR codec. (See also codec mode and channel mode.) |
| multi-function codebook: | A fixed codebook consisting of several subcodebooks constructed with different kinds of pulse innovation vector structures and noise innovation vectors, where codeword from the codebook is used to synthesize the excitation vectors. |
| open-loop pitch search: | A process of estimating the near optimal pitch lag directly from the weighted input speech. This is done to simplify the pitch analysis and confine the closed-loop pitch search to a small number of lags around the open-loop estimated lags. In the adaptive multi rate codec, open-loop pitch search is performed once per frame for PP mode and twice per frame for LTP mode. |
| out-of-band signaling: | Signaling on the GSM control channels to support link control. |
| PP Mode: | Codec works with pitch preprocessing. |
| residual: | The output signal resulting from an inverse filtering operation. |
| short term synthesis filter: | This filter introduces, into the excitation signal, short term correlation which models the impulse response of the vocal tract. |
| perceptual weighting filter: | This filter is employed in the analysis-by-synthesis search of the codebooks. The filter exploits the noise masking properties of the formants (vocal tract resonances) by weighting the error less in regions near the formant frequencies and more in regions away from them. |
| subframe: | A time interval equal to 5–10 ms (40–80 samples at an 8 kHz sampling rate). |
| vector quantization: | A method of grouping several parameters into a vector and quantizing them simultaneously. |
| zero input response: | The output of a filter due to past inputs, i.e. due to the present state of the filter, given that an input of zeros is applied. |
| zero state response: | The output of a filter due to: the present input, given that no past inputs have been applied, i.e., given the state information in the filter is all zeroes. |
| $A(z)$ | The inverse filter with unquantized coefficients |
| $\hat{A}(z)$ | The inverse filter with quantized coefficients |
| $H(z) = \frac{1}{\hat{A}(z)}$ | The speech synthesis filter with quantized coefficients |
| $a_i$ | The unquantized linear prediction parameters (direct form coefficients) |
| $\hat{a}_i$ | The quantized linear prediction parameters |
| $\frac{1}{B(z)}$ | The long-term synthesis filter |
| $W(z)$ | The perceptual weighting filter (unquantized coefficients) |
| $\gamma_1, \gamma_2$ | The perceptual weighting factors |
| $F_E(z)$ | Adaptive pre-filter |
| $T$ | The nearest integer pitch lag to the closed-loop fractional pitch lag of the subframe |
| $\beta$ | The adaptive pre-filter coefficient (the quantized pitch gain) |
| $H_f(z) = \frac{\hat{A}(z/\gamma_n)}{\hat{A}(z/\gamma_d)}$ | The formant postfilter |
| $\gamma_n$ | Control coefficient for the amount of the formant post-filtering |
| $\gamma_d$ | Control coefficient for the amount of the formant post-filtering |
| $H_t(z)$ | Tilt compensation filter |
| $\gamma_t$ | Control coefficient for the amount of the tilt compensation filtering |
| $\mu = \gamma_t k_1'$ | A tilt factor, with $k_1'$ being the first reflection coefficient |
| $h_f(n)$ | The truncated impulse response of the formant postfilter |
| $L_h$ | The length of $h_f(n)$ |
| $r_h(i)$ | The auto-correlations of $h_f(n)$ |
| $\hat{A}(z/\gamma_n)$ | The inverse filter (numerator) part of the formant postfilter |

-continued

APPENDIX A

For purposes of this application, the following symbols, definitions and abbreviations apply.

| | |
|---|---|
| $1/\hat{A}(z/\gamma_d)$ | The synthesis filter (denominator) part of the formant postfilter |
| $\hat{r}(n)$ | The residual signal of the inverse filter $\hat{A}(z/\gamma_n)$ |
| $h_t(z)$ | Impulse response of the tilt compensation filter |
| $\beta_{sc}(n)$ | The AGC-controlled gain scaling factor of the adaptive postfilter |
| $\alpha$ | The AGC factor of the adaptive postfilter |
| $H_{h1}(z)$ | Pre-processing high-pass filter |
| $w_I(n)$, $w_{II}(n)$ | LP analysis windows |
| $L_1^{(I)}$ | Length of the first part of the LP analysis window $w_I(n)$ |
| $L_2^{(I)}$ | Length of the second part of the LP analysis window $w_I(n)$ |
| $L_1^{(II)}$ | Length of the first part of the LP analysis window $w_{II}(n)$ |
| $L_2^{(II)}$ | Length of the second part of the LP analysis window $w_{II}(n)$ |
| $r_{ac}(k)$ | The auto-correlations of the windowed speech s'(n) |
| $w_{lag}(i)$ | Lag window for the auto-correlations (60 Hz bandwidth expansion) |
| $f_0$ | The bandwidth expansion in Hz |
| $f_s$ | The sampling frequency in Hz |
| $r'_{ac}(k)$ | The modified (bandwidth expanded) auto-correlations |
| $E_{LD}(i)$ | The prediction error in the ith iteration of the Levinson algorithm |
| $k_i$ | The ith reflection coefficient |
| $a_j^{(i)}$ | The jth direct form coefficient in the ith iteration of the Levinson algorithm |
| $F_1'(z)$ | Symmetric LSF polynomial |
| $F_2'(z)$ | Antisymmetric LSF polynomial |
| $F_1(z)$ | Polynomial $F_1'(z)$ with root $z = -1$ eliminated |
| $F_2(z)$ | Polynomial $F_2'(z)$ with root $z = 1$ eliminated |
| $q_i$ | The line spectral pairs (LSFs) in the cosine domain |
| $q$ | An LSF vector in the cosine domain |
| $q_i^{(n)}$ | The quantized LSF vector at the ith subframe of the frame n |
| $\omega_i$ | The line spectral frequencies (LSFs) |
| $T_m(x)$ | A mth order Chebyshev polynomial |
| $f_1(i)$, $f_2(i)$ | The coefficients of the polynomials $F_1(z)$ and $F_2(z)$ |
| $f_1'(i)$, $f_2'(i)$ | The coefficients of the polynomials $F_1'(z)$ and $F_2'(z)$ |
| $f(i)$ | The coefficients of either $F_1(z)$ or $F_2(z)$ |
| $C(x)$ | Sum polynomial of the Chebyshev polynomials |
| $x$ | Cosine of angular frequency $\omega$ |
| $\lambda_k$ | Recursion coefficients for the Chebyshev polynomial evaluation |
| $f_i$ | The line spectral frequencies (LSFs) in Hz |
| $f^t = [f_1 f_2 \ldots f_{10}]$ | The vector representation of the LSFs in Hz |
| $z^{(1)}(n)$, $z^{(2)}(n)$ | The mean-removed LSF vectors at frame n |
| $r^{(1)}(n)$, $r^{(2)}(n)$ | The LSF prediction residual vectors at frame n |
| $p(n)$ | The predicted LSF vector at frame n |
| $\hat{r}^{(2)}(n-1)$ | The quantized second residual vector at the past frame |
| $\hat{f}^k$ | The quantized LSF vector at quantization index k |
| $E_{LSP}$ | The LSF quantization error |
| $w_i$, $i = 1, \ldots, 10$, | LSF-quantization weighting factors |
| $d_i$ | The distance between the line spectral frequencies $f_{i+1}$ and $f_{i-1}$ |
| $h(n)$ | The impulse response of the weighted synthesis filter |
| $O_k$ | The correlation maximum of open-loop pitch analysis at delay k |
| $O_{ti}$, $i = 1, \ldots, 3$ | The correlation maxima at delays $t_i$, $i = 1, \ldots, 3$ |
| $(M_i, t_i)$, $i = 1, \ldots, 3$ | The normalized correlation maxima $M_i$ and the corresponding delays $t_i$, $i = 1, \ldots, 3$ |
| $H(z)W(z) = \dfrac{A(z/\gamma_1)}{\hat{A}(z)A(z/\gamma_2)}$ | The weighted synthesis filter |
| $A(z/\gamma_1)$ | The numerator of the perceptual weighting filter |
| $1/A(z/\gamma_2)$ | The denominator of the perceptual weighting filter |
| $T_1$ | The nearest integer to the fractional pitch lag of the previous (1st or 3rd) subframe |
| $s'(n)$ | The windowed speech signal |
| $s_w(n)$ | The weighted speech signal |
| $\hat{s}(n)$ | Reconstructed speech signal |
| $\hat{s}'(n)$ | The gain-scaled post-filtered signal |
| $\hat{s}_f(n)$ | Post-filtered speech signal (before scaling) |
| $x(n)$ | The target signal for adaptive codebook search |
| $x_2(n)$, $x_2^t$ | The target signal for Fixed codebook search |
| $res_{LP}(n)$ | The LP residual signal |
| $c(n)$ | The fixed codebook vector |
| $v(n)$ | The adaptive codebook vector |
| $y(n) = v(n) * h(n)$ | The filtered adaptive codebook vector |
| | The filtered fixed codebook vector |
| $y_k(n)$ | The past filtered excitation |
| $u(n)$ | The excitation signal |

-continued

| APPENDIX A<br>For purposes of this application, the following symbols, definitions and abbreviations apply. | |
|---|---|
| $\hat{u}(n)$ | The fully quantized excitation signal |
| $\hat{u}'(n)$ | The gain-scaled emphasized excitation signal |
| $T_{op}$ | The best open-loop lag |
| $t_{min}$ | Minimum lag search value |
| $t_{max}$ | Maximum lag search value |
| $R(k)$ | Correlation term to be maximized in the adaptive codebook search |
| $R(k)_t$ | The interpolated value of R(k) for the integer delay k and fraction t |
| $A_k$ | Correlation term to be maximized in the algebraic codebook search at index k |
| $C_k$ | The correlation in the numerator of $A_k$ at index k |
| $E_{Dk}$ | The energy in the denominator of $A_k$ at index k |
| $d = H^t x_2$ | The correlation between the target signal $x_2(n)$ and the impulse response h(n), i.e., backward filtered target |
| H | The lower triangular Toepliz convolution matrix with diagonal h(o) and lower diagonals h(1), . . . , h(39) |
| $\Phi = H^t H$ | The matrix of correlations of h(n) |
| d(n) | The elements of the vector d |
| $\phi(i, j)$ | The elements of the symmetric matrix $\Phi$ |
| $c_k$ | The innovation vector |
| C | The correlation in the numerator of $A_k$ |
| $m_i$ | The position of the i th pulse |
| $\nu_i$ | The amplitude of the i th pulse |
| $N_p$ | The number of pulses in the fixed codebook excitation |
| $E_D$ | The energy in the denominator of $A_k$ |
| $res_{LTP}(n)$ | The normalized long-term prediction residual |
| b(n) | The sum of the normalized d(n) vector and normalized long-term prediction residual $res_{LTP}(n)$ |
| $S_b(n)$ | The sign signal for the algebraic codebook search |
| $z^t$, z(n) | The fixed codebook vector convolved with h(n) |
| E(n) | The mean-removed innovation energy (in dB) |
| $\bar{E}$ | The mean of the innovation energy |
| $\tilde{E}(n)$ | The predicted energy |
| $[b_1\ b_2\ b_3\ b_4]$ | The MA prediction coefficients |
| $\hat{R}(k)$ | The quantized prediction error at subframe k |
| $E_I$ | The mean innovation energy |
| R(n) | The prediction error of the fixed-codebook gain quantization |
| $E_Q$ | The quantization error of the fixed-codebook gain quantization |
| e(n) | The states of the synthesis filter $1/\hat{A}(z)$ |
| $e_w(n)$ | The perceptually weighted error of the analysis-by-synthesis search |
| $\eta$ | The gain scaling factor for the emphasized excitation |
| $g_c$ | The fixed-codebook gain |
| $g'_c$ | The predicted fixed-codebook gain |
| $\hat{g}_c$ | The quantized fixed codebook gain |
| $g_p$ | The adaptive codebook gain |
| $\hat{g}_p$ | The quantized adaptive codebook gain |
| $\gamma_{gc} = g_c/g'_c$ | A correction factor between the gain $g_c$ and the estimated one $g'_c$ |
| $\hat{\gamma}_{gc}$ | The optimum value for $\gamma_{gc}$ |
| $\gamma_{sc}$ | Gain scaling factor |
| AGC | Adaptive Gain Control |
| AMR | Adaptive Multi Rate |
| CELP | Code Excited Linear Prediction |
| C/I | Carrier-to-Interferer ratio |
| DTX | Discontinuous Transmission |
| EFR | Enhanced Full Rate |
| FIR | Finite Impulse Response |
| FR | Full Rate |
| HR | Half Rate |
| LP | Linear Prediction |
| LPC | Linear Predictive Coding |
| LSF | Line Spectral Frequency |
| LSF | Line Spectral Pair |
| LTP | Long Term Predictor (or Long Term Prediction) |
| MA | Moving Average |
| TFO | Tandem Free Operation |
| VAD | Voice Activity Detection |

APPENDIX B
Bit ordering (source coding)

| Bits | Description |
|---|---|
| | Bit ordering of output bits from source encoder (11 kbit/s). |
| 1–6 | Index of 1st LSF stage |
| 7–12 | Index of 2nd LSF stage |
| 13–18 | Index of 3rd LSF stage |
| 19–24 | Index of 4th LSF stage |
| 25–28 | Index of 5th LSF stage |
| 29–32 | Index of adaptive codebook gain, 1st subframe |
| 33–37 | Index of fixed codebook gain, 1st subframe |
| 38–41 | Index of adaptive codebook gain, 2nd subframe |
| 42–46 | Index of fixed codebook gain, 2nd subframe |
| 47–50 | Index of adaptive codebook gain, 3rd subframe |
| 51–55 | Index of fixed codebook gain, 3rd subframe |
| 56–59 | Index of adaptive codebook gain, 4th subframe |
| 60–64 | Index of fixed codebook gain, 4th subframe |
| 65–73 | Index of adaptive codebook, 1st subframe |
| 74–82 | Index of adaptive codebook, 3rd subframe |
| 83–88 | Index of adaptive codebook (relative), 2nd subframe |
| 89–94 | Index of adaptive codebook (relative), 4th subframe |
| 95–96 | Index for LSF interpolation |
| 97–127 | Index for fixed codebook 1st subframe |
| 128–158 | Index for fixed codebook, 2nd subframe |
| 159–189 | Index for fixed codebook, 3rd subframe |
| 190–220 | Index for fixed codebook, 4th subframe |
| | Bit ordering of output bits from source encoder (8 kbit/s). |
| 1–6 | Index of 1st LSF stage |
| 7–12 | Index of 2nd LSF stage |
| 13–18 | Index of 3rd LSF stage |
| 19–24 | Index of 4th LSF stage |
| 25–31 | Index of fixed and adaptive codebook gains, 1st subframe |
| 32–38 | Index of fixed and adaptive codebook gains, 2nd subframe |
| 39–45 | Index of fixed and adaptive codebook gains, 3rd subframe |
| 46–52 | Index of fixed and adaptive codebook gains, 4th subframe |
| 53–60 | Index of adaptive codebook, 1st subframe |
| 61–68 | Index of adaptive codebook, 3rd subframe |
| 69–73 | Index of adaptive codebook (relative), 2nd subframe |
| 74–78 | Index of adaptive codebook (relative), 4th subframe |
| 79–80 | Index for LSF interpolation |
| 81–100 | Index for fixed codebook, 1st subframe |
| 101–120 | Index for fixed codebook, 2nd subframe |
| 121–140 | Index for fixed codebook, 3rd subframe |
| 141–160 | Index for fixed codebook, 4th subframe |

Bit ordering of output bits from source encoder (6.65 kbit/s).

| Bits | Description | |
|---|---|---|
| 1–6 | Index of 1st LSF stage | |
| 7–12 | Index of 2nd LSF stage | |
| 13–18 | Index of 3rd LSF stage | |
| 19–24 | Index of 4th LSF stage | |
| 25–31 | Index of fixed and adaptive codebook gains, 1st subframe | |
| 32–38 | Index of fixed and adaptive codebook gains, 2nd subframe | |
| 39–45 | Index of fixed and adaptive codebook gains, 3rd subframe | |
| 46–52 | Index of fixed and adaptive codebook gains, 4th subframe | |
| 53 | Index for mode (LTP or PP) | |
| | LTP mode | PP mode |
| 54–61 | Index of adaptive codebook, 1st subframe | Index of pitch |
| 62–69 | Index of adaptive codebook, 3rd subframe | |
| 70–74 | Index of adaptive codebook (relative), 2nd subframe | |
| 75–79 | Index of adaptive codebook (relative), 4th subframe | |
| 80–81 | Index for LSF interpolation | Index for LSF interpolation |
| 82–94 | Index for fixed codebook, 1st subframe | Index for fixed codebook, 1st subframe |
| 95–107 | Index for fixed codebook, 2nd subframe | Index for fixed codebook, 2nd subframe |
| 108–120 | Index for fixed codebook, 3rd subframe | Index for fixed codebook, 3rd subframe |
| 121–133 | Index for fixed codebook, 4th subframe | Index for fixed codebook, 4th subframe |

-continued

APPENDIX B
Bit ordering (source coding)

| Bits | Description |
|---|---|
| | Bit ordering of output bits from source encoder (5.8 kbit/s). |
| 1–6 | Index of 1st LSF stage |
| 7–12 | Index of 2nd LSF stage |
| 13–18 | Index of 3rd LSF stage |
| 19–24 | Index of 4th LSF stage |
| 25–31 | Index of fixed and adaptive codebook gains, 1st subframe |
| 32–38 | Index of fixed and adaptive codebook gains, 2nd subframe |
| 39–45 | Index of fixed and adaptive codebook gains, 3rd subframe |
| 46–52 | Index of fixed and adaptive codebook gains, 4th subframe |
| 53–60 | Index of pitch |
| 61–74 | Index for fixed codebook, 1st subframe |
| 75–88 | Index for fixed codebook, 2nd subframe |
| 89–102 | Index for fixed codebook, 3rd subframe |
| 93–116 | Index for fixed codebook, 4th subframe |
| | Bit ordering of output bits from source encoder (4.55 kbit/s). |
| 1–6 | Index of 1st LSF stage |
| 7–12 | Index of 2nd LSF stage |
| 13–18 | Index of 3rd LSF stage |
| 19 | Index of predictor |
| 20–25 | Index of fixed and adaptive codebook gains, 1st subframe |
| 26–31 | Index of fixed and adaptive codebook gains, 2nd subframe |
| 32–37 | Index of fixed and adaptive codebook gains, 3rd subframe |
| 38–43 | Index of fixed and adaptive codebook gains, 4th subframe |
| 44–51 | Index of pitch |
| 52–61 | Index for fixed codebook, 1st subframe |
| 62–71 | Index for fixed codebook, 2nd subframe |
| 72–81 | Index for fixed codebook, 3rd subframe |
| 82–91 | Index for fixed codebook, 4th subframe |

APPENDIX C
Bit ordering (channel coding)

| Bits, see table XXX | Description |
|---|---|
| | Ordering of bits according to subjective importance (11 kbit/s FRTCH). |
| 1 | lsf1-0 |
| 2 | lsf1-1 |
| 3 | lsf1-2 |
| 4 | lsf1-3 |
| 5 | lsf1-4 |
| 6 | lsf1-5 |
| 7 | lsf2-0 |
| 8 | lsf2-1 |
| 9 | lsf2-2 |
| 10 | lsf2-3 |
| 11 | lsf2-4 |
| 12 | lsf2-5 |
| 65 | pitch1-0 |
| 66 | pitch1-1 |
| 67 | pitch1-2 |
| 68 | pitch1-3 |
| 69 | pitch1-4 |
| 70 | pitch1-5 |
| 74 | pitch3-0 |
| 75 | pitch3-1 |
| 76 | pitch3-2 |
| 77 | pitch3-3 |
| 78 | pitch3-4 |
| 79 | pitch3-5 |
| 29 | gp1-0 |
| 30 | gp1-1 |
| 38 | gp2-0 |

-continued

APPENDIX C
Bit ordering (channel coding)

| Bits, see table XXX | Description |
|---|---|
| 39 | gp2-1 |
| 47 | gp3-0 |
| 48 | gp3-1 |
| 56 | gp4-0 |
| 57 | gp4-1 |
| 33 | gc1-0 |
| 34 | gc1-1 |
| 35 | gc1-2 |
| 42 | gc2-0 |
| 43 | gc2-1 |
| 44 | gc2-2 |
| 51 | gc3-0 |
| 52 | gc3-1 |
| 53 | gc3-2 |
| 60 | gc4-0 |
| 61 | gc4-1 |
| 62 | gc4-2 |
| 71 | pitch1-6 |
| 72 | pitch1-7 |
| 73 | pitch1-8 |
| 80 | pitch3-6 |
| 81 | pitch3-7 |
| 82 | pitch3-8 |
| 83 | pitch2-0 |
| 84 | pitch2-1 |
| 85 | pitch2-2 |
| 86 | pitch2-3 |
| 87 | pitch2-4 |
| 88 | pitch2-5 |
| 89 | pitch4-0 |
| 90 | pitch4-1 |
| 91 | pitch4-2 |
| 92 | pitch4-3 |
| 93 | pitch4-4 |
| 94 | pitch4-5 |
| 13 | lsf3-0 |
| 14 | lsf3-1 |
| 15 | lsf3-2 |
| 16 | lsf3-3 |
| 17 | lsf3-4 |
| 18 | lsf3-5 |
| 19 | lsf4-0 |
| 20 | lsf4-1 |
| 21 | lsf4-2 |
| 22 | lsf4-3 |
| 23 | lsf4-4 |
| 24 | lsf4-5 |
| 25 | lsf5-0 |
| 26 | lsf5-1 |
| 27 | lsf5-2 |
| 28 | lsf5-3 |
| 31 | gp1-2 |
| 32 | gp1-3 |
| 40 | gp2-2 |
| 41 | gp2-3 |
| 49 | gp3-2 |
| 50 | gp3-3 |
| 58 | gp4-2 |
| 59 | gp4-3 |
| 36 | gc1-3 |
| 45 | gc2-3 |
| 54 | gc3-3 |
| 63 | gc4-3 |
| 97 | exc1-0 |
| 98 | exc1-1 |
| 99 | exc1-2 |
| 100 | exc1-3 |
| 101 | exc1-4 |
| 102 | exc1-5 |
| 103 | exc1-6 |
| 104 | exc1-7 |
| 105 | exc1-8 |
| 106 | exc1-9 |
| 107 | exc1-10 |

-continued

APPENDIX C
Bit ordering (channel coding)

| Bits, see table XXX | Description |
|---|---|
| 108 | exc1-11 |
| 109 | exc1-12 |
| 110 | exc1-13 |
| 111 | exc1-14 |
| 112 | exc1-15 |
| 113 | exc1-16 |
| 114 | exc1-17 |
| 115 | exc1-18 |
| 116 | exc1-19 |
| 117 | exc1-20 |
| 118 | exc1-21 |
| 119 | exc1-22 |
| 120 | exc1-23 |
| 121 | exc1-24 |
| 122 | exc1-25 |
| 123 | exc1-26 |
| 124 | exc1-27 |
| 125 | exc1-28 |
| 128 | exc2-0 |
| 129 | exc2-1 |
| 130 | exc2-2 |
| 131 | exc2-3 |
| 132 | exc2-4 |
| 133 | exc2-5 |
| 134 | exc2-6 |
| 135 | exc2-7 |
| 136 | exc2-8 |
| 137 | exc2-9 |
| 138 | exc2-10 |
| 139 | exc2-11 |
| 140 | exc2-12 |
| 141 | exc2-13 |
| 142 | exc2-14 |
| 143 | exc2-15 |
| 144 | exc2-16 |
| 145 | exc2-17 |
| 146 | exc2-18 |
| 147 | exc2-19 |
| 148 | exc2-20 |
| 149 | exc2-21 |
| 150 | exc2-22 |
| 151 | exc2-23 |
| 152 | exc2-24 |
| 153 | exc2-25 |
| 154 | exc2-26 |
| 155 | exc2-27 |
| 156 | exc2-28 |
| 159 | exc3-0 |
| 160 | exc3-1 |
| 161 | exc3-2 |
| 162 | exc3-3 |
| 163 | exc3-4 |
| 164 | exc3-5 |
| 165 | exc3-6 |
| 166 | exc3-7 |
| 167 | exc3-8 |
| 168 | exc3-9 |
| 169 | exc3-10 |
| 170 | exc3-11 |
| 171 | exc3-12 |
| 172 | exc3-13 |
| 173 | exc3-14 |
| 174 | exc3-15 |
| 175 | exc3-16 |
| 176 | exc3-17 |
| 177 | exc3-18 |
| 178 | exc3-19 |
| 179 | exc3-20 |
| 180 | exc3-21 |
| 181 | exc3-22 |
| 182 | exc3-23 |
| 183 | exc3-24 |
| 184 | exc3-25 |
| 185 | exc3-26 |

-continued

APPENDIX C
Bit ordering (channel coding)

| Bits, see table XXX | Description |
|---|---|
| 186 | exc3-27 |
| 187 | exc3-28 |
| 190 | exc4-0 |
| 191 | exc4-1 |
| 192 | exc4-2 |
| 193 | exc4-3 |
| 194 | exc4-4 |
| 195 | exc4-5 |
| 196 | exc4-6 |
| 197 | exc4-7 |
| 198 | exc4-8 |
| 199 | exc4-9 |
| 200 | exc4-10 |
| 201 | exc4-11 |
| 202 | exc4-12 |
| 203 | exc4-13 |
| 204 | exc4-14 |
| 205 | exc4-15 |
| 206 | exc4-16 |
| 207 | exc4-17 |
| 208 | exc4-18 |
| 209 | exc4-19 |
| 210 | exc4-20 |
| 211 | exc4-21 |
| 212 | exc4-22 |
| 213 | exc4-23 |
| 214 | exc4-24 |
| 215 | exc4-25 |
| 216 | exc4-26 |
| 217 | exc4-27 |
| 218 | exc4-28 |
| 37 | gc1-4 |
| 46 | gc2-4 |
| 55 | gc3-4 |
| 64 | gc4-4 |
| 126 | exc1-29 |
| 127 | exc1-30 |
| 157 | exc2-29 |
| 158 | exc2-30 |
| 188 | exc3-29 |
| 189 | exc3-30 |
| 219 | exc4-29 |
| 220 | exc4-30 |
| 95 | interp-0 |
| 96 | interp-1 |

Ordering of bits according to subjective importance (8.0 kbit/s FRTCH).

| | |
|---|---|
| 1 | lsf1-0 |
| 2 | lsf1-1 |
| 3 | lsf1-2 |
| 4 | lsf1-3 |
| 5 | lsf1-4 |
| 6 | lsf1-5 |
| 7 | lsf2-0 |
| 8 | lsf2-1 |
| 9 | lsf2-2 |
| 10 | lsf2-3 |
| 11 | lsf2-4 |
| 12 | lsf2-5 |
| 25 | gain1-0 |
| 26 | gain1-1 |
| 27 | gain1-2 |
| 28 | gain1-3 |
| 29 | gain1-4 |
| 32 | gain2-0 |
| 33 | gain2-1 |
| 34 | gain2-2 |
| 35 | gain2-3 |
| 36 | gain2-4 |
| 39 | gain3-0 |
| 40 | gain3-1 |
| 41 | gain3-2 |
| 42 | gain3-3 |
| 43 | gain3-4 |

-continued

APPENDIX C
Bit ordering (channel coding)

| Bits, see table XXX | Description |
|---|---|
| 46 | gain4-0 |
| 47 | gain4-1 |
| 48 | gain4-2 |
| 49 | gain4-3 |
| 50 | gain4-4 |
| 53 | pitch1-0 |
| 54 | pitch1-1 |
| 55 | pitch1-2 |
| 56 | pitch1-3 |
| 57 | pitch1-4 |
| 58 | pitch1-5 |
| 61 | pitch3-0 |
| 62 | pitch3-1 |
| 63 | pitch3-2 |
| 64 | pitch3-3 |
| 65 | pitch3-4 |
| 66 | pitch3-5 |
| 69 | pitch2-0 |
| 70 | pitch2-1 |
| 71 | pitch2-2 |
| 74 | pitch4-0 |
| 75 | pitch4-1 |
| 76 | pitch4-2 |
| 13 | lsf3-0 |
| 14 | lsf3-1 |
| 15 | lsf3-2 |
| 16 | lsf3-3 |
| 17 | lsf3-4 |
| 18 | lsf3-5 |
| 30 | gain1-5 |
| 37 | gain2-5 |
| 44 | gain3-5 |
| 51 | gain4-5 |
| 59 | pitch1-6 |
| 67 | pitch3-6 |
| 72 | pitch2-3 |
| 77 | pitch4-3 |
| 79 | interp-0 |
| 80 | interp-1 |
| 31 | gain1-6 |
| 38 | gain2-6 |
| 45 | gain3-6 |
| 52 | gain4-6 |
| 19 | lsf4-0 |
| 20 | lsf4-1 |
| 21 | lsf4-2 |
| 22 | lsf4-3 |
| 23 | lsf4-4 |
| 24 | lsf4-5 |
| 60 | pitch1-7 |
| 68 | pitch3-7 |
| 73 | pitch2-4 |
| 78 | pitch4-4 |
| 81 | exc1-0 |
| 82 | exc1-1 |
| 83 | exc1-2 |
| 84 | exc1-3 |
| 85 | exc1-4 |
| 86 | exc1-5 |
| 87 | exc1-6 |
| 88 | exc1-7 |
| 89 | exc1-8 |
| 90 | exc1-9 |
| 91 | exc1-10 |
| 92 | exc1-11 |
| 93 | exc1-12 |
| 94 | exc1-13 |
| 95 | exc1-14 |
| 96 | exc1-15 |
| 97 | exc1-16 |
| 98 | exc1-17 |
| 99 | exc1-18 |
| 100 | exc1-19 |
| 101 | exc2-0 |

-continued

APPENDIX C
Bit ordering (channel coding)

| Bits, see table XXX | Description |
|---|---|
| 102 | exc2-1 |
| 103 | exc2-2 |
| 104 | exc2-3 |
| 105 | exc2-4 |
| 106 | exc2-5 |
| 107 | exc2-6 |
| 108 | exc2-7 |
| 109 | exc2-8 |
| 110 | exc2-9 |
| 111 | exc2-10 |
| 112 | exc2-11 |
| 113 | exc2-12 |
| 114 | exc2-13 |
| 115 | exc2-14 |
| 116 | exc2-15 |
| 117 | exc2-16 |
| 118 | exc2-17 |
| 119 | exc2-18 |
| 120 | exc2-19 |
| 121 | exc3-0 |
| 122 | exc3-1 |
| 123 | exc3-2 |
| 124 | exc3-3 |
| 125 | exc3-4 |
| 126 | exc3-5 |
| 127 | exc3-6 |
| 128 | exc3-7 |
| 129 | exc3-8 |
| 130 | exc3-9 |
| 131 | exc3-10 |
| 132 | exc3-11 |
| 133 | exc3-12 |
| 134 | exc3-13 |
| 135 | exc3-14 |
| 136 | exc3-15 |
| 137 | exc3-16 |
| 138 | exc3-17 |
| 139 | exc3-18 |
| 140 | exc3-19 |
| 141 | exc4-0 |
| 142 | exc4-1 |
| 143 | exc4-2 |
| 144 | exc4-3 |
| 145 | exc4-4 |
| 146 | exc4-5 |
| 147 | exc4-6 |
| 148 | exc4-7 |
| 149 | exc4-8 |
| 150 | exc4-9 |
| 151 | exc4-10 |
| 152 | exc4-11 |
| 153 | exc4-12 |
| 154 | exc4-13 |
| 155 | exc4-14 |
| 156 | exc4-15 |
| 157 | exc4-16 |
| 158 | exc4-17 |
| 159 | exc4-18 |
| 160 | exc4-19 |
| Ordering of bits according to subjective importance (6.65 kbit/s FRTCH). | |
| 54 | pitch-0 |
| 55 | pitch-1 |
| 56 | pitch-2 |
| 57 | pitch-3 |
| 58 | pitch-4 |
| 59 | pitch-5 |
| 1 | lsf1-0 |
| 2 | lsf1-1 |
| 3 | lsf1-2 |
| 4 | lsf1-3 |
| 5 | lsf1-4 |
| 6 | lsf1-5 |
| 25 | gain1-0 |

-continued

APPENDIX C
Bit ordering (channel coding)

| Bits, see table XXX | Description |
|---|---|
| 26 | gain1-1 |
| 27 | gain1-2 |
| 28 | gain1-3 |
| 32 | gain2-0 |
| 33 | gain2-1 |
| 34 | gain2-2 |
| 35 | gain2-3 |
| 39 | gain3-0 |
| 40 | gain3-1 |
| 41 | gain3-2 |
| 42 | gain3-3 |
| 46 | gain4-0 |
| 47 | gain4-1 |
| 48 | gain4-2 |
| 49 | gain4-3 |
| 29 | gain1-4 |
| 36 | gain2-4 |
| 43 | gain3-4 |
| 50 | gain4-4 |
| 53 | mode-0 |
| 98 | exc3-0 pitch-0(Second subframe) |
| 99 | exc3-1 pitch-1(Second subframe) |
| 7 | lsf2-0 |
| 8 | lsf2-1 |
| 9 | lsf2-2 |
| 10 | lsf2-3 |
| 11 | lsf2-4 |
| 12 | lsf2-5 |
| 30 | gain1-5 |
| 37 | gain2-5 |
| 44 | gain3-5 |
| 51 | gain4-5 |
| 62 | exc1-0 pitch-0(Third subframe) |
| 63 | exc1-1 pitch-1(Third subframe) |
| 64 | exc1-2 pitch-2(Third subframe) |
| 65 | exc1-3 pitch-3(Third subframe) |
| 66 | exc1-4 pitch-4(Third subframe) |
| 80 | exc2-0 pitch-5(Third subframe) |
| 100 | exc3-2 pitch-2(Second subframe) |
| 116 | exc4-0 pitch-0(Fourth subframe) |
| 117 | exc4-1 pitch-1(Fourth subframe) |
| 118 | exc4-2 pitch-2(Fourth subframe) |
| 13 | lsf3-0 |
| 14 | lsf3-1 |
| 15 | lsf3-2 |
| 16 | lsf3-3 |
| 17 | lsf3-4 |
| 18 | lsf3-5 |
| 19 | lsf4-0 |
| 20 | lsf4-1 |
| 21 | lsf4-2 |
| 22 | lsf4-3 |
| 67 | exc1-5 exc1(1tp) |
| 68 | exc1-6 exc1(1tp) |
| 69 | exc1-7 exc1(1tp) |
| 70 | exc1-8 exc1(1tp) |
| 71 | exc1-9 exc1(1tp) |
| 72 | exc1-10 |
| 81 | exc2-1 exc2(1tp) |
| 82 | exc2-2 exc2(1tp) |
| 83 | exc2-3 exc2(1tp) |
| 84 | exc2-4 exc2(1tp) |
| 85 | exc2-5 exc2(1tp) |
| 86 | exc2-6 exc2(1tp) |
| 87 | exc2-7 |
| 88 | exc2-8 |
| 89 | exc2-9 |
| 90 | exc2-10 |
| 101 | exc3-3 exc3(1tp) |
| 102 | exc3-4 exc3(1tp) |
| 103 | exc3-5 exc3(1tp) |
| 104 | exc3-6 exc3(1tp) |
| 105 | exc3-7 exc3(1tp) |
| 106 | exc3-8 |

-continued

APPENDIX C
Bit ordering (channel coding)

| Bits, see table XXX | Description |
|---|---|
| 107 | exc3-9 |
| 108 | exc3-10 |
| 119 | exc4-3 exc4(1tp) |
| 120 | exc4-4 exc4(1tp) |
| 121 | exc4-5 exc4(1tp) |
| 122 | exc4-6 exc4(1tp) |
| 123 | exc4-7 exc4(1tp) |
| 124 | exc4-8 |
| 125 | exc4-9 |
| 126 | exc4-10 |
| 73 | exc1-11 |
| 91 | exc2-11 |
| 109 | exc3-11 |
| 127 | exc4-11 |
| 74 | exc1-12 |
| 92 | exc2-12 |
| 110 | exc3-12 |
| 128 | exc4-12 |
| 60 | pitch-6 |
| 61 | pitch-7 |
| 23 | lsf4-4 |
| 24 | lsf4-5 |
| 75 | exc1-13 |
| 93 | exc2-13 |
| 111 | exc3-13 |
| 129 | exc4-13 |
| 31 | gain1-6 |
| 38 | gain2-6 |
| 45 | gain3-6 |
| 52 | gain4-6 |
| 76 | exc1-14 |
| 77 | exc1-15 |
| 94 | exc2-14 |
| 95 | exc2-15 |
| 112 | exc3-14 |
| 113 | exc3-15 |
| 130 | exc4-14 |
| 131 | exc4-15 |
| 78 | exc1-16 |
| 96 | exc2-16 |
| 114 | exc3-16 |
| 132 | exc4-16 |
| 79 | exc1-17 |
| 97 | exc2-17 |
| 115 | exc3-17 |
| 133 | exc4-17 |
| Ordering of bits according to subjective importance (5.8 kbit/s FRTCH). | |
| 53 | pitch-0 |
| 54 | pitch-1 |
| 55 | pitch-2 |
| 56 | pitch-3 |
| 57 | pitch-4 |
| 58 | pitch-5 |
| 1 | lsf1-0 |
| 2 | lsf1-1 |
| 3 | lsf1-2 |
| 4 | lsf1-3 |
| 5 | lsf1-4 |
| 6 | lsf1-5 |
| 7 | lsf2-0 |
| 8 | lsf2-1 |
| 9 | lsf2-2 |
| 10 | lsf2-3 |
| 11 | lsf2-4 |
| 12 | lsf2-5 |
| 25 | gain1-0 |
| 26 | gain1-1 |
| 27 | gain1-2 |
| 28 | gain1-3 |
| 29 | gain1-4 |
| 32 | gain2-0 |
| 33 | gain2-1 |
| 34 | gain2-2 |

-continued

APPENDIX C
Bit ordering (channel coding)

| Bits, see table XXX | Description |
|---|---|
| 35 | gain2-3 |
| 36 | gain2-4 |
| 39 | gain3-0 |
| 40 | gain3-1 |
| 41 | gain3-2 |
| 42 | gain3-3 |
| 43 | gain3-4 |
| 46 | gain4-0 |
| 47 | gain4-1 |
| 48 | gain4-2 |
| 49 | gain4-3 |
| 50 | gain4-4 |
| 30 | gain1-5 |
| 37 | gain2-5 |
| 44 | gain3-5 |
| 51 | gain4-5 |
| 13 | lsf3-0 |
| 14 | lsf3-1 |
| 15 | lsf3-2 |
| 16 | lsf3-3 |
| 17 | lsf3-4 |
| 18 | lsf3-5 |
| 59 | pitch-6 |
| 60 | pitch-7 |
| 19 | lsf4-0 |
| 20 | lsf4-1 |
| 21 | lsf4-2 |
| 22 | lsf4-3 |
| 23 | lsf4-4 |
| 24 | lsf4-5 |
| 31 | gain1-6 |
| 38 | gain2-6 |
| 45 | gain3-6 |
| 52 | gain4-6 |
| 61 | exc1-0 |
| 75 | exc2-0 |
| 89 | exc3-0 |
| 103 | exc4-0 |
| 62 | exc1-1 |
| 63 | exc1-2 |
| 64 | exc1-3 |
| 65 | exc1-4 |
| 66 | exc1-5 |
| 67 | exc1-6 |
| 68 | exc1-7 |
| 69 | exc1-8 |
| 70 | exc1-9 |
| 71 | exc1-10 |
| 72 | exc1-11 |
| 73 | exc1-12 |
| 74 | exc1-13 |
| 76 | exc2-1 |
| 77 | exc2-2 |
| 78 | exc2-3 |
| 79 | exc2-4 |
| 80 | exc2-5 |
| 81 | exc2-6 |
| 82 | exc2-7 |
| 83 | exc2-8 |
| 84 | exc2-9 |
| 85 | exc2-10 |
| 86 | exc2-11 |
| 87 | exc2-12 |
| 88 | exc2-13 |
| 90 | exc3-1 |
| 91 | exc3-2 |
| 92 | exc3-3 |
| 93 | exc3-4 |
| 94 | exc3-5 |
| 95 | exc3-6 |
| 96 | exc3-7 |
| 97 | exc3-8 |
| 98 | exc3-9 |
| 99 | exc3-10 |

-continued

APPENDIX C
Bit ordering (channel coding)

| Bits, see table XXX | Description |
| --- | --- |
| 100 | exc3-11 |
| 101 | exc3-12 |
| 102 | exc3-13 |
| 104 | exc4-1 |
| 105 | exc4-2 |
| 106 | exc4-3 |
| 107 | exc4-4 |
| 108 | exc4-5 |
| 109 | exc4-6 |
| 110 | exc4-7 |
| 111 | exc4-8 |
| 112 | exc4-9 |
| 113 | exc4-10 |
| 114 | exc4-11 |
| 115 | exc4-12 |
| 116 | exc4-13 |
| Ordering of bits according to subjective importance (8.0 kbit/s HRTCH). | |
| 1 | lsf1-0 |
| 2 | lsf1-1 |
| 3 | lsf1-2 |
| 4 | lsf1-3 |
| 5 | lsf1-4 |
| 6 | lsf1-5 |
| 25 | gain1-0 |
| 26 | gain1-1 |
| 27 | gain1-2 |
| 28 | gain1-3 |
| 32 | gain2-0 |
| 33 | gain2-1 |
| 34 | gain2-2 |
| 35 | gain2-3 |
| 39 | gain3-0 |
| 40 | gain3-1 |
| 41 | gain3-2 |
| 42 | gain3-3 |
| 46 | gain4-0 |
| 47 | gain4-1 |
| 48 | gain4-2 |
| 49 | gain4-3 |
| 53 | pitch1-0 |
| 54 | pitch1-1 |
| 55 | pitch1-2 |
| 56 | pitch1-3 |
| 57 | pitch1-4 |
| 58 | pitch1-5 |
| 61 | pitch3-0 |
| 62 | pitch3-1 |
| 63 | pitch3-2 |
| 64 | pitch3-3 |
| 65 | pitch3-4 |
| 66 | pitch3-5 |
| 69 | pitch2-0 |
| 70 | pitch2-1 |
| 71 | pitch2-2 |
| 74 | pitch4-0 |
| 75 | pitch4-1 |
| 76 | pitch4-2 |
| 7 | lsf2-0 |
| 8 | lsf2-1 |
| 9 | lsf2-2 |
| 10 | lsf2-3 |
| 11 | lsf2-4 |
| 12 | lsf2-5 |
| 29 | gain1-4 |
| 36 | gain2-4 |
| 43 | gain3-4 |
| 50 | gain4-4 |
| 79 | interp-0 |
| 80 | interp-1 |
| 13 | lsf3-0 |
| 14 | lsf3-1 |
| 15 | lsf3-2 |
| 16 | lsf3-3 |

-continued

APPENDIX C
Bit ordering (channel coding)

| Bits, see table XXX | Description |
| --- | --- |
| 17 | lsf3-4 |
| 18 | lsf3-5 |
| 19 | lsf4-0 |
| 20 | lsf4-1 |
| 21 | lsf4-2 |
| 22 | lsf4-3 |
| 23 | lsf4-4 |
| 24 | lsf4-5 |
| 30 | gain1-5 |
| 31 | gain1-6 |
| 37 | gain2-5 |
| 38 | gain2-6 |
| 44 | gain3-5 |
| 45 | gain3-6 |
| 51 | gain4-5 |
| 52 | gain4-6 |
| 59 | pitch1-6 |
| 67 | pitch3-6 |
| 72 | pitch2-3 |
| 77 | pitch4-3 |
| 60 | pitch1-7 |
| 68 | pitch3-7 |
| 73 | pitch2-4 |
| 78 | pitch4-4 |
| 81 | exc1-0 |
| 82 | exc1-1 |
| 83 | exc1-2 |
| 84 | exc1-3 |
| 85 | exc1-4 |
| 86 | exc1-5 |
| 87 | exc1-6 |
| 88 | exc1-7 |
| 89 | exc1-8 |
| 90 | exc1-9 |
| 91 | exc1-10 |
| 92 | exc1-11 |
| 93 | exc1-12 |
| 94 | exc1-13 |
| 95 | exc1-14 |
| 96 | exc1-15 |
| 97 | exc1-16 |
| 98 | exc1-17 |
| 99 | exc1-18 |
| 100 | exc1-19 |
| 101 | exc2-0 |
| 102 | exc2-1 |
| 103 | exc2-2 |
| 104 | exc2-3 |
| 105 | exc2-4 |
| 106 | exc2-5 |
| 107 | exc2-6 |
| 108 | exc2-7 |
| 109 | exc2-8 |
| 110 | exc2-9 |
| 111 | exc2-10 |
| 112 | exc2-11 |
| 113 | exc2-12 |
| 114 | exc2-13 |
| 115 | exc2-14 |
| 116 | exc2-15 |
| 117 | exc2-16 |
| 118 | exc2-17 |
| 119 | exc2-18 |
| 120 | exc2-19 |
| 121 | exc3-0 |
| 122 | exc3-1 |
| 123 | exc3-2 |
| 124 | exc3-3 |
| 125 | exc3-4 |
| 126 | exc3-5 |
| 127 | exc3-6 |
| 128 | exc3-7 |
| 129 | exc3-8 |
| 130 | exc3-9 |

-continued

APPENDIX C
Bit ordering (channel coding)

| Bits, see table XXX | Description |
|---|---|
| 131 | exc3-10 |
| 132 | exc3-11 |
| 133 | exc3-12 |
| 134 | exc3-13 |
| 135 | exc3-14 |
| 136 | exc3-15 |
| 137 | exc3-16 |
| 138 | exc3-17 |
| 139 | exc3-18 |
| 140 | exc3-19 |
| 141 | exc4-0 |
| 142 | exc4-1 |
| 143 | exc4-2 |
| 144 | exc4-3 |
| 145 | exc4-4 |
| 146 | exc4-5 |
| 147 | exc4-6 |
| 148 | exc4-7 |
| 149 | exc4-8 |
| 150 | exc4-9 |
| 151 | exc4-10 |
| 152 | exc4-11 |
| 153 | exc4-12 |
| 154 | exc4-13 |
| 155 | exc4-14 |
| 156 | exc4-15 |
| 157 | exc4-16 |
| 158 | exc4-17 |
| 159 | exc4-18 |
| 160 | exc4-19 |
| Ordering of bits according to subjective importance (6.65 kbit/s HRTCH). | |
| 53 | mode-0 |
| 54 | pitch-0 |
| 55 | pitch-1 |
| 56 | pitch-2 |
| 57 | pitch-3 |
| 58 | pitch-4 |
| 59 | pitch-5 |
| 1 | lsf1-0 |
| 2 | lsf1-1 |
| 3 | lsf1-2 |
| 4 | lsf1-3 |
| 5 | lsf1-4 |
| 6 | lsf1-5 |
| 7 | lsf2-0 |
| 8 | lsf2-1 |
| 9 | lsf2-2 |
| 10 | lsf2-3 |
| 11 | lsf2-4 |
| 12 | lsf2-5 |
| 25 | gain1-0 |
| 26 | gain1-1 |
| 27 | gain1-2 |
| 28 | gain1-3 |
| 32 | gain2-0 |
| 33 | gain2-1 |
| 34 | gain2-2 |
| 35 | gain2-3 |
| 39 | gain3-0 |
| 40 | gain3-1 |
| 41 | gain3-2 |
| 42 | gain3-3 |
| 46 | gain4-0 |
| 47 | gain4-1 |
| 48 | gain4-2 |
| 49 | gain4-3 |
| 29 | gain1-4 |
| 36 | gain2-4 |
| 43 | gain3-4 |
| 50 | gain4-4 |
| 62 | exc1-0 pitch-0(Third subframe) |
| 63 | exc1-1 pitch-1(Third subframe) |
| 64 | exc1-2 pitch-2(Third subframe) |

-continued

APPENDIX C
Bit ordering (channel coding)

| Bits, see table XXX | Description |
|---|---|
| 65 | exc1-3 pitch-3(Third subframe) |
| 80 | exc2-0 pitch-5(Third subframe) |
| 98 | exc3-0 pitch-0(Second subframe) |
| 99 | exc3-1 pitch-1(Second subframe) |
| 100 | exc3-2 pitch-2(Second subframe) |
| 116 | exc4-0 pitch-0(Fourth subframe) |
| 117 | exc4-1 pitch-1(Fourth subframe) |
| 118 | exc4-2 pitch-2(Fourth subframe) |
| 13 | lsf3-0 |
| 14 | lsf3-1 |
| 15 | lsf3-2 |
| 16 | lsf3-3 |
| 17 | lsf3-4 |
| 18 | lsf3-5 |
| 19 | lsf4-0 |
| 20 | lsf4-1 |
| 21 | lsf4-2 |
| 22 | lsf4-3 |
| 23 | lsf4-4 |
| 24 | lsf4-5 |
| 81 | exc2-1 exc2(1tp) |
| 82 | exc2-2 exc2(1tp) |
| 83 | exc2-3 exc2(1tp) |
| 101 | exc3-3 exc3(1tp) |
| 119 | exc4-3 exc4(1tp) |
| 66 | exc1-4 pitch-4(Third subframe) |
| 84 | exc2-4 exc2(1tp) |
| 102 | exc3-4 exc3(1tp) |
| 120 | exc4-4 exc4(1tp) |
| 67 | exc1-5 exc1(1tp) |
| 68 | exc1-6 exc1(1tp) |
| 69 | exc1-7 exc1(1tp) |
| 70 | exc1-8 exc1(1tp) |
| 71 | exc1-9 exc1(1tp) |
| 72 | exc1-10 |
| 73 | exc1-11 |
| 85 | exc2-5 exc2(1tp) |
| 86 | exc2-6 exc2(1tp) |
| 87 | exc2-7 |
| 88 | exc2-8 |
| 89 | exc2-9 |
| 90 | exc2-10 |
| 91 | exc2-11 |
| 103 | exc3-5 exc3(1tp) |
| 104 | exc3-6 exc3(1tp) |
| 105 | exc3-7 exc3(1tp) |
| 106 | exc3-8 |
| 107 | exc3-9 |
| 108 | exc3-10 |
| 109 | exc3-11 |
| 121 | exc4-5 exc4(1tp) |
| 122 | exc4-6 exc4(1tp) |
| 123 | exc4-7 exc4(1tp) |
| 124 | exc4-8 |
| 125 | exc4-9 |
| 126 | exc4-10 |
| 127 | exc4-11 |
| 30 | gain1-5 |
| 31 | gain1-6 |
| 37 | gain2-5 |
| 38 | gain2-6 |
| 44 | gain3-5 |
| 45 | gain3-6 |
| 51 | gain4-5 |
| 52 | gain4-6 |
| 60 | pitch-6 |
| 61 | pitch-7 |
| 74 | exc1-12 |
| 75 | exc1-13 |
| 76 | exc1-14 |
| 77 | exc1-15 |
| 92 | exc2-12 |
| 93 | exc2-13 |
| 94 | exc2-14 |

-continued

APPENDIX C
Bit ordering (channel coding)

| Bits, see table XXX | Description |
|---|---|
| 95 | exc2-15 |
| 110 | exc3-12 |
| 111 | exc3-13 |
| 112 | exc3-14 |
| 113 | exc3-15 |
| 128 | exc4-12 |
| 129 | exc4-13 |
| 130 | exc4-14 |
| 131 | exc4-15 |
| 78 | exc1-16 |
| 96 | exc2-16 |
| 114 | exc3-16 |
| 132 | exc4-16 |
| 79 | exc1-17 |
| 97 | exc2-17 |
| 115 | exc3-17 |
| 133 | exc4-17 |
| Ordering of bits according to subjective importance (5.8 kbit/s HRTCH) | |
| 25 | gain1-0 |
| 26 | gain1-1 |
| 32 | gain2-0 |
| 33 | gain2-1 |
| 39 | gain3-0 |
| 40 | gain3-1 |
| 46 | gain4-0 |
| 47 | gain4-1 |
| 1 | lsf1-0 |
| 2 | lsf1-1 |
| 3 | lsf1-2 |
| 4 | lsf1-3 |
| 5 | lsf1-4 |
| 6 | lsf1-5 |
| 27 | gain1-2 |
| 34 | gain2-2 |
| 41 | gain3-2 |
| 48 | gain4-2 |
| 53 | pitch-0 |
| 54 | pitch-1 |
| 55 | pitch-2 |
| 56 | pitch-3 |
| 57 | pitch-4 |
| 58 | pitch-5 |
| 28 | gain1-3 |
| 29 | gain1-4 |
| 35 | gain2-3 |
| 36 | gain2-4 |
| 42 | gain3-3 |
| 43 | gain3-4 |
| 49 | gain4-3 |
| 50 | gain4-4 |
| 7 | lsf2-0 |
| 8 | lsf2-1 |
| 9 | lsf2-2 |
| 10 | lsf2-3 |
| 11 | lsf2-4 |
| 12 | lsf2-5 |
| 13 | lsf1-0 |
| 14 | lsf1-1 |
| 15 | lsf1-2 |
| 16 | lsf1-3 |
| 17 | lsf1-4 |
| 18 | lsf1-5 |
| 19 | lsf4-0 |
| 20 | lsf4-1 |
| 21 | lsf4-2 |
| 22 | lsf4-3 |
| 30 | gain1-5 |
| 37 | gain2-5 |
| 44 | gain3-5 |
| 51 | gain4-5 |
| 31 | gain1-6 |
| 38 | gain2-6 |
| 45 | gain3-6 |

-continued

APPENDIX C
Bit ordering (channel coding)

| Bits, see table XXX | Description |
|---|---|
| 52 | gain4-6 |
| 61 | exc1-0 |
| 62 | exc1-1 |
| 63 | exc1-2 |
| 64 | exc1-3 |
| 75 | exc2-0 |
| 76 | exc2-1 |
| 77 | exc2-2 |
| 78 | exc2-3 |
| 89 | exc3-0 |
| 90 | exc3-1 |
| 91 | exc3-2 |
| 92 | exc3-3 |
| 103 | exc4-0 |
| 104 | exc4-1 |
| 105 | exc4-2 |
| 106 | exc4-3 |
| 23 | lsf4-4 |
| 24 | lsf4-5 |
| 59 | pitch-6 |
| 60 | pitch-7 |
| 65 | exc1-4 |
| 66 | exc1-5 |
| 67 | exc1-6 |
| 68 | exc1-7 |
| 69 | exc1-8 |
| 70 | exc1-9 |
| 71 | exc1-10 |
| 72 | exc1-11 |
| 73 | exc1-12 |
| 74 | exc1-13 |
| 79 | exc2-4 |
| 80 | exc2-5 |
| 81 | exc2-6 |
| 82 | exc2-7 |
| 83 | exc2-8 |
| 84 | exc2-9 |
| 85 | exc2-10 |
| 86 | exc2-11 |
| 87 | exc2-12 |
| 88 | exc2-13 |
| 93 | exc3-4 |
| 94 | exc3-5 |
| 95 | exc3-6 |
| 96 | exc3-7 |
| 97 | exc3-8 |
| 98 | exc3-9 |
| 99 | exc3-10 |
| 100 | exc3-11 |
| 101 | exc3-12 |
| 102 | exc3-13 |
| 107 | exc4-4 |
| 108 | exc4-5 |
| 109 | exc4-6 |
| 110 | exc4-7 |
| 111 | exc4-8 |
| 112 | exc4-9 |
| 113 | exc4-10 |
| 114 | exc4-11 |
| 115 | exc4-12 |
| 116 | exc4-13 |
| Ordering of bits according to subjective importance (4.55 kbit/s HRTCH). | |
| 20 | gain1-0 |
| 26 | gain2-0 |
| 44 | pitch-0 |
| 45 | pitch-1 |
| 46 | pitch-2 |
| 32 | gain3-0 |
| 38 | gain4-0 |
| 21 | gain1-1 |
| 27 | gain2-1 |
| 33 | gain3-1 |
| 39 | gain4-1 |

-continued

APPENDIX C
Bit ordering (channel coding)

| Bits, see table XXX | Description |
|---|---|
| 19 | prd_lsf |
| 1 | lsf1-0 |
| 2 | lsf1-1 |
| 3 | lsf1-2 |
| 4 | lsf1-3 |
| 5 | lsf1-4 |
| 6 | lsf1-5 |
| 7 | lsf2-0 |
| 8 | lsf2-1 |
| 9 | lsf2-2 |
| 22 | gain1-2 |
| 28 | gain2-2 |
| 34 | gain3-2 |
| 40 | gain4-2 |
| 23 | gain1-3 |
| 29 | gain2-3 |
| 35 | gain3-3 |
| 41 | gain4-3 |
| 47 | pitch-3 |
| 10 | lsf2-3 |
| 11 | lsf2-4 |
| 12 | lsf2-5 |
| 24 | gain1-4 |
| 30 | gain2-4 |
| 36 | gain3-4 |
| 42 | gain4-4 |
| 48 | pitch-4 |
| 49 | pitch-5 |
| 13 | lsf3-0 |
| 14 | lsf3-1 |
| 15 | lsf3-2 |
| 16 | lsf3-3 |
| 17 | lsf3-4 |
| 18 | lsf3-5 |
| 25 | gain1-5 |
| 31 | gain2-5 |
| 37 | gain3-5 |
| 43 | gain4-5 |
| 50 | pitch-6 |
| 51 | pitch-7 |
| 52 | exc1-0 |
| 53 | exc1-1 |
| 54 | exc1-2 |
| 55 | exc1-3 |
| 56 | exc1-4 |
| 57 | exc1-5 |
| 58 | exc1-6 |
| 62 | exc2-0 |
| 63 | exc2-1 |
| 64 | exc2-2 |
| 65 | exc2-3 |
| 66 | exc2-4 |
| 67 | exc2-5 |
| 72 | exc3-0 |
| 73 | exc3-1 |
| 74 | exc3-2 |
| 75 | exc3-3 |
| 76 | exc3-4 |
| 77 | exc3-5 |
| 82 | exc4-0 |
| 83 | exc4-1 |
| 84 | exc4-2 |
| 85 | exc4-3 |
| 86 | exc4-4 |
| 87 | exc4-5 |
| 59 | exc1-7 |
| 60 | exc1-8 |
| 61 | exc1-9 |
| 68 | exc2-6 |
| 69 | exc2-7 |
| 70 | exc2-8 |
| 71 | exc2-9 |
| 78 | exc3-6 |
| 79 | exc3-7 |

-continued

APPENDIX C
Bit ordering (channel coding)

| Bits, see table XXX | Description |
|---|---|
| 80 | exc3-8 |
| 81 | exc3-9 |
| 88 | exc4-6 |
| 89 | exc4-7 |
| 90 | exc4-8 |
| 91 | exc4-9 |

We claim:

1. A speech system using an analysis by synthesis approach on a speech signal, the speech system comprising:

an adaptive codebook;

a fixed codebook;

a processing circuit that sequentially identifies a first gain applied to the adaptive codebook and a second gain applied to the fixed codebook; and the processing circuit identifies a gain reduction factor applied to the first gain identified, the gain reduction factor is used by the processing circuit to perform the identification of the second gain.

2. The speech system of claim 1 wherein the gain reduction factor comprises an adaptive gain factor.

3. The speech system of claim 2 wherein the processing circuit identifies the adaptive gain factor by considering, at least in part, an encoding bit rate.

4. The speech system of claim 2 wherein the processing circuit identifies the adaptive gain factor by considering a correlation value.

5. The speech system of claim 4 wherein the processing circuit calculates the correlation value based, at least in part, on an original target signal.

6. The speech system of claim 4 wherein the processing circuit calculates the correlation value based, at least in part, on a filtered signal from the adaptive codebook.

7. A speech system using an analysis by synthesis approach on a speech signal, the speech system comprising:

a adaptive codebook;

a fixed codebook;

a processing circuit that generates a first contribution from the adaptive codebook and a second contribution from the fixed codebook; and the processing circuit applying gain reduction to the first contribution from the adaptive codebook then regenerating the second contribution from the fixed codebook.

8. The speech system of claim 7 wherein the gain reduction comprises application of a gain factor.

9. The speech system of claim 8 wherein the processing circuit identifies the gain factor by considering an encoding bit rate.

10. The speech system of claim 8 wherein the processing circuit identifies the gain factor by considering a correlation value.

11. The speech system of claim 10 wherein the processing circuit calculates the correlation value based, at least in part, on an original target signal.

12. The speech system of claim 10 wherein the processing circuit calculates the correlation value based, at least in part, on a filtered signal from the adaptive codebook.

13. A speech system using an analysis by synthesis approach on a speech signal, the speech system comprising:

an adaptive codebook;

a fixed codebook;

a processing circuit that attempts to minimize a first residual signal using contributions from both the adaptive codebook and the fixed codebook; and the processing circuit, after attempting to minimize the first residual signal, applying gain reduction to the contribution from the adaptive codebook and then recalculating the contribution from the fixed codebook by attempting to minimize a second residual signal.

14. The speech system of claim 13 wherein the gain reduction comprises use of a gain factor.

15. The speech system of claim 14 wherein the processing circuit identifies the gain factor by considering an encoding bit rate.

16. The speech system of claim 14 wherein the processing circuit identifies the gain factor by considering a correlation value.

17. The speech system of claim 16 wherein the processing circuit calculates the correlation value based, at least in part, on an original target signal.

18. The speech system of claim 16 wherein the processing circuit calculates the correlation value based, at least in part, on a filtered signal from the adaptive codebook.

19. The speech system of claim 13 wherein the second residual signal has a greater contribution from the fixed codebook than in the first residual signal.

20. The speech system of claim 13 wherein, to generate the first residual signal, the processing circuit first selects a contribution from the adaptive codebook and then selects a contribution from the fixed codebook.

* * * * *